US011330653B2

(12) United States Patent
Paladugu et al.

(10) Patent No.: US 11,330,653 B2
(45) Date of Patent: May 10, 2022

(54) MOBILITY ROBUSTNESS AND SPATIAL RELIABILITY USING MULTI-CONNECTIVITY

(71) Applicant: QUALCOMM incorporated, San Diego, CA (US)

(72) Inventors: Karthika Paladugu, San Diego, CA (US); Yu-Ting Yu, San Francisco, CA (US); Gavin Bernard Horn, La Jolla, CA (US); Keiichi Kubota, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 16/440,220

(22) Filed: Jun. 13, 2019

(65) Prior Publication Data

US 2019/0387561 A1 Dec. 19, 2019

Related U.S. Application Data

(60) Provisional application No. 62/685,151, filed on Jun. 14, 2018.

(51) Int. Cl.
*H04W 76/15* (2018.01)
*H04W 72/04* (2009.01)
*H04W 24/10* (2009.01)

(52) U.S. Cl.
CPC .......... *H04W 76/15* (2018.02); *H04W 24/10* (2013.01); *H04W 72/04* (2013.01)

(58) Field of Classification Search
None
See application file for complete search history.

(56) References Cited

U.S. PATENT DOCUMENTS 11,044,644 B2 * 6/2021 Liu .................. H04W 36/0009
2016/0057687 A1 * 2/2016 Horn .................... H04W 28/10
370/331

(Continued)

FOREIGN PATENT DOCUMENTS

WO   WO-2016122255 A1   8/2016
WO   WO-2017146287 A1   8/2017
WO    WO2018232124 A1   12/2018

OTHER PUBLICATIONS

Nokia et al., 3GPP TSG-RAN WG2 Meeting #97bis, Fast Radio Measurement Filtering for NR Dual connectivity, dated Apr. 2017, all pages. (Year: 2017).*

(Continued)

*Primary Examiner* — Gregory B Sefcheck
*Assistant Examiner* — Srinivasa R Reddivalam
(74) *Attorney, Agent, or Firm* — Holland & Hart LLP

(57) ABSTRACT

Methods, systems, and devices for wireless communications are described. A wireless communications system may support multi-connectivity for a user equipment (UE) with multiple distributed units (DUs) under one central unit (CU), the DUs and the CU belonging to a base station. The UE may establish radio resource control (RRC) connections with multiple cell groups corresponding to multiple DUs under the CU. The UE may transmit measurement reports that provide measurement information for cells in proximity to the UE. The UE may maintain a set of active cell groups and a set of inactive cell groups. In some cases, one or more cell groups may be identified as controlling cell groups used to transmit control information. In some examples, the UE may replicate an uplink packets and transmit the uplink packet and replicates on multiple cell groups. In some cases, the UE may aggregate an uplink transmission among multiple cell groups.

47 Claims, 28 Drawing Sheets

(56) References Cited

U.S. PATENT DOCUMENTS

| | | | |
|---|---|---|---|
| 2016/0088534 A1* | 3/2016 | Axmon | H04W 24/10 |
| | | | 370/252 |
| 2016/0301513 A1 | 10/2016 | He et al. | |
| 2017/0006509 A1 | 1/2017 | Viering et al. | |
| 2017/0373728 A1 | 12/2017 | Viering et al. | |
| 2018/0014218 A1* | 1/2018 | Kubota | H04W 56/001 |
| 2018/0092085 A1* | 3/2018 | Shaheen | H04W 36/14 |
| 2018/0212716 A1* | 7/2018 | Sirotkin | H04L 47/34 |
| 2018/0324780 A1* | 11/2018 | Novlan | H04W 24/10 |
| 2019/0068331 A1* | 2/2019 | Lee | H04L 1/18 |
| 2019/0208478 A1* | 7/2019 | Park | H04W 76/27 |
| 2019/0335366 A1* | 10/2019 | Jin | H04W 76/18 |
| 2020/0128453 A1* | 4/2020 | Teyeb | H04W 36/0094 |
| 2020/0162211 A1* | 5/2020 | Wang | H04L 5/0037 |

OTHER PUBLICATIONS

ERICSSON: "Simultaneous RX/TX in LTE and NR", 3GPP TSG-RAN WG2 #95bis, Tdoc R2-166829, Kaohsiung, Taiwan, Oct. 10-14, 2016, pp. 1-2.
International Search Report and Written Opinion—PCT/US2019/037168—ISA/EPO—dated Aug. 14, 2019.

\* cited by examiner

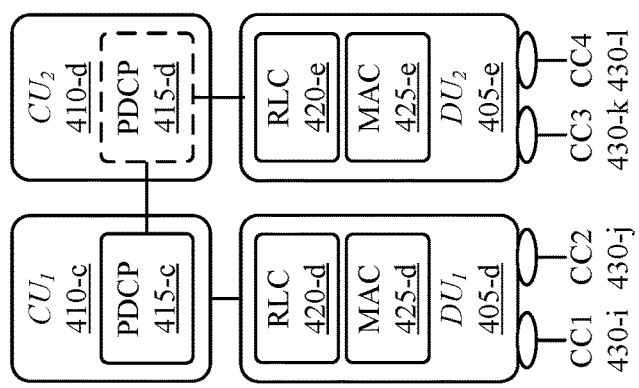
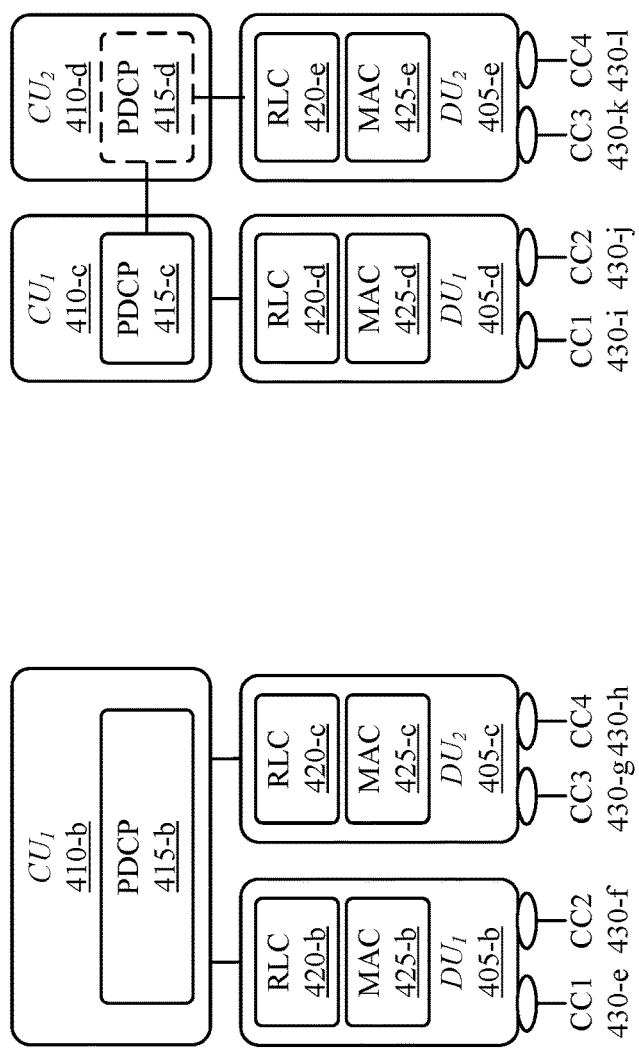
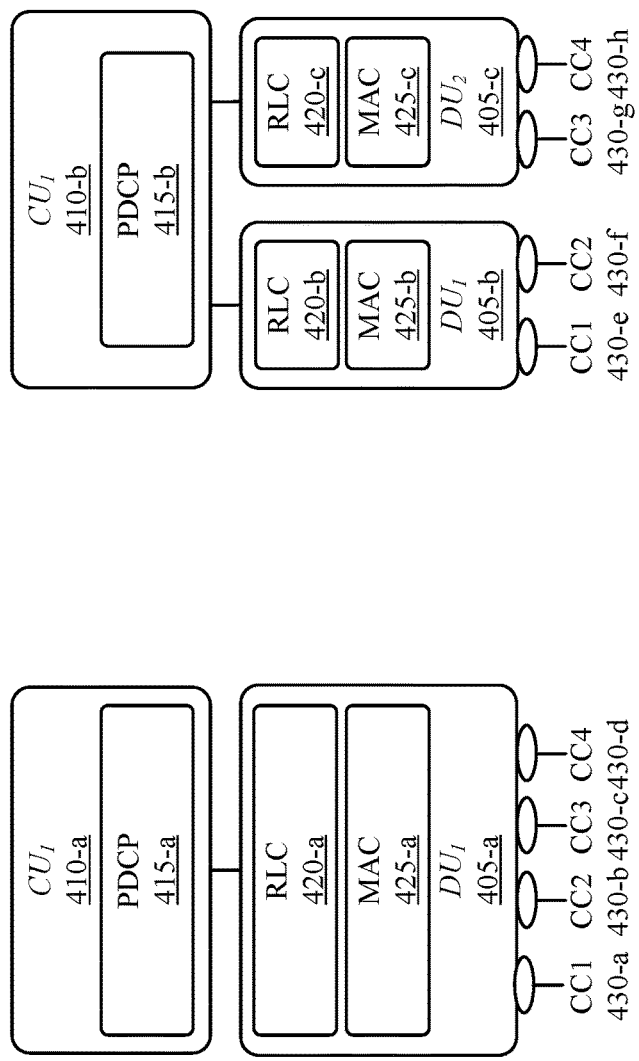
FIG. 4A
FIG. 4B
FIG. 4C

MOBILITY ROBUSTNESS AND SPATIAL RELIABILITY USING MULTI-CONNECTIVITY

CROSS REFERENCE

The present Application for Patent claims the benefit of U.S. Provisional Patent Application No. 62/685,151 by Palaudgu, et al., entitled "MOBILITY ROBUSTNESS AND SPATIAL RELIABILITY USING MULTI-CONNECTIVITY," filed Jun. 14, 2018, assigned to the assignee hereof, and expressly incorporated by reference herein.

BACKGROUND

The following relates generally to wireless communications, and more specifically to mobility robustness and spatial reliability using multi-connectivity.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications networks, a user equipment (UE) and a base station may implement techniques for carrier aggregation using a primary cell and multiple secondary cells. In other wireless communications networks, a UE and two different cell groups may implement techniques for dual connectivity using a master cell group configured for a first base station and a secondary cell group configured for a second base station. However, dual connectivity limits the UE to two concurrent active connections, while carrier aggregation limits the UE to sharing a common control plane entity for each connection.

SUMMARY

A wireless communications system may support multi-connectivity for a user equipment (UE) with multiple distributed units (DUs) under one central unit (CU), the DUs and the CU belonging to a base station. The UE may establish radio resource control (RRC) connections with multiple cell groups corresponding to multiple DUs under the CU. The UE may maintain a set of active cell groups and a set of inactive cell groups. Cell groups in the set of active cell groups may be allocated physical resources to communicate with the UE. Cell groups in the set of inactive cell groups may still have an RRC connection established, but may not have physical resources allocated.

Some cell groups may include signaling radio bearer (SRB) resources and be referred to as a controlling cell group. The UE may receive control information via controlling cell groups. In some cases, the UE may have multiple controlling cell groups. In some examples, the UE may declare radio link failure (RLF) only if RLF is detected for all of the controlling cell groups. In some examples, one controlling cell group may have better conditions than other controlling cell groups, and the controlling cell group (or, in some cases, the multiple controlling cell groups) with the best conditions or performance metrics may be identified as one or more selected controlling cell groups to the UE.

In some cases, the multi-connectivity scheme may support packet data convergence protocol (PDCP) replication, where data to be transmitted on a data radio bearer (DRB) is replicated across multiple communication links corresponding to multiple cell groups. Additionally, the multi-connectivity scheme may support PDCP aggregation, where data to be transmitted on a DRB is distributed across multiple communication links corresponding to multiple cell groups. PDCP replication and aggregation may be triggered due to various DRB-related thresholds being satisfied.

The UE and the base station may implement techniques for one or more of adding, activating, deactivating, and releasing a cell group from the set of cell groups configured for the UE. The UE and base station may also implement techniques to activate or deactivate PDCP uplink replication and to update a cell group set of the UE. The UE and the base station may also implement techniques to support seamless handover across cell groups. In some cases, based on having multiple connections to the base station, the UE may be able handed over from one cell group to another without packet loss.

A method of wireless communication at a UE is described. The method may include transmitting a capability message to a base station indicating a multi-connectivity capability of the UE to support more than two concurrent active cell group connections, transmitting, to the base station, one or more measurement reports that provide measurement information for cells in proximity to the UE, receiving, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station, and communicating with the base station via the set of active cell groups in accordance with the multi-connectivity configuration.

An apparatus for wireless communication at a UE is described. The apparatus may include a processor, memory coupled (e.g., in electronic communication) with the processor, and instructions stored in the memory. The instructions may be executable by the processor to cause the apparatus to transmit a capability message to a base station indicating a multi-connectivity capability of the UE to support more than two concurrent active cell group connections, transmit, to the base station, one or more measurement reports that provide measurement information for cells in proximity to the UE, receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station, and communicate with the base station via the set of active cell groups in accordance with the multi-connectivity configuration.

Another apparatus for wireless communication at a UE is described. The apparatus may include means for transmitting a capability message to a base station indicating a multi-connectivity capability of the UE to support more than two concurrent active cell group connections, transmitting, to the base station, one or more measurement reports that provide measurement information for cells in proximity to the UE, receiving, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station, and communicating with the base station via the set of active cell groups in accordance with the multi-connectivity configuration.

A non-transitory computer-readable medium storing code for wireless communication at a UE is described. The code may include instructions executable by a processor to transmit a capability message to a base station indicating a multi-connectivity capability of the UE to support more than two concurrent active cell group connections, transmit, to the base station, one or more measurement reports that provide measurement information for cells in proximity to the UE, receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station, and communicate with the base station via the set of active cell groups in accordance with the multi-connectivity configuration.

Some examples of the method, apparatuses, and non-transitory computer-readable medium described herein may further include operations, features, means, or instructions for identifying, from the multi-connectivity configuration, that the cell group set includes one or more inactive cell groups to which the UE may be connected but for which the UE lacks an allocation of uplink and downlink physical resources.

Some examples of the method, apparatuses, and non-transitory computer-readable medium described herein may further include operations, features, means, or instructions for receiving an update to the multi-connectivity configuration indicating that an additional cell group is to be added to the cell group set. Some examples of the method, apparatuses, and non-transitory computer-readable medium described herein may further include operations, features, means, or instructions for receiving an update to the multi-connectivity configuration indicating that at least one of an active cell group or an inactive cell group has been released and is no longer a part of the cell group set. Some examples of the method, apparatuses, and non-transitory computer-readable medium described herein may further include operations, features, means, or instructions for monitoring channel conditions associated with at least the set of active cell groups and the one or more inactive cell groups, transmitting to the base station one or more additional measurement reports identifying the channel conditions and receiving an update to the multi-connectivity configuration based on the one or more additional measurement reports.

In some examples of the method, apparatuses, and non-transitory computer-readable medium described herein, receiving the update to the multi-connectivity configuration may include operations, features, means, or instructions for receiving a RRC signal indicating that an additional cell group may be to be added to the cell group set.

Some examples of the method, apparatuses, and non-transitory computer-readable medium described herein may further include operations, features, means, or instructions for receiving updated radio bearer and cell group configuration information associated with the additional cell group.

In some examples of the method, apparatuses, and non-transitory computer-readable medium described herein, the additional cell group may be identified as either an active cell group or an inactive cell group.

In some examples of the method, apparatuses, and non-transitory computer-readable medium described herein, receiving the update to the multi-connectivity configuration may include operations, features, means, or instructions for receiving a MAC CE or RRC signal indicating that an inactive cell group may have been changed to be an active cell group.

In some examples of the method, apparatuses, and non-transitory computer-readable medium described herein, receiving the update to the multi-connectivity configuration may include operations, features, means, or instructions for receiving a MAC CE or RRC signal indicating that an active cell group may have been changed to be an inactive cell group.

In some examples of the method, apparatuses, and non-transitory computer-readable medium described herein, receiving the update to the multi-connectivity configuration may include operations, features, means, or instructions for receiving a RRC signal indicating that either an active cell group or an inactive cell group may have been released and may be no longer a part of the cell group set.

Some examples of the method, apparatuses, and non-transitory computer-readable medium described herein may further include operations, features, means, or instructions for identifying that two or more of the set of active cell groups may be controlling cell groups.

In some examples of the method, apparatuses, and non-transitory computer-readable medium described herein, identifying that two or more of the set of active cell groups may be controlling cell groups may include operations, features, means, or instructions for receiving, via a RRC message, an indicator that the two or more of the set of active cell groups may be controlling cell groups.

In some examples of the method, apparatuses, and non-transitory computer-readable medium described herein, identifying that two or more of the set of active cell groups may be controlling cell groups may include operations, features, means, or instructions for receiving an allocation of SRB resources for each of the controlling cell groups and identifying the controlling cell groups based on receipt of the allocation of SRB resources for the controlling cell groups.

Some examples of the method, apparatuses, and non-transitory computer-readable medium described herein may further include operations, features, means, or instructions for declaring RLF only if RLF may be identified on each of the controlling cell groups.

Some examples of the method, apparatuses, and non-transitory computer-readable medium described herein may further include operations, features, means, or instructions for measuring one or more attributes of the controlling cell groups, identifying, based on the measuring, one or more of the controlling cell groups as one or more selected controlling cell groups, reporting the one or more selected controlling cell groups to the base station and receiving at least one of system information (SI) notifications, public warning system (PWS) notifications, core network (CN) registration area notifications, or radio area network (RAN) notifications via the one or more selected controlling cell groups.

Some examples of the method, apparatuses, and non-transitory computer-readable medium described herein may further include operations, features, means, or instructions for receiving an indication of which cell groups of the set of active cell groups may be to be configured for PDCP aggregation such that data associated with a DRB having a throughput requirement above at least one threshold may be distributed across the indicated cell groups having an aggregate throughput that satisfies the throughput requirement of the DRB.

In some examples of the method, apparatuses, and non-transitory computer-readable medium described herein, the at least one threshold may be a set of predetermined thresholds, with each of the set of predetermined thresholds corresponding to one of the indicated cell groups, and where the data associated with the DRB may be distributed across the indicated cell groups in accordance with the set of predetermined thresholds.

In some examples of the method, apparatuses, and non-transitory computer-readable medium described herein, the at least one threshold may be one or more conditional thresholds, with each of the one or more conditional thresholds corresponding to a predetermined quality of a link connection associated with the indicated cell groups.

Some examples of the method, apparatuses, and non-transitory computer-readable medium described herein may further include operations, features, means, or instructions for receiving an indication of which cell groups of the set of active cell groups may be to be configured for PDCP replication such that data associated with a DRB having a latency or reliability requirement above a threshold may be replicated across the indicated cell groups.

In some examples of the method, apparatuses, and non-transitory computer-readable medium described herein, the indication includes one or more replication flags corresponding to each of the indicated cell groups.

Some examples of the method, apparatuses, and non-transitory computer-readable medium described herein may further include operations, features, means, or instructions for receiving a conditional indication of which cell groups of the set of active cell groups may be to be configured for DRB PDCP aggregation and of which cell groups of the set of active cell groups may be to be configured for DRB PDCP replication and updating the multi-connectivity configuration for DRB PDCP aggregation or DRB PDCP replication based on a trigger of the conditional indication and without prior receipt of an updated multi-connectivity configuration.

In some examples of the method, apparatuses, and non-transitory computer-readable medium described herein, the set of cell groups included in the cell group set include cell groups for both New Radio (NR) and LTE radio access technologies (RATs).

In some examples of the method, apparatuses, and non-transitory computer-readable medium described herein, the set of cell groups included in the cell group set include cell groups for a same type of RAT.

In some examples of the method, apparatuses, and non-transitory computer-readable medium described herein, a number of the set of cell groups included in the cell group set for which the UE may be configured may be based on the multi-connectivity capability of the UE, service requirements of DRBs configured for the UE, throughput or reliability requirements of DRBs configured for the UE, a location of the UE, channel conditions affecting communications with the UE, battery resources of the UE, other device resource conditions having an effect on capabilities of the UE, or combinations thereof.

In some examples of the method, apparatuses, and non-transitory computer-readable medium described herein, each of the set of cell groups of the cell group set includes a set of cells configured for a same DU of the base station and managed by a single MAC entity, and where all of the set of cell groups of the cell group set may be associated with a same CU of the base station.

A method of wireless communication at a base station is described. The method may include receiving a capability message from a UE indicating a multi-connectivity capability of the UE to support more than two concurrent active cell group connections, receiving, from the UE, one or more measurement reports that provide measurement information for cells in proximity to the UE, determining, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station, transmitting to the UE, responsive to the capability message and the one or more measurement reports, a multi-connectivity configuration that includes the cell group set, and communicating with the UE via the set of active cell groups in accordance with the multi-connectivity configuration.

An apparatus for wireless communication at a base station is described. The apparatus may include a processor, memory coupled (e.g., in electronic communication) with the processor, and instructions stored in the memory. The instructions may be executable by the processor to cause the apparatus to receive a capability message from a UE indicating a multi-connectivity capability of the UE to support more than two concurrent active cell group connections, receive, from the UE, one or more measurement reports that provide measurement information for cells in proximity to the UE, determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station, transmit to the UE, responsive to the capability message and the one or more measurement reports, a multi-connectivity configuration that includes the cell group set, and communicate with the UE via the set of active cell groups in accordance with the multi-connectivity configuration.

Another apparatus for wireless communication at a base station is described. The apparatus may include means for receiving a capability message from a UE indicating a multi-connectivity capability of the UE to support more than two concurrent active cell group connections, receiving, from the UE, one or more measurement reports that provide measurement information for cells in proximity to the UE, determining, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station, transmitting to the UE, responsive to the capability message and the one or more measurement reports, a multi-connectivity configuration that includes the cell group set, and communicating with the UE via the set of active cell groups in accordance with the multi-connectivity configuration.

A non-transitory computer-readable medium storing code for wireless communication at a base station is described. The code may include instructions executable by a processor to receive a capability message from a UE indicating a multi-connectivity capability of the UE to support more than two concurrent active cell group connections, receive, from the UE, one or more measurement reports that provide measurement information for cells in proximity to the UE, determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station, transmit to the UE, responsive to the capability message and the one or more measurement reports, a multi-connectivity configuration that includes the cell group set, and communicate with the UE via the set of active cell groups in accordance with the multi-connectivity configuration.

Some examples of the method, apparatuses, and non-transitory computer-readable medium described herein may further include operations, features, means, or instructions for determining, based on the one or more measurement reports, that the cell group set may be to further include one or more inactive cell groups to which the UE may be connected but for which the UE lacks an allocation of uplink or downlink physical resources and including an identification of the one or more inactive cell groups in the multi-connectivity configuration.

Some examples of the method, apparatuses, and non-transitory computer-readable medium described herein may further include operations, features, means, or instructions for receiving from the UE one or more additional measurement reports identifying channel conditions associated with at least the set of active cell groups and the one or more inactive cell groups and transmitting an update to the multi-connectivity configuration based on the one or more additional measurement reports.

Some examples of the method, apparatuses, and non-transitory computer-readable medium described herein may further include operations, features, means, or instructions for determining that the update to the multi-connectivity configuration may be associated with adding an additional cell group to the cell group set, configuring a DU of the base station and associated with the additional cell group with a UE context of the UE and where transmitting the update to the multi-connectivity configuration includes transmitting a RRC signal indicating that the additional cell group may be to be added to the cell group set.

Some examples of the method, apparatuses, and non-transitory computer-readable medium described herein may further include operations, features, means, or instructions for transmitting updated radio bearer and cell group configuration information associated with the additional cell group.

In some examples of the method, apparatuses, and non-transitory computer-readable medium described herein, the additional cell group may be either an active cell group or an inactive cell group.

Some examples of the method, apparatuses, and non-transitory computer-readable medium described herein may further include operations, features, means, or instructions for determining that the update to the multi-connectivity configuration may be associated with activating an inactive cell group to an active cell group, indicating the activating to a DU of the base station and associated with the cell group to be activated via an flag and where transmitting the update to the multi-connectivity configuration includes transmitting a MAC CE or RRC signal indicating that the inactive cell group may have been changed to be an active cell group.

Some examples of the method, apparatuses, and non-transitory computer-readable medium described herein may further include operations, features, means, or instructions for determining that the update to the multi-connectivity configuration may be associated with deactivating an active cell group to an inactive cell group, indicating the deactivating to a DU of the base station and associated with the cell group to be deactivated via a flag and where transmitting the update to the multi-connectivity configuration includes transmitting a MAC CE or RRC signal indicating that the active cell group may have been changed to be an inactive cell group.

Some examples of the method, apparatuses, and non-transitory computer-readable medium described herein may further include operations, features, means, or instructions for determining that the update to the multi-connectivity configuration may be associated with releasing a cell group from the cell group set, releasing a UE context of the UE from a DU of the base station and associated with the cell group to be released and where transmitting the update to the multi-connectivity configuration includes transmitting a RRC signal indicating that either an active cell group or an inactive cell group may have been released and may be no longer a part of the cell group set.

Some examples of the method, apparatuses, and non-transitory computer-readable medium described herein may further include operations, features, means, or instructions for determining that two or more of the set of active cell groups may be controlling cell groups.

Some examples of the method, apparatuses, and non-transitory computer-readable medium described herein may further include operations, features, means, or instructions for transmitting, via a RRC message, an indicator that the two or more of the set of active cell groups may be controlling cell groups.

Some examples of the method, apparatuses, and non-transitory computer-readable medium described herein may further include operations, features, means, or instructions for transmitting an allocation of SRB resources for each of the controlling cell groups without also transmitting an indicator that the two or more of the set of active cell groups may be controlling cell groups.

Some examples of the method, apparatuses, and non-transitory computer-readable medium described herein may further include operations, features, means, or instructions for receiving a declaration of radio link failure (RLF) when RLF occurs on each of the controlling cell groups.

Some examples of the method, apparatuses, and non-transitory computer-readable medium described herein may further include operations, features, means, or instructions for receiving a report from the UE indicating one or more selected controlling cell groups from the controlling cell groups and transmitting at least one of SI notifications, PWS notifications, CN registration area notifications, or RAN notifications via the one or more selected controlling cell groups.

Some examples of the method, apparatuses, and non-transitory computer-readable medium described herein may further include operations, features, means, or instructions for transmitting an indication of which cell groups of the set of active cell groups may be to be configured for PDCP aggregation such that data associated with a DRB having a throughput requirement above at least one threshold may be distributed across the indicated cell groups having an aggregate throughput that satisfies the throughput requirement of the DRB.

In some examples of the method, apparatuses, and non-transitory computer-readable medium described herein, the at least one threshold may be a set of predetermined thresholds, with each of the set of predetermined thresholds corresponding to one of the indicated cell groups, and where the data associated with the DRB may be distributed across the indicated cell groups in accordance with the set of predetermined thresholds.

In some examples of the method, apparatuses, and non-transitory computer-readable medium described herein, the at least one threshold may be one or more conditional thresholds, with each of the one or more conditional thresholds corresponding to a predetermined quality of a link connection associated with the indicated cell groups.

Some examples of the method, apparatuses, and non-transitory computer-readable medium described herein may further include operations, features, means, or instructions for transmitting an indication of which cell groups of the set of active cell groups may be to be configured for PDCP replication such that data associated with a DRB having a latency or reliability requirement above at least one threshold may be replicated across the indicated cell groups.

In some examples of the method, apparatuses, and non-transitory computer-readable medium described herein, the indication includes one or more replication flags corresponding to each of the indicated cell groups.

Some examples of the method, apparatuses, and non-transitory computer-readable medium described herein may further include operations, features, means, or instructions for determining, at a CU of the base station and based on information received from the UE and associated DUs of the base station, which DRBs may be to be enabled for PDCP aggregation and which DRBs may be to be enabled for PDCP replication.

Some examples of the method, apparatuses, and non-transitory computer-readable medium described herein may further include operations, features, means, or instructions for determining, at a DU of the base station, which DRBs may be to be enabled for PDCP aggregation and which DRBs may be to be enabled for PDCP replication and signaling the determination to a CU of the base station.

Some examples of the method, apparatuses, and non-transitory computer-readable medium described herein may further include operations, features, means, or instructions for transmitting a conditional indication of which cell groups of the set of active cell groups may be to be configured for DRB PDCP aggregation and of which cell groups of the set of active cell groups may be to be configured for DRB PDCP replication.

Some examples of the method, apparatuses, and non-transitory computer-readable medium described herein may further include operations, features, means, or instructions for determining the cell group set occurs by a CU of the base station.

In some examples of the method, apparatuses, and non-transitory computer-readable medium described herein, the CU of the base station communicates with DUs of the base station corresponding to each cell group of the cell group set via an F1 interface or a W1 interface.

In some examples of the method, apparatuses, and non-transitory computer-readable medium described herein, the set of cell groups included in the cell group set include cell groups for both NR and LTE RATs.

In some examples of the method, apparatuses, and non-transitory computer-readable medium described herein, the set of cell groups included in the cell group set include cell groups for a same type of RAT.

Some examples of the method, apparatuses, and non-transitory computer-readable medium described herein may further include operations, features, means, or instructions for determining a number of the set of cell groups to be included in the cell group set based on the multi-connectivity capability of the UE, service requirements of DRBs configured for the UE, throughput or reliability requirements of DRBs configured for the UE, a location of the UE, channel conditions affecting communications with the UE, battery resources of the UE, other device resource conditions having an effect on capabilities of the UE, or combinations thereof.

In some examples of the method, apparatuses, and non-transitory computer-readable medium described herein, each of the set of cell groups of the cell group set includes a set of cells configured for a same DU of the base station and managed by a single MAC entity, and where all of the set of cell groups of the cell group set may be associated with a same CU of the base station.

BRIEF DESCRIPTION OF THE DRAWINGS

FIGS. 4A, 4B, and 4C illustrate examples of protocol stacks that support mobility robustness and spatial reliability using multi-connectivity in accordance with aspects of the present disclosure.

DETAILED DESCRIPTION

Figure 1:
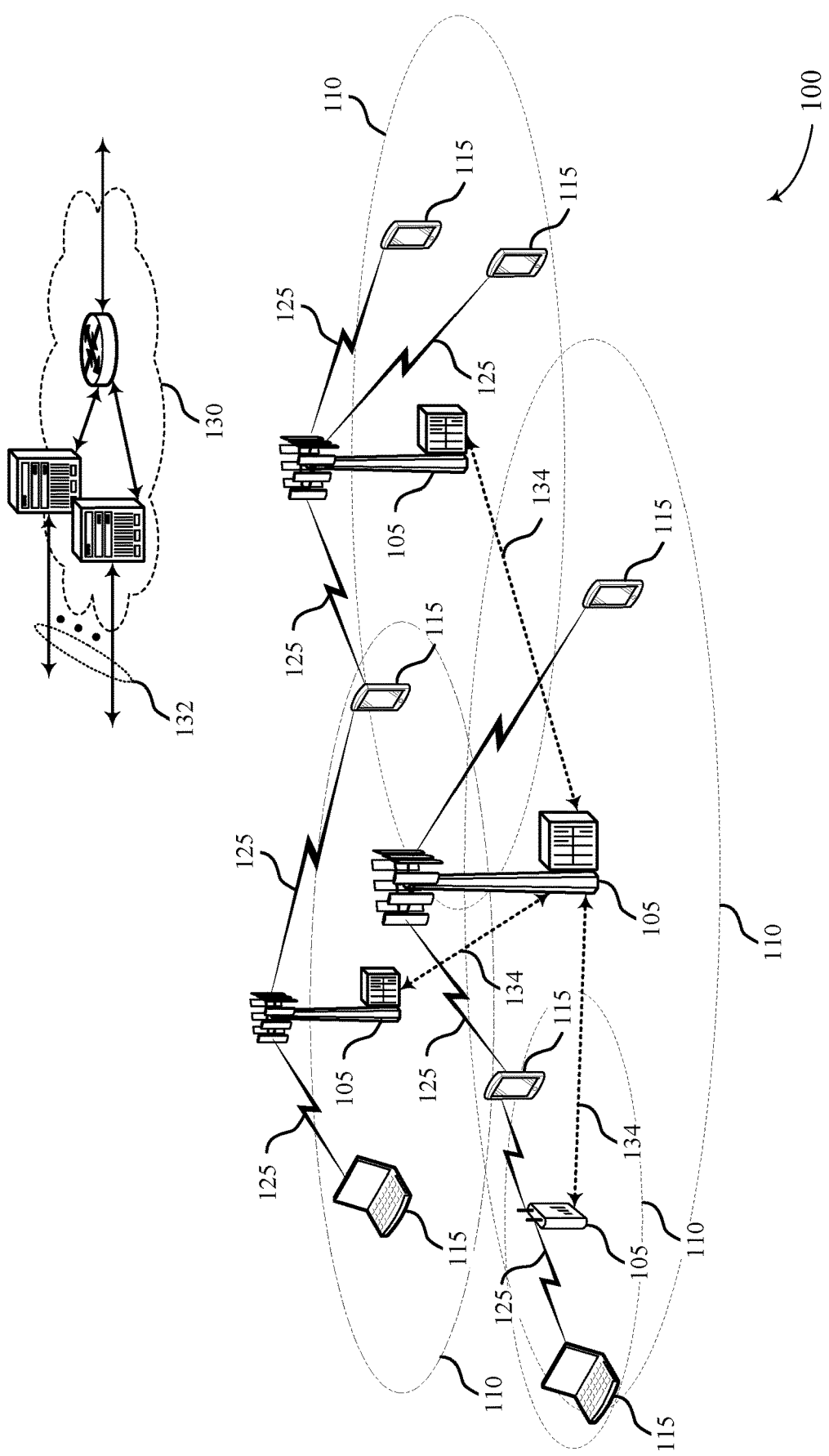
FIG. 1 illustrates an example of a system for wireless communications that supports mobility robustness and spatial reliability using multi-connectivity in accordance with aspects of the present disclosure.

A wireless communications system may support multi-connectivity for a user equipment (UE) with multiple distributed units (DUs) under one central unit (CU). For example, a base station may include one CU and multiple DUs (e.g., three or more), where each DU is configured with a cell group. The UE may establish radio resource control (RRC) connections with multiple cell groups corresponding to multiple DUs under the CU. The UE may maintain a set of cell groups with established RRC connections. In some cases, the UE may further maintain a set of active cell groups and a set of inactive cell groups. Cell groups in the set of active cell groups may be allocated physical resources to communicate with the UE. Cell groups in the set of inactive cell groups may still have an RRC connection established, but may not have physical resources allocated.

Some cell groups may include signaling radio bearer (SRB) resources and be referred to as a controlling cell group. The UE may receive control information via controlling cell groups. In some cases, the UE may have multiple controlling cell groups. In some examples, the UE may declare radio link failure (RLF) only if RLF is detected for all of the controlling cell groups. In some examples, one controlling cell group may have better conditions or performance metrics than other controlling cell groups, and the controlling cell group (or, in some cases, the multiple controlling cell groups) with the best conditions or performance metrics may be identified as one or more selected controlling cell groups to the UE. The one or more selected controlling cell groups may be used to transmit high urgency or high reliability messages to the UE.

In some cases, the multi-connectivity scheme may support packet data convergence protocol (PDCP) replication, wherein data to be transmitted on a data radio bearer (DRB) is replicated across multiple communication links corresponding to multiple cell groups. For example, the UE may replicate an uplink packet and transmit the uplink packet using multiple cell groups of the multi-connectivity scheme. Additionally, the multi-connectivity scheme may support PDCP aggregation, wherein data to be transmitted on a DRB is distributed across multiple communication links corresponding to multiple cell groups. PDCP replication and aggregation may be triggered due to various DRB-related thresholds being satisfied (e.g., latency, reliability, or throughput thresholds).

The UE and the base station may implement techniques for one or more of adding, activating, deactivating, and releasing a cell group from the set of cell groups configured for the UE. The UE and base station may also implement techniques to activate or deactivate PDCP uplink replication and to update a cell group set of the UE. The UE and the base station may also implement techniques to support seamless handover across cell groups. In some cases, based on having multiple connections to the base station, the UE may be able handed over from one cell group to another without packet loss.

Aspects of the disclosure are initially described in the context of a wireless communications system. Aspects of the disclosure are further illustrated by and described with reference to apparatus diagrams, system diagrams, and flowcharts that relate to mobility robustness and spatial reliability using multi-connectivity.

FIG. 1 illustrates an example of a wireless communications system 100 that supports mobility robustness and spatial reliability using multi-connectivity in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The media access control (MAC) layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may establish an RRC connection with multiple cell groups, where each cell group corresponds to a DU under a CU, the DUs and the CU belonging to a base station 105. The UE 115 may maintain a set of active cell groups and a set of inactive cell groups. Cell groups in the set of active cell groups may be allocated physical resources to communicate with the UE 115. Cell groups in the set of inactive cell groups may still have an RRC connection established, but may not have physical resources allocated.

The UE 115 and the base station 105 may implement techniques for one or more of adding, activating, deactivating, and releasing a cell group from the set of cell groups configured for the UE 115. The UE 115 and the base station 105 may also implement techniques to activate or deactivate PDCP uplink replication and to update a cell group set of the UE 115. The UE 115 and the base station 105 may also implement techniques to support seamless handover across cell groups. In some cases, based on having multiple connections to the base station, the UE 115 may be able handed over from one cell group to another without packet loss.

Figure 2:
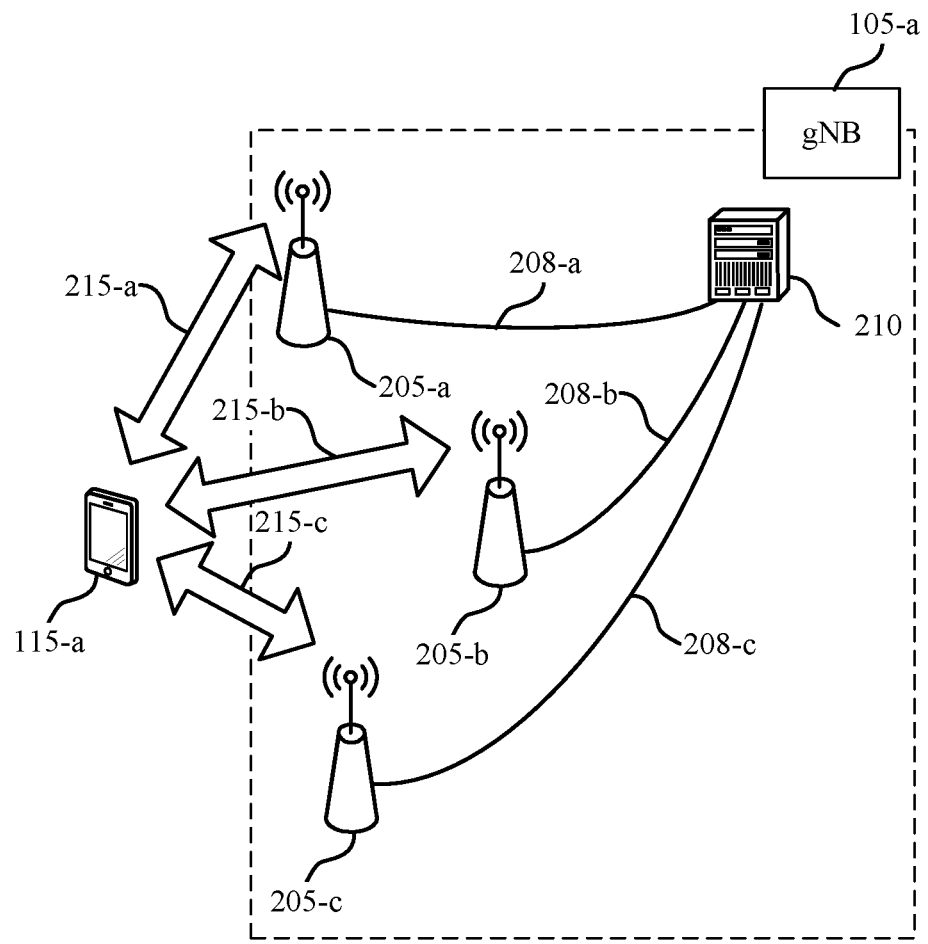
FIG. 2 illustrates an example of a wireless communications system that supports mobility robustness and spatial reliability using multi-connectivity in accordance with aspects of the present disclosure.

FIG. 2 illustrates an example of a wireless communications system 200 that supports mobility robustness and spatial reliability using multi-connectivity in accordance with aspects of the present disclosure. In some examples, wireless communications system 200 may implement aspects of wireless communications system 100.

The wireless communications network 200 may include UE 115-a and base station 105-a. UE 115-a may be an example of a UE 115 as described herein. Base station 105-a may be an example of a base station 105 as described herein, such as a gNB or a next-generation eNB (e.g., an ng-eNB) as described herein.

The wireless communications network 200 may implement techniques for multi-connectivity across DUs 205. Base station 105-a may include a CU 210 as well as multiple DUs 205. Each DU 205 may support one or more cells in a cell group 215. A DU 205 may handle a subset of functions of base station 105-a, while the CU 210 handles the rest of the functions of base station 105-a. In some cases, the CU 210 may handle operations such as mobility control, scheduling determinations, radio access network sharing, positioning, etc., while the DUs 205 interface with UE 115-a via an over-the-air (OTA) transmission medium.

UE 115-a may establish RRC connections with multiple cell groups 215 corresponding to multiple DUs 205 under a single CU 210. Each cell group 215 may correspond to a DU 205, and UE 115-a may have multiple cell groups 215 established via multiple DUs 205. For example, UE 115-a may wireless communicate with DU 205-a via cells of cell group 215-a, with DU 205-b via cells of cell group 215-b, and with DU 205-c via cells of cell group 215-c. DU 205-a, DU 205-b, and DU 205-c may each connect to the CU 210 via connections 208-a, 208-b, and 208-c, respectively. The connections 208 may include, for example, an F1-U interface and an F1-C interface to respectively communicate user plane information and control plane information. A CU 210 with a split user plane and control plane is described in more detail in FIG. 3. In some cases, the wireless communications network 200 may support one or more of DU multi-connectivity, carrier aggregation, and dual connectivity simultaneously.

UE 115-a may indicate the capability to support multi-connectivity to the network (e.g., the CU 210) based on the radio frequency capabilities of UE 115-a. The network may use the indication to determine whether multi-connectivity features and procedures are enabled for UE 115-a in the RRC connected state. In some cases, a number of cell groups configured for UE 115-a may be based on the capabilities of UE 115-a, or based on the service requirements of the radio bearers configured for UE 115-a. The CU 210 may select a set of cell groups 215 for UE 115-a and transmit a configuration including the set of active cell groups to UE 115-a. UE context may be exchanged when a cell group is added, removed, activated, or deactivated, such that the CU 210 has information on which DUs 205 are active, inactive, controlling cell groups (e.g., have resources allocated for an SRB), or non-controlling cell groups for a particular UE context.

Each DU 205 may include a radio link control (RLC) entity and a media access control (MAC) entity, such that UE 115-a may establish RRC connection management for each of the cell groups 215. The multi-connectivity scheme may further implement techniques for radio link failure (RLF) enhancements to minimize reestablishment scenarios. For example, multiple cell groups 215 may be established as controlling cell groups, where RLF is only declared for the base station 105-a if each of the controlling cell groups declare RLF. In some cases, RLF may be declared for if a percentage or number of controlling cell groups which declare RLF is above at least one threshold. In some cases, a controlling cell group may be similar to a master cell group in a dual connectivity scheme. However, a UE 115 established for multi-connectivity may be capable of having multiple controlling cell groups.

Base station 105-a may use UE-assisted cell group management and mobility. The UE-assisted cell group management and mobility may enable the addition and release of additional cells without interruption to UE 115-a. For example, multiple cell groups may be configured to transmit control or data information to UE 115-a, in some cases redundant control or data information to improve transmit diversity. Thus, if a cell group 215 is added or released, activated or deactivated, or handed over, UE 115-a may still reliably receive the data or control information. UE 115-a may provide measurement reports based on different measurement trigger events to assist the CU 210 with cell group selection. For example, UE 115-a may perform neighbor cell and/or serving cell reports (e.g., neighbor cells and serving cell that are in proximity to UE 115-a). In some cases, one or more measurement reports performed by the UE 115-a may correspond to one or more serving cells (e.g., cells associated with a DU or CU of base station 105-a). Additionally or alternatively, one or more measurement reports performed by the UE 115-a may correspond to one or more neighbor cells (e.g., cells not associated with a DU or CU of base station 105-a). In some cases, the measurement reports may assist the CU 210 in determining one or more selected controlling cell groups (e.g., one or more controlling cell groups having better conditions or performance metrics than other controlling cell groups) for UE 115-a. UE-assisted cell group management and mobility is described in more detail in FIG. 6.

In some cases, base station 105-a may support PDCP aggregation, replication, or switching across a subset of cell groups 215. The PDCP aggregation, replication, or switching may be supported for both SRBs and DRBs, where SRBs may be used for transmission of RRC and non-access stratum (NAS) message, and DRBs may be used to carry user plane traffic. In PDCP replication, PDCP packets may be replicated to additional logical channels so that the PDCP packets are transmitted on additional carriers. Thus, PDCP replication may increase transmit diversity and improve reliability of receipt for PDCP packets. PDCP replication may be supported for uplink transmission or downlink transmission. For example, UE 115-a may replicate a PDCP packet for transmission on additional component carriers of cell group 215-a, or replicate the PDCP packet for transmission on one or more component carriers of cell group 215-b and one or more component carriers of cell group 215-c. Similarly, base station 105-a may replicate a PDCP packet on one or more component carriers of one or more cell groups 215 for transmission to UE 115-a In some cases, a cell may be supported by a single DU 205, and each DU 205 may connect to a single CU 210. For example, the cells of cell group 215-a are supported by DU 205-a, the cells of cell group 215-b are supported by DU 205-b, and the cells of cell group 215-c are supported by DU 205-c. Further, DU 205-a, DU 205-b, and DU 205-c each connect to the CU 210 via the connections 208.

In some cases, the wireless communications system 200 may be an example of a wireless communications network implemented in a factory or a production line. The multi-connectivity scheme may be useful for providing improved reliability if, for example, a mechanical part such as a machine arm physically blocks a transmission from one DU 205 to UE 115-a. UE 115-a, having multiple established cell groups with multiple DUs 205, may still reliably receive transmissions from another active cell group, such as receiving control information from another controlling cell group. Beneficially, receiving transmissions from another active cell group in a reliable manner may assist one or more transceivers of the UE to perform effective low latency communications. In another example, the wireless communications system 200 may support mmW, where mmW signals may be physically blocked by an obstructing object and have significantly reduced signal strength. By employing DU multi-connectivity, the wireless communications system 200 may provide connections using multiple DUs 205, such that if mmW signals from one DU 205 to a UE 115 become blocked, the UE 115 may have connections with multiple other DUs 205 to still receive the information transmitted in the blocked mmW signal.

Figure 3:
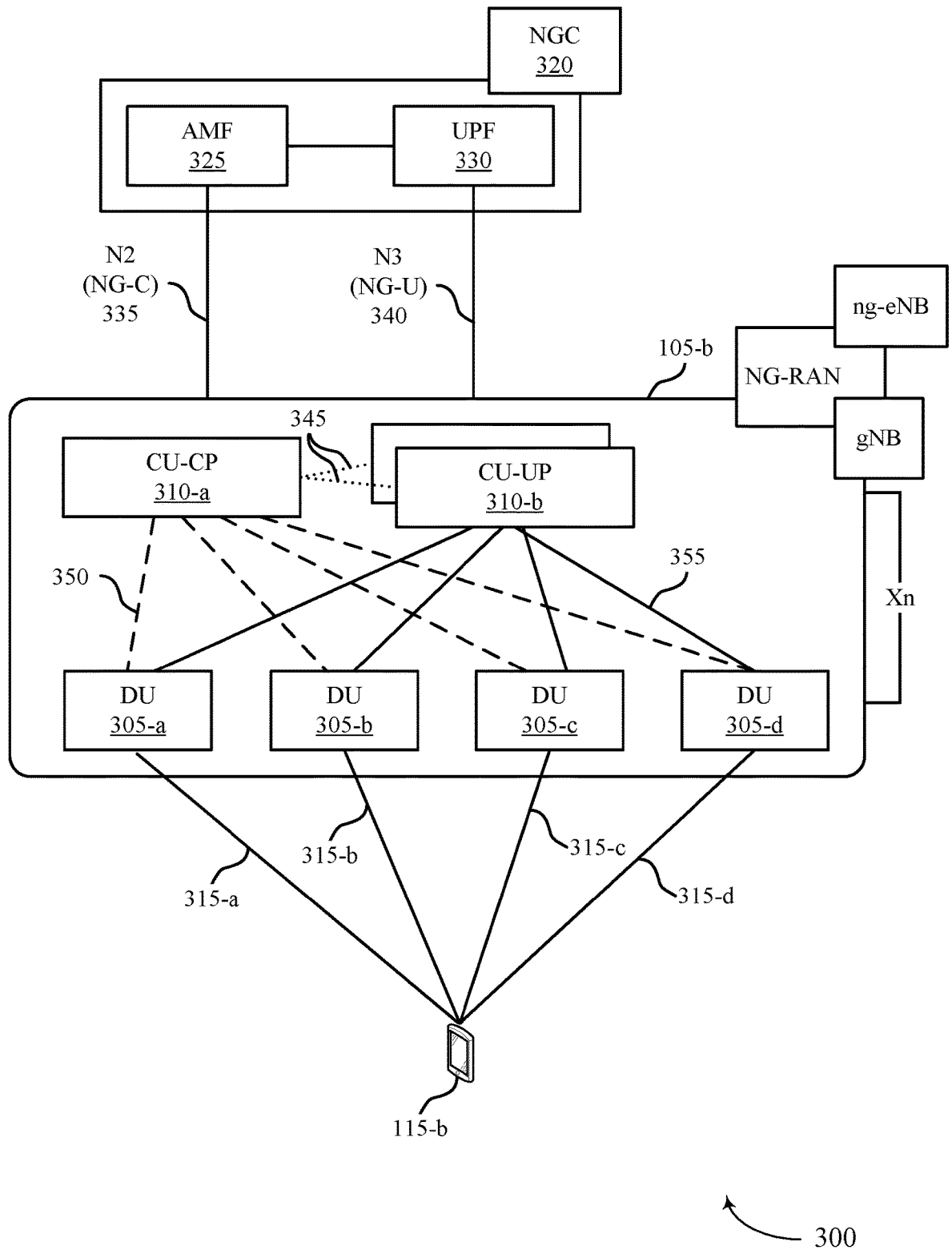
FIG. 3 illustrates an example of a multi-connectivity scheme that supports mobility robustness and spatial reliability using multi-connectivity in accordance with aspects of the present disclosure.

FIG. 3 illustrates an example of a multi-connectivity scheme 300 that supports mobility robustness and spatial reliability using multi-connectivity in accordance with aspects of the present disclosure. In some examples, multi-connectivity scheme 300 may implement aspects of wireless communications system 100.

As described in FIG. 2, base station 105-b may include a CU 310 and multiple DUs 305. The CU 310 may include a control plane (CP) entity of the CU 310, referred to as CU-CP 310-a, and one or more user plane entities of the CU 310, referred to as a CU-UP 310-b.

The CU-CP 310-a may be connected to a DU 305 through an control plane interface 350. In some cases, a DU 305 may connect to a single CU-CP 310-a. CU-CP 310-a may select one or more CU-Ups 310-b for services requested by UE 115-b. A CU-UP 310-b may connect to the CU-CP 310-a through an E1 interface 345. A CU-UP 310-b may connect to a DU 305 through an user plane interface 355. In some cases, a CU-UP 310-b may be connected to a single CU-CP 310-a. A DU 305 may belong to a gNB enabled for NR communications (e.g., an NR DU), or the DU 305 may belong to an ng-eNB enabled for LTE communications (e.g., an LTE DU). An NR DU may connect to the CU 310 via the F1-C interface 350 and the F1-U interface 355. An LTE DU may connect to the CU 310 using a W1-C interface for the control plane and a W1-U interface for the user plane.

One CU-UP 310-b may be connected to multiple DUs 305 under control of the same CU-CP 310-a. In some cases, connectivity between a CU-UP 310-b and a DU 305 may be established by CU-CP 310-a using bearer context management functions. In some examples, data forwarding between CU-UPs 310-b may be supported by a link such as Xn-U.

Base station 105-b may connect to an access and mobility function (AMF) 325 and a user plane function (UPF) 330 of a Next Generation Core (NGC) 320. The AMF 325 may generally handle control function of the NGC 320, including mobility within the wireless network and UE authentication. The UPF 330 may generally handle user services by connecting to a data network to provide services for UE 115-b. Base station 105-b may connect to the AMF 325 via an N2 interface 335 and connect to the UPF 330 via an N3 interface 340.

UE 115-b may establish multiple cell groups 315 with multiple DUs 305. For example, UE 115-b may establish cell group 315-a with DU 305-a, cell group 315-b with DU 305-b, cell group 315-c with DU 305-c, and cell group 315-d with DU 305-d. Each DU 305, if active, may provide one or more component carriers in a corresponding cell group 315.

In some examples, a wireless communications system supporting multi-connectivity may additionally support standalone NR gNB, non-standalone NR-E-UTRA (NE) dual connectivity, standalone LTE ng-eNB, or non-standalone NGEN-DC-NG-RAN E-UTRA-NR dual connectivity. In some examples, dual connectivity (e.g., multi-RAT dual connectivity or NR-NR) may be extended to more than two DUs 305 under the same harmonized CU 310.

FIGS. 4A, 4B, and 4C illustrate examples of protocol stacks 400-a, 400-b, and 400-c that support mobility robustness and spatial reliability using multi-connectivity in accordance with aspects of the present disclosure. In some examples, the protocol stacks 400 may implement aspects of wireless communications system 100.

FIG. 4A shows a protocol stack 400-a for carrier aggregation, including a CU/DU split for a single bearer. Protocol stack 400-a includes a single CU 410-a and a single DU 405-a. The DU 405-a may provide one or more component carriers (CCs) 430 in a cell group. For example, DU 405-a may provide CC1 430-a, CC2 430-b, CC3 430-c, and CC4 430-d. The CU 410-a may include a single PDCP entity 415-a, the single PDCP entity 415 used across the CCs 430 provided by the DU 405-a. The DU 405-a may include a single RLC entity 420-a and a single MAC entity 425-a for the CCs 430 provided by the DU 405-a.

FIG. 4B shows a protocol stack 400-b for DU multi-connectivity, including a CU/DU split for a single bearer. Protocol stack 400-b includes a single CU 410-b and two DUs 405, including DU 405-b and DU 405-c. In some other examples, the protocol stack 400-b may include more DUs 405 (e.g., 3 or more DUs 405). In some cases, the CU-CP 410-b may be split into a CU-CP and a CU-UP as described in FIG. 3. The DUs 405 may provide one or more CCs 430 in a cell group. For example, DU 405-a may provide CC1 430-e and CC2 430-f of a first cell group, and DU 405-c may provide CC3 430-g and CC4 430-h of a second cell group. The CU 410-a may include a single PDCP entity 415-a, the single PDCP entity 415 used across the CCs 430 provided by the DU 405-b and the DU 405-c. Each DU 405 may include an RLC entity 420 and a MAC entity 425. For example, DU 405-b includes RLC entity 420-b and MAC entity 425-b, and DU 405-c includes RLC entity 420-c and MAC entity 425-c.

FIG. 4C shows a protocol stack 400-c for dual connectivity with a CU/DU split for a single bearer. The protocol stack 400-c may use a single CU 410-c and two DUs 405, where DU 405-d is under CU 410-c and DU 405-e is under CU 410-d. DU 405-d and DU 405-e may both share PDCP entity 415-c of CU 410-c. CU 410-d may also include a PDCP entity 415, but the protocol stack 400-c may use just the PDCP entity 415-c of CU 410-c for single bearer dual connectivity. DU 405-d may include RLC entity 420-d and MAC entity 425-d, and DU 405-e may include RLC entity 420-e and MAC entity 425-e. Therefore, each DU 405 may provide a separate RLC entity 420 and MAC entity 425, and different cell groups may use different RLC and MAC entities. For example, CC1 430-$i$ and CC2 430-$j$ may use different MAC and RLC entities than CC3 430-$k$ and CC4 430-$l$.

Figure 5:
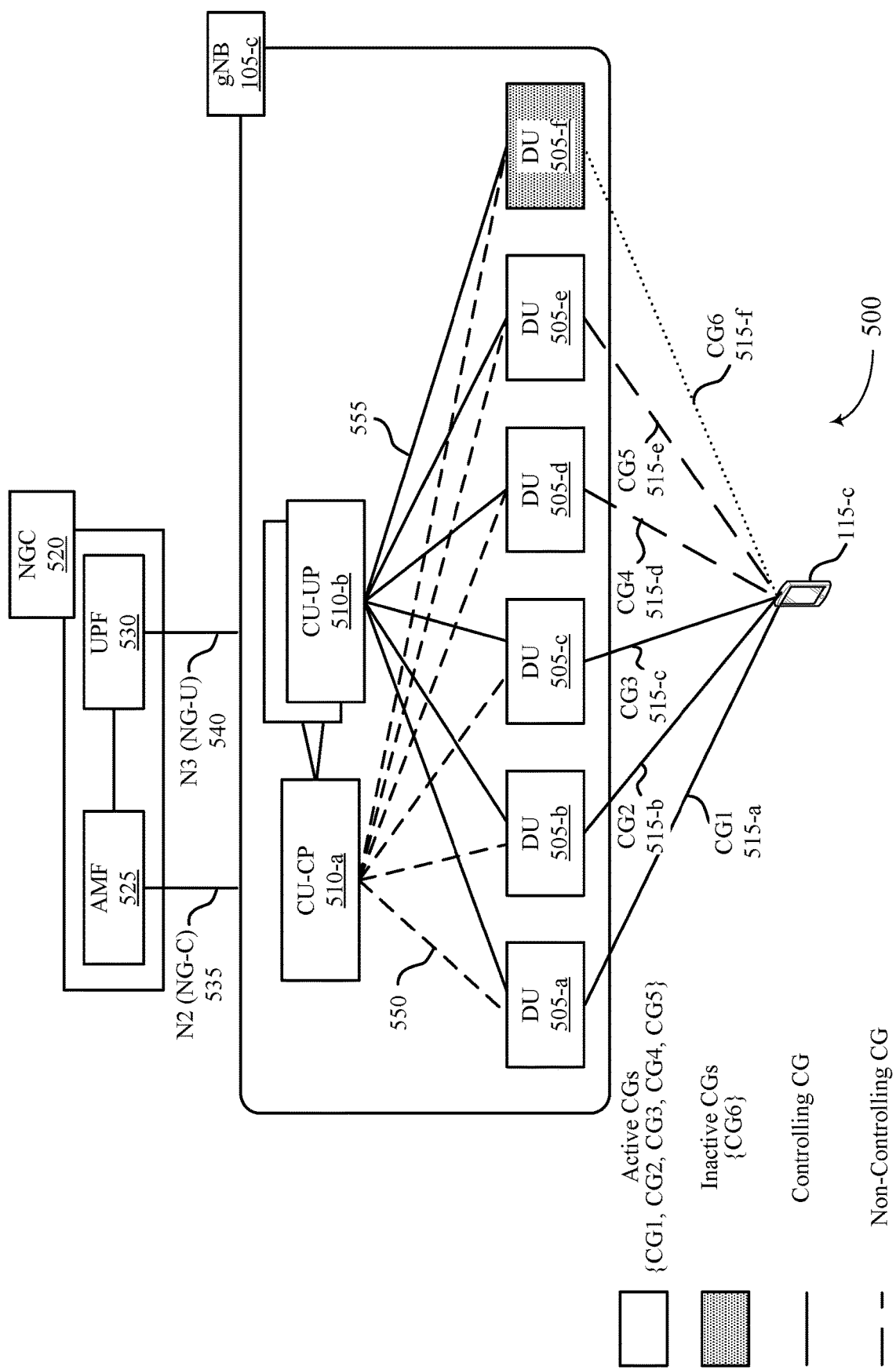
FIG. 5 illustrates an example of a multi-connectivity scheme that supports mobility robustness and spatial reliability using multi-connectivity in accordance with aspects of the present disclosure.

FIG. 5 illustrates an example of a multi-connectivity scheme 500 that supports mobility robustness and spatial reliability using multi-connectivity in accordance with aspects of the present disclosure. In some examples, multi-connectivity scheme 500 may implement aspects of wireless communications system 100.

The multi-connectivity scheme 500 implement aspects of a multi-connectivity scheme 300 as described in FIG. 3. For example, base station 105-$c$ may include a CU 510 and multiple DUs 505. The CU 510 may be split into a CU-CP 510-$a$ for the control plane and one or more CU-UP 510-$b$ for the user plane. The CU-CP 510-$a$ may connect to the CU-UPs 510-$b$, such as by an E1 interface. Base station 105-$c$ may connect to an AMF 525 of an NGC 520, for example through an N2 interface 535, and base station 105-$c$ may connect to a UPF 530 of the NGC 520, for example by an N3 interface 540. The CU-CP 510-$a$ may connect to a DU 505 by a control plane interface 550, and a CU-UP 510-$b$ may connect to a DU 505 by user plane interface 555. The control plane interface 550 may be an example of an F1-C interface for a gNB or a W1-C interface for an ng-eNB. The user plane interface ay be an example of an F1-U interface for a gNB or a W1-U interface for an ng-eNB.

Each DU 505 may provide a cell group 515, each cell group 515 consisting of a set of cells or component carriers which may be used to communicate with UE 115-$c$. In some cases, UE 115-$c$ may communicate with a DU 505 on multiple cells of a cell group 515 using carrier aggregation. In the illustrated example, DU 505-$a$ may provide cell group 515-$a$ (e.g., CG1), DU 505-$b$ may provide cell group 515-$b$ (e.g., CG2), DU 505-$c$ may provide cell group 515-$c$ (e.g., CG3), DU 505-$d$ may provide cell group 515-$d$ (e.g., CG4), DU 505-$e$ may provide cell group 515-$e$ (e.g., CG5), and DU 505-$f$ may provide cell group 515-$f$ (e.g., CG6). Cell groups 515-$a$ through 515-$f$ (e.g., CG1 through CG6) may be configured for UE 115-$c$, where the set of cell groups is referred to as a cell group set (e.g., a CGSet).

The set of cell groups may include a set of active cell groups and a set of inactive cell groups. UE 115-$c$ may have an active RRC connection established with cell groups 515 included in the set of active cell groups. For example, cell groups 515-$a$ through 515-$e$ may be active cell groups, and UE 115-$c$ may have established RRC connections with cell groups 515-$a$ through 515-$e$. In some cases, UE 115-$c$ may perform RRC_Connected mode operations with the active cell groups.

Cell groups 515 in the set of inactive cell groups may be in a dormant state without air interface resources for an SRB or a DRB allocated to UE 115-$c$. In some cases, inactive cell groups may be primary candidates for moving in and out of the active cell group set. In some examples, UE 115-$c$ may periodically perform measurements on inactive cell groups. For example, UE 115-$c$ may periodically measure cell group 515-$f$ and report the periodic measurements, which may assist base station 105-$c$ in selecting cell groups to add or remove from the set of active cell groups. Cell groups may be activated or deactivated by a MAC control element (CE) or by an RRC message. Cell group activation is described in more detail in FIG. 9, and cell group deactivation is described in more detail in FIG. 11.

The set of active cell groups may further include a set of controlling cell groups and a set of non-controlling cell groups. Controlling cell groups may have an SRB configured and be used for RLF declaration. For example, cell group 515-$a$, cell group 515-$b$, and cell group 515-$c$ may be the controlling cell groups for UE 115-$c$. In some cases, base station 105-$c$ and UE 115-$c$ may determine RLF for the multi-connectivity has occurred only if RLF has occurred for each of the controlling cell groups. If, for example, cell group 515-$a$ is unable to meet a quality of service to stay as an active or a connected cell group, UE 115-$c$ may still maintain an SRB connection with the other controlling cell groups, including cell groups 515-$b$ and cell groups 515-$c$. A non-controlling cell group may be switched to a controlling cell group by allocating SRB resources to the non-controlling cell group.

In some cases, the set of controlling cell groups may include a best controlling cell group. The best controlling cell group may be the controlling cell group with the highest signal quality. Base station 105-$c$ may select a best controlling cell group to inform the NGC 520 of a reliable cell group to transmit high importance notifications and paging messages. In some cases, the best cell group(s) may be selected to avoid transmitting high importance notifications and paging messages on each controlling cell group. The best controlling cell group may transmit system information system information notifications to UE 115-$c$. The SI system notification may indicate UE 115-$c$ of changes to system information, and UE 115-$c$ may transmit a request for a system information update based on the system information notification. The best cell group may also be used to transmit public warning system (PWS) notifications, core network registration area messages, or RAN notification area management messages to UE 115-$c$. In some cases, base station 105-$c$ may select more than one best controlling cell group and transmit these messages on the more than one best controlling cell group. In some cases, base station 105-$c$ may avoid transmitting these messages on controlling cell groups that are not selected as the best controlling cell group(s).

Figure 6:
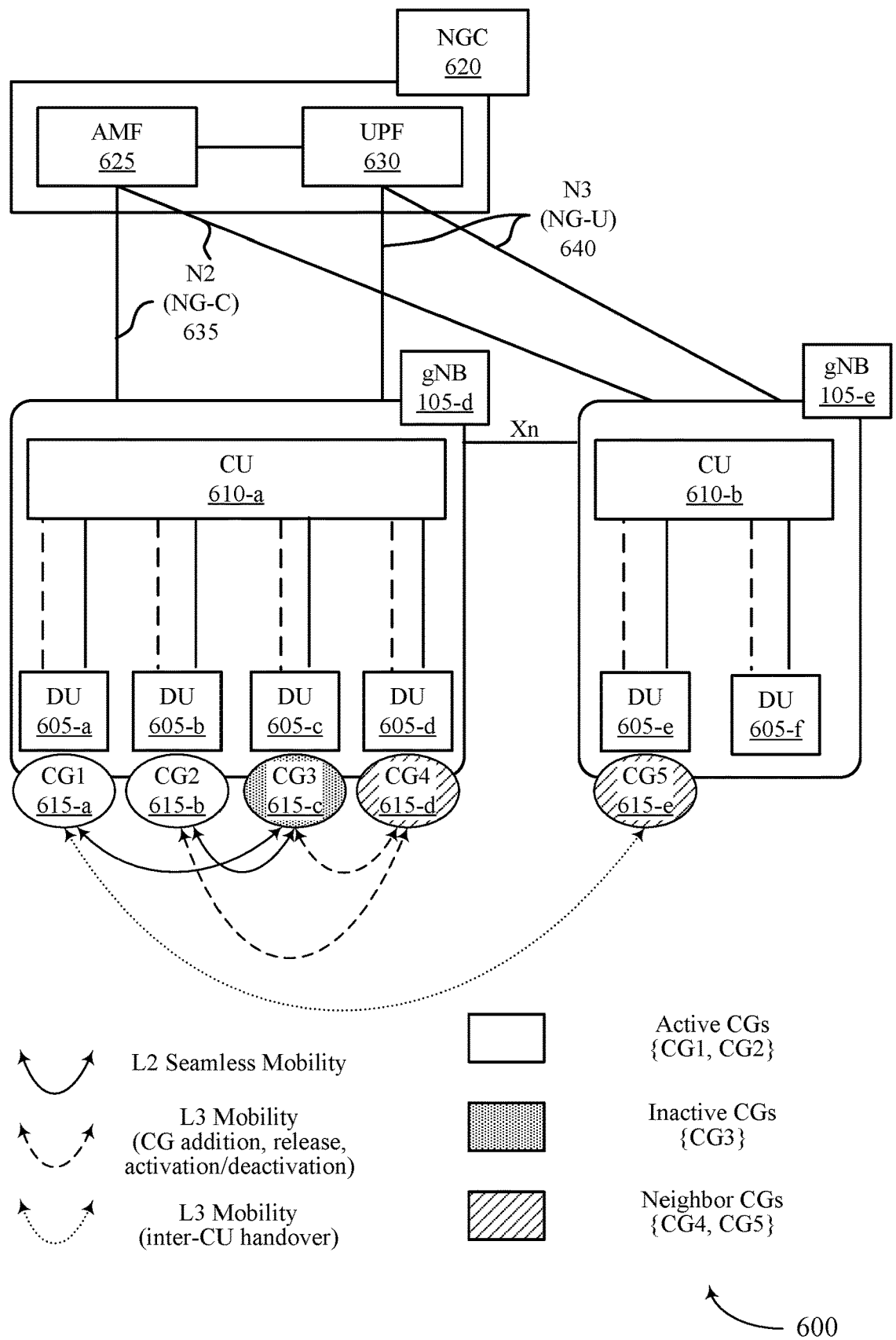
FIG. 6 illustrates an example of multi-connectivity mobility that supports mobility robustness and spatial reliability using multi-connectivity in accordance with aspects of the present disclosure.

FIG. 6 illustrates an example of multi-connectivity mobility 600 that supports mobility robustness and spatial reliability using multi-connectivity in accordance with aspects of the present disclosure. In some examples, multi-connectivity mobility 600 may implement aspects of wireless communications system 100.

Base station 105-$d$ and base station 105-$e$ may each connect to an AMF 625 of an NGC 620 using respective N2 interfaces 635 and may each connect to a UPF 635 of the NGC 620 through respective N3 interfaces 640. Base station 105-$d$ and base station 105-$e$ may communicate using an Xn interface, such as backhaul links.

Base station 105-$d$ may include CU 610-$a$ and four DUs 605. Cell group 615-$a$ (e.g., CG1) may be configured for DU 605-$a$, cell group 615-$b$ (e.g., CG2) may be configured for DU 605-$b$, cell group 615-$c$ (e.g., CG3) may be configured for DU 605-$c$ may provide, and cell group 615-$d$ (e.g., CG4) may be configured for DU 605-$d$. The DUs 605 may communicate with the CU 610 via an F1-C interface for control plane information and an F1-U interface for user plane information. In some cases, the DUs 605 may also communicate with the CU 610 via an W1-C interface for control plane information and an W1-U interface for user plane information, for example if the DU is a next generation E-UTRAN nodeB (ng-eNB). Base station 105-$e$ may include CU 610-$b$ and two DUs 605. Cell group 615-$e$ (e.g., CG5) may be configured for DU 605-$e$, and there may not be a cell group 615 configured for DU 605-$f$. A UE 115 may have a cell group set of cell group 615-$a$ through 615-$c$, where the neighbor cell groups (e.g., cell group 615-$d$ and 615-*e*) are known by the UE and the base stations 105, but not added to the cell group set of the UE 115.

The following describes techniques for handling mobility of the UE 115, where a cell group 615 is added or removed from the set of cell groups configured for the UE 115. For example, the UE 115 may transmit, on an SRB of a controlling cell group, a measurement report for an inactive cell group or a neighbor cell group to base station 105-*d*. The CU 610-*a* may determine to add the inactive cell group to the set of active cell groups configured for the UE 115, or add a neighbor cell group to the set of active or inactive cell groups configured for the UE 115. In another example, the UE 115 may transmit a measurement report that an active cell group has poor performance or signal quality. The base station 105-*d* may determine to remove the active cell group with poor performance or signal quality from the set of cell groups configured for the UE 115. Or, in another example, the base station 105-*d* may determine to make the active cell group with poor performance an inactive cell group (e.g., no SRB or DRB resources allocated), but maintain the cell group in the set of cell groups configured for the UE 115.

The multi-connectivity scheme may support seamless mobility across DUs 605 via layer 2 (L2) and layer 3 (L3) signaling. L2 signaling may include signaling between service data adaptation protocol (SDAP), PDCP, RLC, and MAC layers. For example, L2signaling may include transmitting a MAC CE between two MAC entities at different DUs 605. L3 signaling may include signaling between RRC entities, for example including configuring or re-configuring an RRC connection. For an L3 controlled cell group set, measurement reports from served UEs 115 may be used for managing the cell group set. In some cases, RRC may control cell group addition and release. The multi-connectivity scheme may also support cell group activation and deactivation via L2 or L3 signaling. Activation and deactivation of a cell group may be controlled by a MAC CE or RRC reconfiguration. In some cases, activation of a cell group 615 may imply that the UE 115 can perform normal RRC connected state procedures on the cell group 615. Before signaling the UE 115, the CU 610 may configure the DUs 605 to activate or deactivate UE resources over an F1 interface or a W1 interface.

Multi-connectivity via multiple cell groups 615 (e.g., including active cell groups and inactive cell groups) may enable faster mobility across DUs 605. An L3 controlled cell group set may use measurement reports for managing the cell group set. RRC controls may be used for cell group addition and release. Cell group activation and deactivation may be controlled by Layer 2 or Layer 3, or both. For example, activation and deactivation of a cell group 615 may be controlled by a MAC CE or by RRC reconfiguration. Controlling activation and deactivation by transmitting a MAC CE may enable seamless and fast switching across DUs 605.

As shown, the multi-connectivity scheme may support seamless L2 mobility between configured cell groups. L2 mobility may refer to cell group activation or deactivation using L2 signaling. Using L2 signaling, a UE 115 may be able to switch between cell group 615-*a*, cell group 615-*b*, and cell group 615-*c* quickly and without interruption of services provided by base station 105-*d*, as handover occurs by transmitting a MAC CE instead of re-establishing RRC. The multi-connectivity scheme may also support L3 mobility between activated cell groups and neighbor cell groups of the same base station 105. For example, base station 105-*d* may use L3 signaling add cell group 615-*d* using L3 signaling to the set of cell groups configured for the UE 115.

In some cases, an inter-base station handover may occur when the UE 115 is handed over from a first cell group 615 configured by a first DU 605 at a first base station 105 to a second cell group 615 configured by a second DU 605 at a second base station 105. For example, the UE 115 may be handed over from cell group 615-*a*, configured for DU 605-*a* at base station 105-*d*, to cell group 615-*e*, configured for DU 605-*e* at base station 105-*e*. In some cases, base station 105-*d* and base station 105-*e* may exchange information (e.g., UE context, RRC information, etc.) to add cell group 615-*e* to the set of cell groups configured for the UE 115. In some cases, the UE 115 may configure an RRC establishment with cell group 615-*e* to add the cell group to the set of cell groups configured for the UE 115. Inter-base station handover is described in more detail in FIG. 14.

A UE 115 may also be handed over between beams of a cell or between cells of a cell group 615. For example, the UE 115 may use level 1 (L1) (e.g., PHY layer) signaling to support beam-level mobility. The UE 115 may use L3 signaling for a handover from a primary cell in the DU 605 to a secondary cell in the same DU 605.

Figure 7:
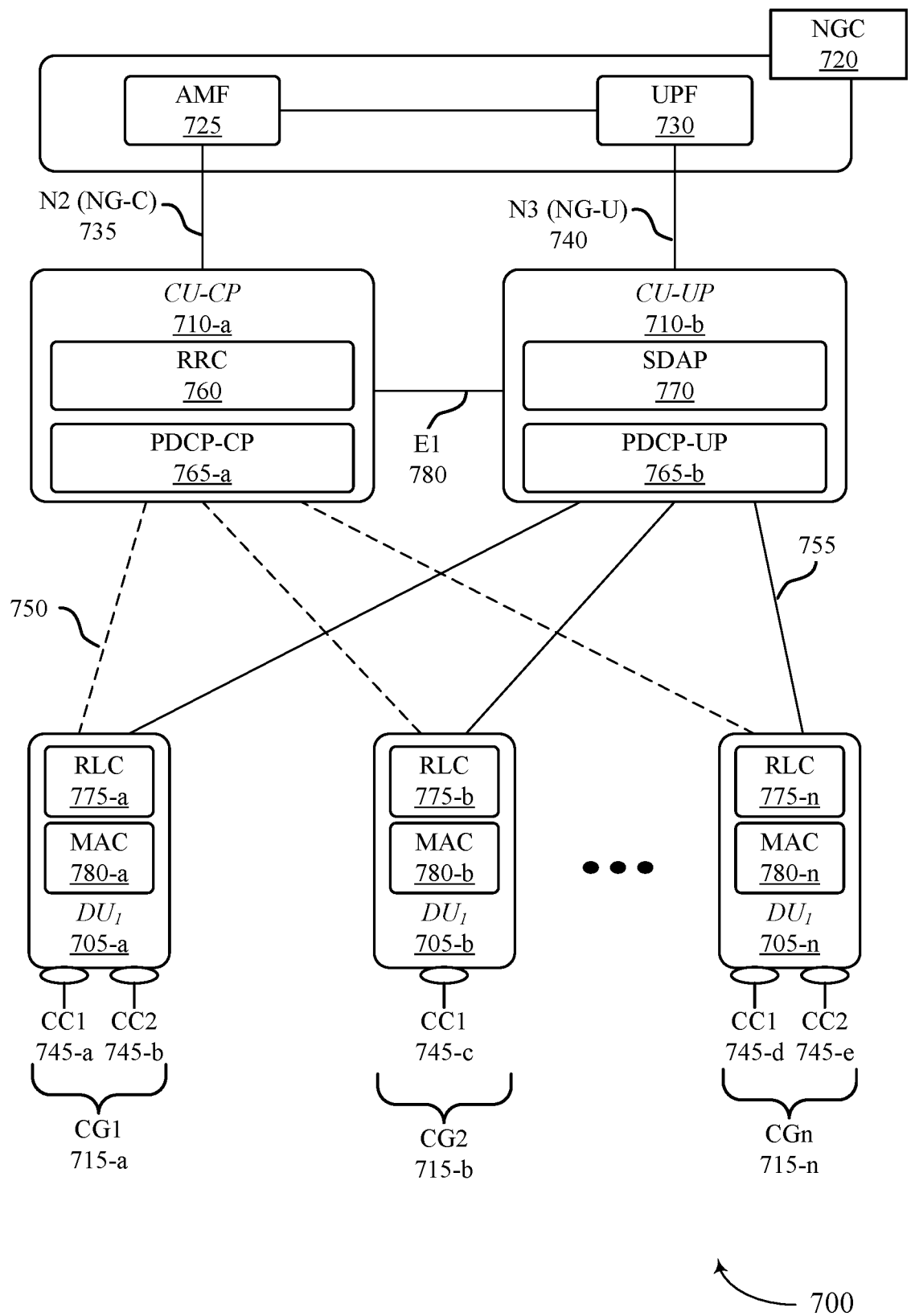
FIG. 7 illustrates an example of a multi-split bearer configuration that supports mobility robustness and spatial reliability using multi-connectivity in accordance with aspects of the present disclosure.

FIG. 7 illustrates an example of a multi-split bearer configuration 700 that supports mobility robustness and spatial reliability using multi-connectivity in accordance with aspects of the present disclosure. In some examples, multi-split bearer configuration 700 may implement aspects of wireless communications system 100.

As described in FIGS. 4 and 5, a base station 105 may include a CU 710, which may be split into CU-CP 710-*a* and CU-UP 710-*b*. In some cases, CU-CP 710-*a* may include an RRC entity 760 and a PDCP-CP 765-*a*, and CU-UP 710-*b* may include an SDAP 770 entity and PDCP-UP 765-*b*. PDCP-CP 765-*a* may be used for RRC security configuration and relate to the control plane. PDCP-UP 765-*b* may be used for DRB security configuration and relate to the user plane. CU-CP 710-*a* and CU-UP 710-*b* may communicate via an E1 interface 780. An NGC 720 may include an AMF 725 and a UPF 730. The NGC 720 may communicate with CU-CP 710-*a* using an N2 (NG-C) interface 735 and communicate with CU-UP 710-*b* using an N3 (NG-U) interface 740.

The base station may include multiple DUs 705, for example including a first DU, DU 705-*a*, through an nth DU, DU 705-*n*. Each DU 705 may include an RLC entity 775 and a MAC entity 780. A cell group 715 including one or more component carriers 745 may be configured for each DU 705.

The multi-connectivity scheme may support splitting a radio bearer, either an SRB or a DRB, across multiple cell groups. Splitting a radio bearer refers to having multiple logical channels established on multiple cell groups for a single radio bearer. If a cell group 715 has resources allocated to a UE 115 for an SRB or a DRB, the cell group 715 is considered an active cell group for the UE 115.

Each radio bearer associated with a UE 115 may have different quality, latency, or reliability requirements. For example, some radio bearers may have stringent reliability and latency requirements, while other radio bearers may have less strict reliability requirements but high throughput requirements. In an example, a radio bearer associated with a factory automation use case may have stringent reliability and latency requirements, while a radio bearer associated with augmented reality or virtual reality may have less strict reliability requirements, but higher throughput requirements.

In some cases, the UE 115 may replicate a packet and transmit the packet and packet replicates on component carriers 745 of multiple cell groups 715 to meet reliability and latency restrictions. The replication process may be referred to as PDCP replication. For example, if the UE 115 is configured with PDCP replication for a radio bearer, the UE 115 may replicate a PDCP packet for transmission on three of five cell groups to meet reliability restrictions, and the remaining two cell groups may be used for high throughput services of another radio bearer. Using different cell groups to transmit different information for the same radio bearer may be referred to as PDCP aggregation.

The base station 105 may determine whether to utilize PDCP replication or whether PDCP aggregation is active for a radio bearer based on the QoS requirement of the radio bearer. The CU 710 may indicate to the UE 115 which RLC entity 775 to replicate the PDCP packet on. For example, the CU 710 may indicate that the UE 115 should replicate the PDCP packets of a radio bearer over RLC entity 775-$a$ of DU 705-$a$ and RLC entity 775-$b$ of DU 705-$b$. Then, the UE 115 may transmit the packet using cell group 715-$a$ and replicate the packet to transmit the replicated packet using cell group 715-$b$ as well. The CU 710 may indicate to the UE 115 which radio bearers are configured for PDCP replication and on which RLC entities to replicate packets by setting a replication flag for the radio bearer and indicating the RLC entities for replication. In some cases, the CU 710 may transmit the indication via an RRC message, and the RRC message or a MAC CE, or both.

To configure PDCP aggregation of a particular radio bearer, the CU 710 may send an RRC message to the UE 115 to indicate on which logical channels corresponding to the radio bearer PDCP packet aggregation is to be performed. The RRC message may include the thresholds corresponding to each logical channel. The RRC message may indicate cell groups 715 of the set of cell groups used for PDCP aggregation to aggregate the packets corresponding to the radio bearer. The RRC message may also include thresholds for triggering PDCP aggregation.

For example, the CU 710 may configure the UE 115 to use cell group 715-$b$ and cell group 715-$n$ for a high throughput service. The CU 710 may indicate to use RLC entity 775-$b$ of DU 705-$b$ and RLC entity 775-$n$ of DU 705-$n$. If, for example, the UE 115 has 30 megabytes of data to transmit, the UE 115 may transmit 20 megabytes using cell group 715-$b$ and 10 megabytes using cell group 715-$n$. How the UE 115 divides data throughput among cell groups 715 configured for PDCP aggregation may be based on the characteristics of the cell groups 715, such as requirements (e.g., latency, reliability, throughput, etc.) and connection quality. The UE 115 may be configured with thresholds for when to initiate PDCP aggregation. For example, if the UE 115 has a large transmission with a data size larger than a configured threshold, the UE 115 may initiate PDCP aggregation to transmit the large transmission across multiple cell groups. In some cases, the PDCP aggregation may improve throughput for the large transmission.

To configure PDCP replication of a specific radio bearer, the CU 710 may send a MAC CE or RRC message to the UE 115 to indicate which logical channels corresponding to the specific radio bearer are activated for PDCP packet replication. The MAC CE or RRC message may indicate which cell groups should be used for PDCP packet replication corresponding to the specific radio bearer.

The CU 710 may indicate when to start replication based on thresholds configured at the UE 115 or setting a replication flag at an RLC entity 775. In some other cases, the UE 115 may be configured with a threshold to initiate replication. For example, the threshold to initiate replication may be based on reliability requirement for a transmission and reliability parameters of the active cell groups.

In an example, a UE 115 may have three radio bearers (e.g., RB1, RB2, and RB3) and five active cell groups (e.g., CG1, CG2, CG3, CG4, and CG5). RB1 and RB2 may have stringent low latency and reliability requirements, while RB3 may have high throughput requirements. Logical channels may be configured across the five cell groups for the radio bearers. However, replication or aggregation may be enabled for a subset of cell groups. The base station 105 may configure a UE where RB1 has PDCP replication across logical channels for CG1, CG2, and CG4, RB2 has PDCP replication across logical channels for CG1, CG2, and CG4, and RB3 has PDCP aggregation across logical channels for CG2, CG3, and CG5.

DRBs with a higher bandwidth may be configured with aggregation or switching across a subset of active cell groups or across each active cell group. Other DRBs with low latency and high reliability may be configured with PDCP replication across the active cell groups.

In some cases, if conditions for a cell group 715 of an active set of cell groups change, the UE 115 may adjust a set of thresholds for the cell group 715. The thresholds may include, for example, thresholds related to reliability, throughput, or latency restrictions, thresholds to initiate a handover or reselection process, thresholds for initiating replication or aggregation described above, or thresholds to initiate taking measurements for a measurement report. When the UE 115 establishes an RRC configuration with the base station 105, the UE 115 may receive a configuration for handling cell groups 715 of the base station 105. For example, the UE 115 may have three cell groups 715 active, and the configuration may indicate to use cell group 715-$a$ with certain thresholds under certain channel conditions. If the channel conditions change for cell group 715-$a$, the UE 115 may use a different set of thresholds for cell group 715-$a$. The UE 115 may receive similar conditions for the other active cell groups 715. The UE 115 may not wait for reconfiguration or activation to switch thresholds for a cell group based on being configured with the conditions semi-statically.

Figure 8:
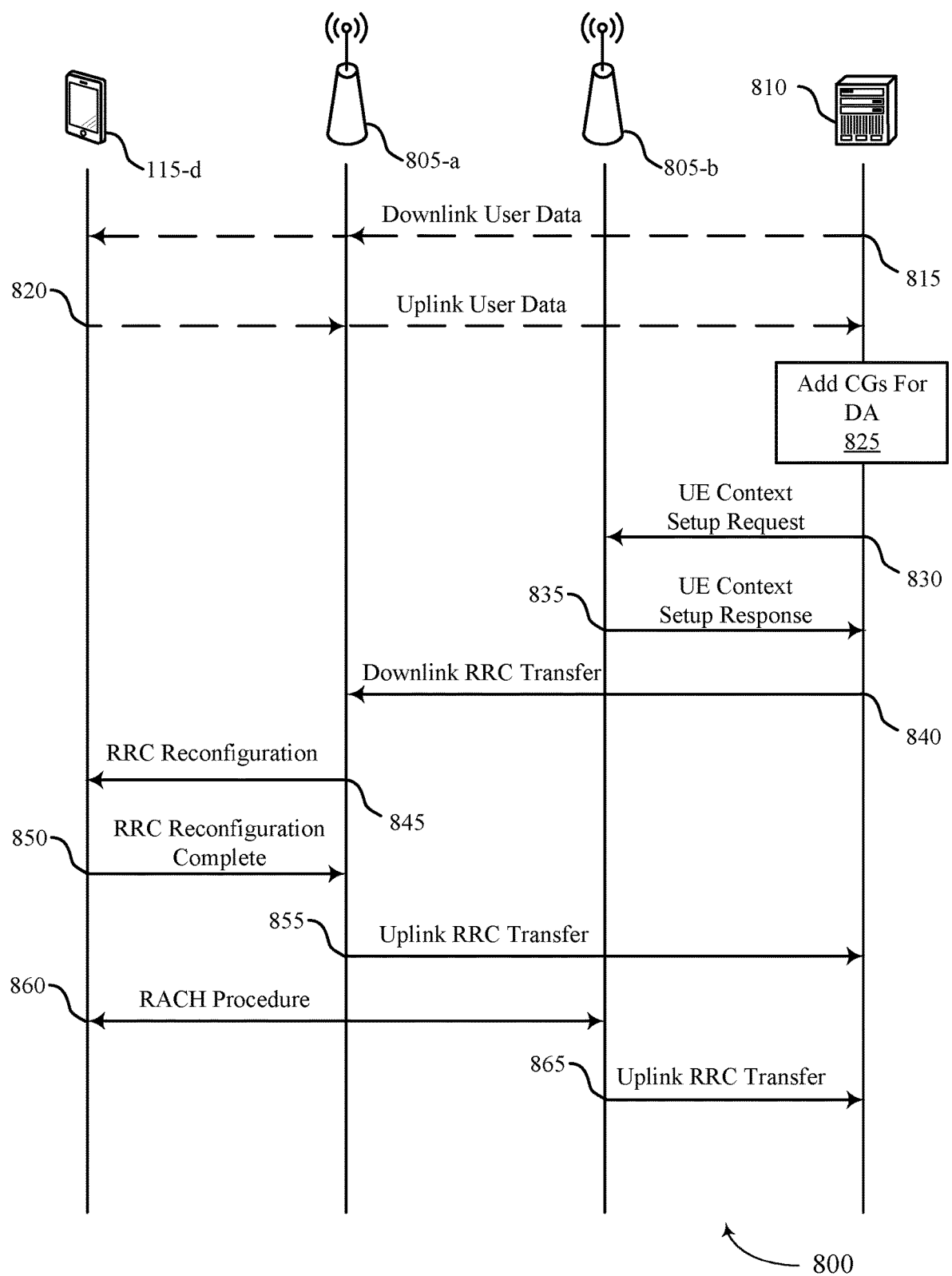
FIG. 8 illustrates an example of a cell group addition that supports mobility robustness and spatial reliability using multi-connectivity in accordance with aspects of the present disclosure.

FIG. 8 illustrates an example of a cell group addition 800 that supports mobility robustness and spatial reliability using multi-connectivity in accordance with aspects of the present disclosure. In some examples, cell group addition 800 may implement aspects of wireless communications system 100.

The cell group addition 800 may include UE 115-$d$, DU 805-$a$, DU 805-$b$, and a CU 810. UE 115-$d$ may have an RRC connection with the CU 810 and DU 805-$a$, but UE 115-$d$ may not have an RRC connection established with DU 805-$b$.

At 815, the CU 810 may transmit downlink user data to UE 115-$d$ via DU 805-$a$. For example, the downlink user data may be transmitted via a cell group configured for DU 805-$a$. At 820, UE 115-$d$ may transmit uplink user data to CU 810 via a cell group configured for DU 805-$a$.

At 825, the CU 810 may determine to add additional cell groups for multi-connectivity. At 830, the CU 810 may transmit a UE context setup request to DU 805-$b$. In some cases, the UE context setup config may include candidate cell information and a flag of whether DU 805-$a$ is activated for UE resources or not (e.g., by an "ActivateCG" flag). At 835, DU 805-$b$ may send a UE context setup response to the CU 810. The UE context setup response may include a cell group configuration.

At 840, the CU 810 may send a downlink RRC transfer indicator to DU 805-*a*. The downlink RRC transfer indicator may include an RRC reconfiguration message. At 845, DU 805-*a* may transmit the RRC reconfiguration message to UE 115-*d*. In some cases, the RRC reconfiguration may include a radio bearer configuration and a DU multi-connectivity cell group parameter (e.g., a "DUMulti-ConnCellGroup-ToAddModList" parameter). At 850, UE 115-*d* may transmit an indication that the RRC reconfiguration is complete to DU 805-*a* and, at 855, DU 805-*d* may send the indication that the RRC reconfiguration is complete to the CU 810.

At 860, UE 115-*d* may perform a random access procedure (e.g., on a random access channel (RACH)) with DU 805-*b*. At 865, DU 805-*b* may send an indicator of a successful UE RACH to the CU 810. The indicator of the successful RACH may indicate that the cell group of DU 805-*b* is ready for activation and further data transmission and reception.

The cell radio network temporary identifiers (C-RNTI) may be maintained for each cell group after the cell group addition. Additionally, discontinuous reception (DRX) procedures may be followed for each cell group.

Figure 9:
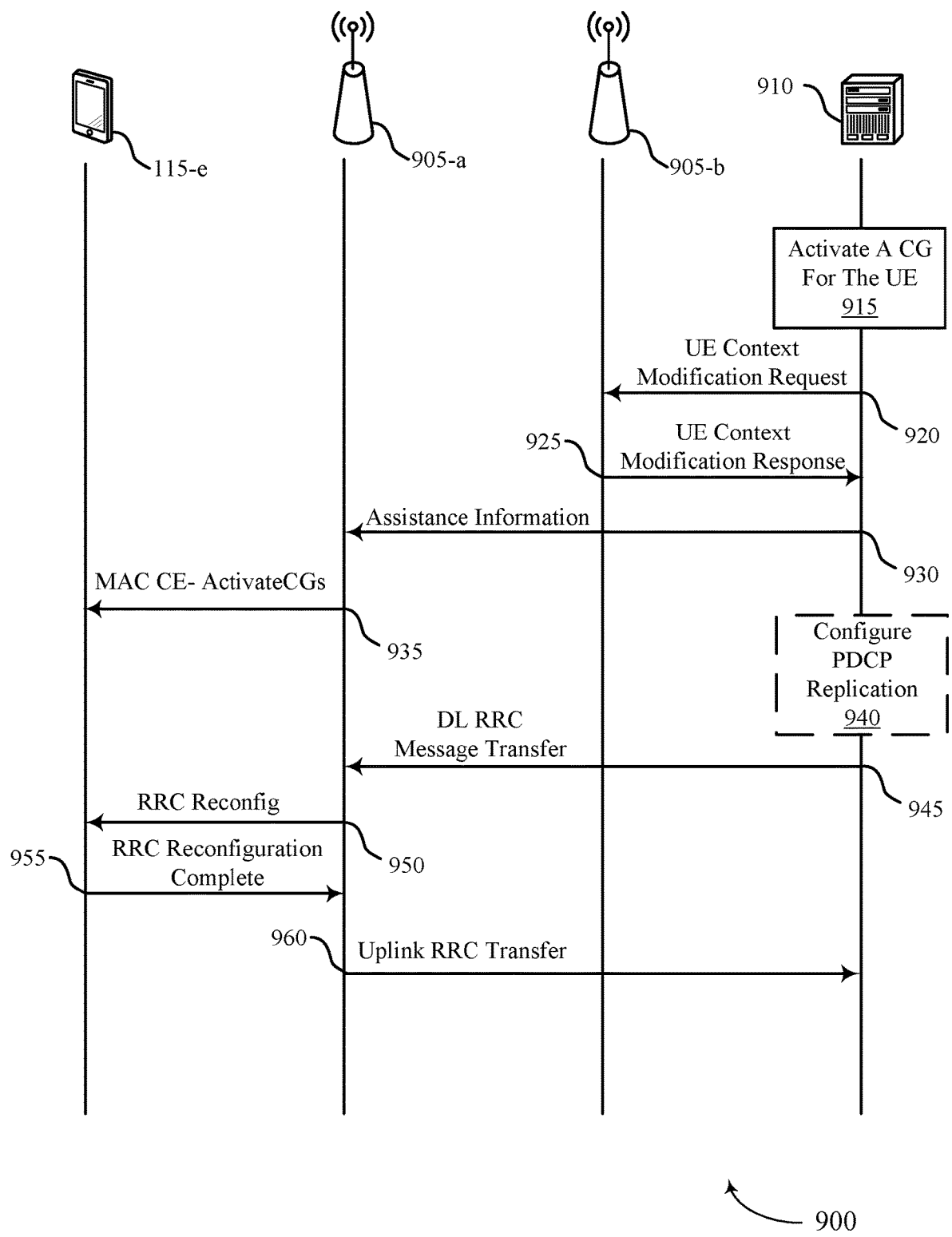
FIG. 9 illustrates an example of a cell group activation that supports mobility robustness and spatial reliability using multi-connectivity in accordance with aspects of the present disclosure.

FIG. 9 illustrates an example of a cell group activation 900 that supports mobility robustness and spatial reliability using multi-connectivity in accordance with aspects of the present disclosure. In some examples, cell group activation 900 may implement aspects of wireless communications system 100.

The cell group activation 900 may include UE 115-*d*, DU 905-*a*, DU 905-*b*, and a CU 910. DU 905-*a* and DU 905-*b* may be configured for UE 115-*d*, but a cell group configured for DU 905-*a* may be active, and a cell group for DU 905-*b* may be inactive or in a deactivated state. For example, UE 115-*e* may be allocated resources on a DRB or an SRB for DU 905-*a*, but UE 115-*e* may not be allocated physical resources for DU 905-*b*.

At 915, the CU 910 may determine to activate a CG for UE 115-*e*. The CU 910 may transmit a UE context modification request to DU 905-*b* with a flag to activate a cell group for UE 115-*e* set to true (e.g., "ActivateCG" set to true). At 925, DU 905-*b* may transmit a UE context modification response to the CU 910.

At 930, CU 910 may transmit assistance information to DU 905-*a*. The assistance information may indicate which cell groups are being activated. For example, the assistance information may indicate a second cell group configured for DU 905-*b* is being activated for UE 115-*e*.

At 935, DU 905-*b* may transmit a MAC CE to UE 115-*e* including an indication that the second cell group configured for DU 905-*b* is being activated. UE 115-*e* may move the second cell group from an inactive cell group set to an active cell group set. UE 115-*e* may use a previous configuration for the second cell group (e.g., established when the second cell group was added). In some cases, the CU 910 may adjust the configuration for the second cell group. In some cases, PDCP replication for the second cell group may be considered to be deactivated until activated through a MAC CE. In some cases, the CU 910 may configure PDCP replication for the second cell group at 950.

At 945, CU 910 may transmit a downlink RRC message transfer to DU 905-*a*, and DU 905-*a* may transmit an RRC reconfiguration message to UE 115-*e* at 950. In some cases, the downlink RRC message transfer may include the RRC reconfiguration message and configurations for the PDCP entity. For example, the message may include an uplink data split threshold for the cell group and whether PDCP replication is active. At 955, UE 115-*e* may transmit an RRC reconfiguration complete message to DU 905-*a*, and DU 905-*a* may send the RRC reconfiguration complete message to the CU 910 at 960 as an uplink RRC transfer. In some cases, 945 through 960 may only be performed if PDCP replication or PDCP aggregation thresholds were not configured previously or if the configurations are to be modified.

Figure 10:
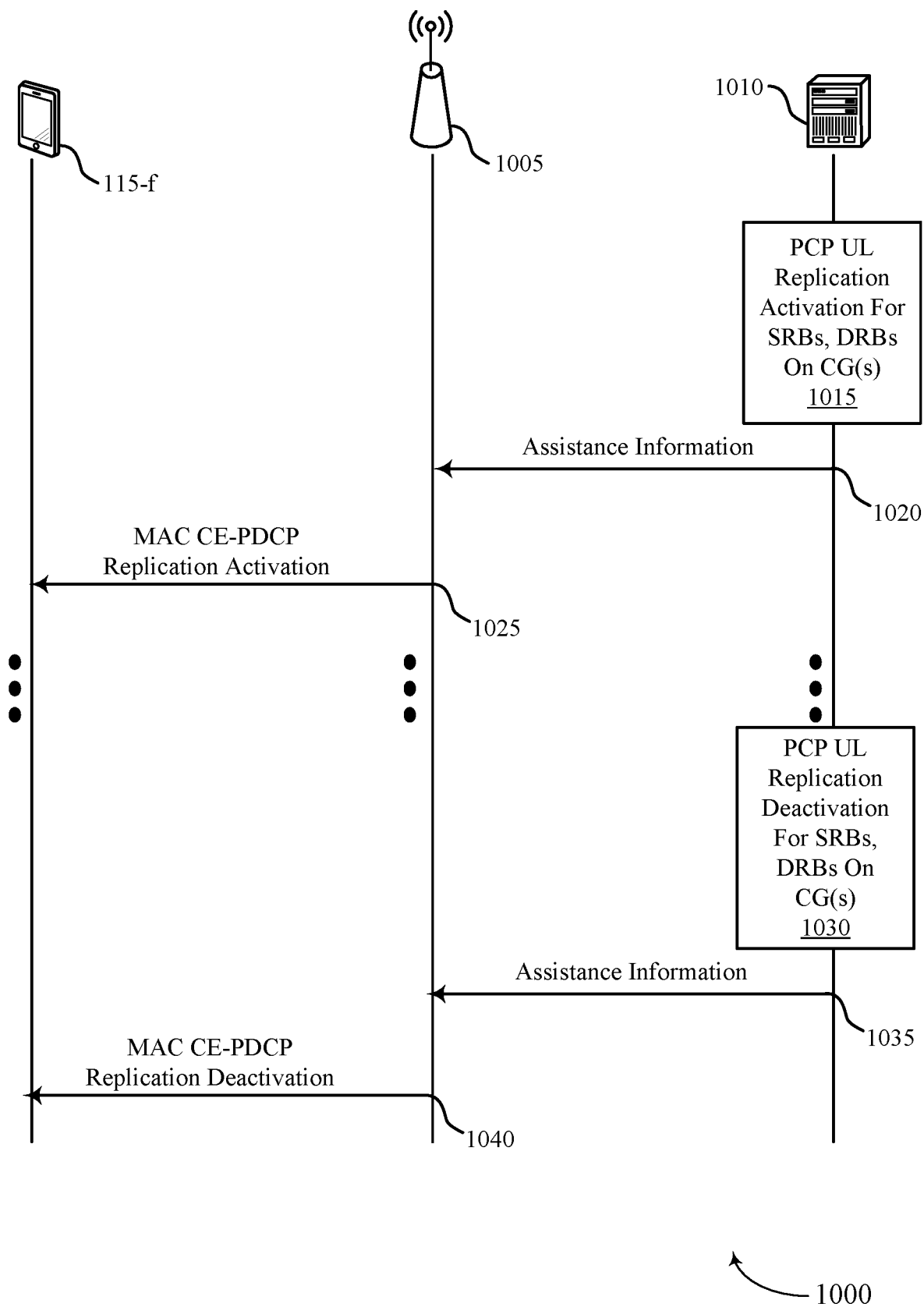
FIG. 10 illustrates an example of a packet data convergence protocol (PDCP) uplink replication configuring that supports mobility robustness and spatial reliability using multi-connectivity in accordance with aspects of the present disclosure.

FIG. 10 illustrates an example of a PDCP uplink replication configuring 1000 that supports mobility robustness and spatial reliability using multi-connectivity in accordance with aspects of the present disclosure. In some examples, PDCP uplink replication configuring 1000 may implement aspects of wireless communications system 100. PDCP uplink replication configuring 1000 includes UE 115-*f*, DU 1005, and CU 1010. PDCP uplink replication configuring may activate or deactivate PDCP uplink replication for a cell group configured for UE 115-*f*.

PDCP replication across multiple active cell groups may be supported. Activation or deactivation of PDCP replication may be signaled by a MAC CE, or RRC signaling may be used to activate or deactivate PDCP replication. A MAC CE may be used to indicate the cell groups for which uplink replication is activated.

At 1015, the CU 1010 may initiate PDCP uplink replication for SRBs and DRBs on a specific set of cell groups. At 1020, the CU 1010 may transmit assistance information to DU 1005. The assistance information may indicate that PDCP replication is active (e.g., ulReplication{Activation-TRUE}") and indicate the SRB or DRB IDs and corresponding cell groups activated for PDCP replication. For example, the CU 1010 may activate a second and third cell group for PDCP replication of packets from a cell group configured for DU 1005.

At 1025, the DU 1005 may transmit a MAC CE to UE 115-*f* to activate PDCP replication at UE 115-*f*. The activation may include SRB/DRB IDs and a list of cell groups activated for PDCP replication. For example, the activation may indicate a second cell group and a third cell group provided by other DUs not shown, and UE 115-*f* may replicate packets originally intended to be transmitted to the DU 1005 and transmit the replicated packets on uplink channels to the second cell group and the third cell group.

At 1030, the CU 1010 may determine deactivate PDCP replication for certain radio bearers and cell groups. The CU 1010 may transmit assistance information to the DU 1005 at 1035. The assistance information may indicate the SRBs/DRBs and corresponding cell groups deactivated for PDCP replication (e.g., "ulReplication{Activation-FALSE}"). For example, the CU 1010 may deactivate the second cell group for PDCP duplication and include an indication of the second cell group and radio bearer associated with the second cell group in the assistance information. In some examples, the third cell group may remain activated for PDCP replication, though the second cell group is deactivated. DU 1005 may transmit a PDCP replication deactivation message to UE 115-*f* in a MAC CE. The PDCP replication deactivation message may indicate that the second cell group is deactivated for PDCP replication.

Figure 11:
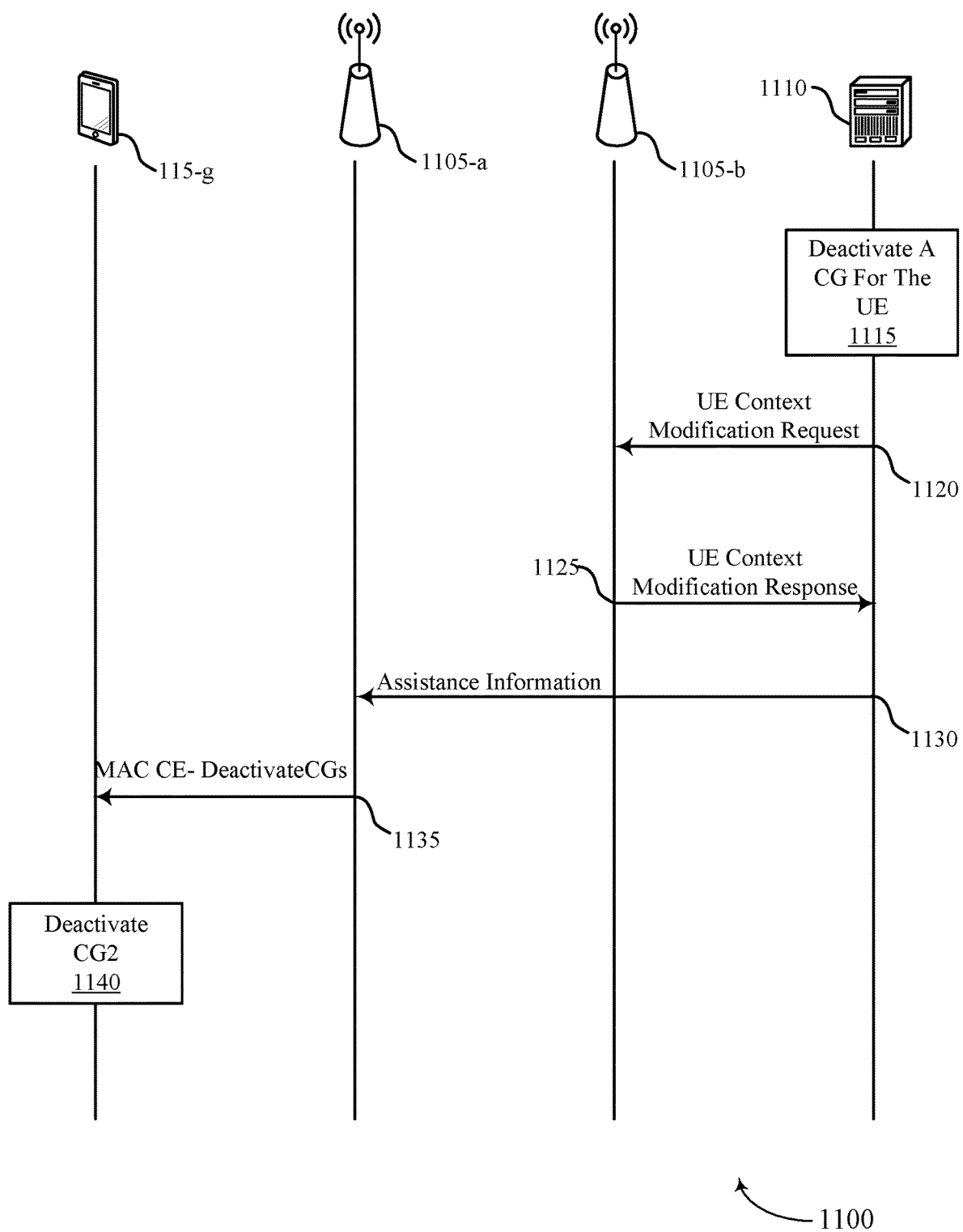
FIG. 11 illustrates an example of a cell group deactivation that supports mobility robustness and spatial reliability using multi-connectivity in accordance with aspects of the present disclosure.

FIG. 11 illustrates an example of a cell group deactivation 1100 that supports mobility robustness and spatial reliability using multi-connectivity in accordance with aspects of the present disclosure. In some examples, cell group deactivation 1100 may implement aspects of wireless communications system 100. The cell group deactivation 1100 may include UE 115-*g*, DU 1105-*a*, DU 1105-*b*, and a CU 1110. DU 1105-*a* and DU 1105-*b* may be configured for UE 115-*g*, each providing an activated cell group. For example, UE 115-*g* may be allocated resources on a DRB or an SRB for each of DU 1105-*a* and DU 1105-*b*. The cell group deactivation 1100 may deactivate an active cell group of UE 115-*g*.

At 1115, CU 1110 may determine to deactivate a cell group for UE 115-*g*. At 1120, the CU 1110 may transmit a UE context modification request to DU 1105-*b* with a flag to activate a cell group for UE 115-*g* set to false (e.g., "ActivateCG" set to false). At 1125, DU 1105-*b* may transmit a UE context modification response to the CU 1110.

At 1130, CU 1110 may transmit assistance information to DU 1105-*a*. The assistance information may indicate which one or more cell groups are being deactivated. For example, the assistance information may indicate the second cell group configured for DU 1105-*b* is being deactivated for UE 115-*g*.

At 1135, DU 1105-*b* may transmit a MAC CE to UE 115-*g* including an indication that the second cell group configured for DU 1105-*b* is being deactivated. At 1140, UE 115-*e* may move the second cell group from the active cell group set to the inactive cell group set. UE 115-*g* may consider PDCP replication for the inactive cell group to be inactive. In some cases, the configuration for the second cell group may be maintained while in the deactivated state.

Figure 12:
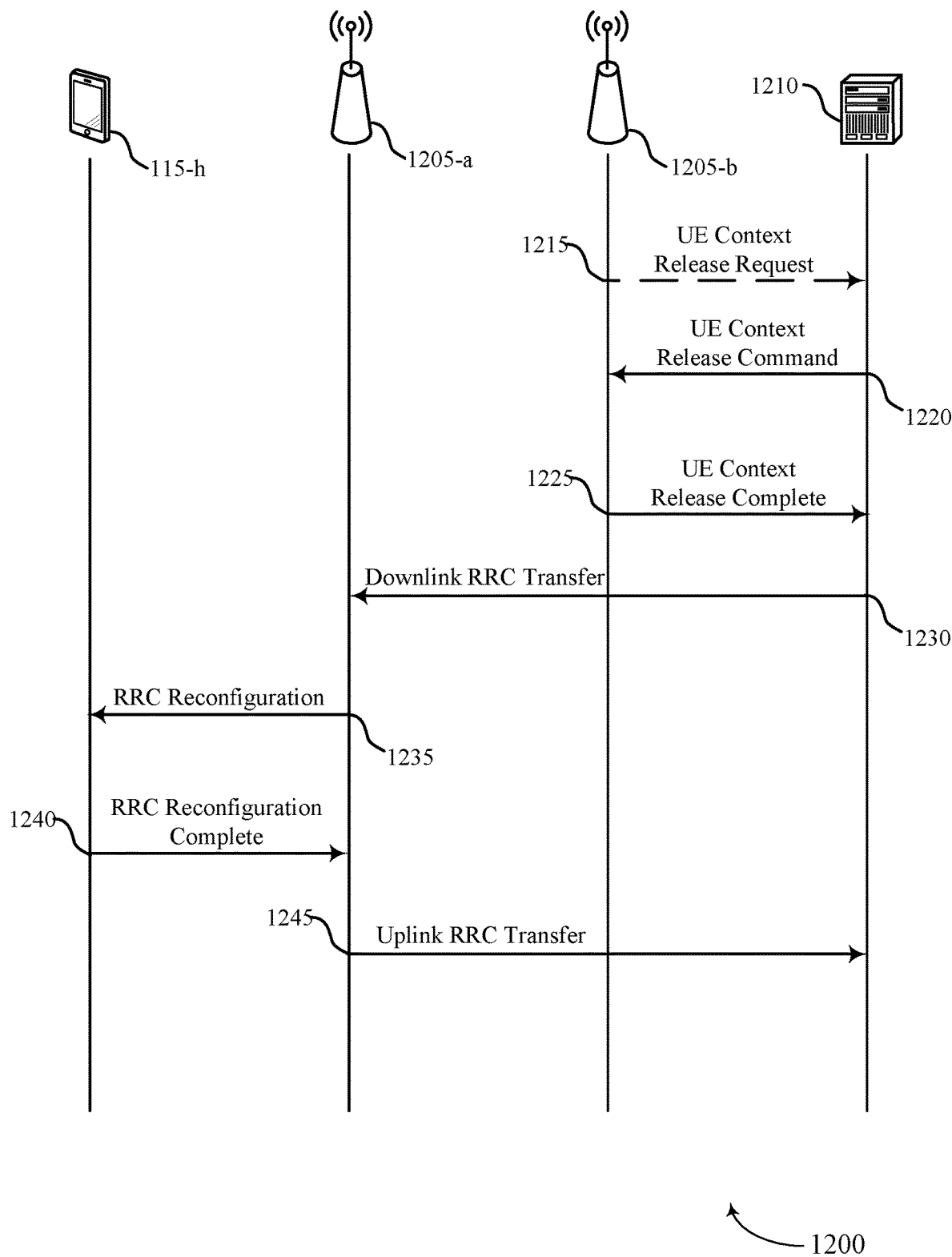
FIG. 12 illustrates an example of a cell group release that supports mobility robustness and spatial reliability using multi-connectivity in accordance with aspects of the present disclosure.

FIG. 12 illustrates an example of a cell group release 1200 that supports mobility robustness and spatial reliability using multi-connectivity in accordance with aspects of the present disclosure. In some examples, cell group release 1200 may implement aspects of wireless communications system 100.

The cell group release 1200 may include UE 115-*h*, DU 1205-*a*, DU 1205-*b*, and a CU 1210. DU 1205-*a* and DU 1205-*b* may be configured for UE 115-*h*, each providing a cell group. In some cases, the cell group release 1200 may be triggered based on a measurement report from UE 115-*h*. The cell group release 1200 may release a cell group from a set of cell groups configured for UE 115-*h*.

In some cases, at 1215, DU 1205-*b* may initiate the cell group release by transmitting a UE context release request to the CU 1210. At 1220, the CU 1210 may transmit a UE context release command to DU 1205-*b*. At 1225, DU 1205-*b* may transmit a UE context release complete to the CU 1210.

At 1230, the CU 1210 may transmit a downlink RRC transfer message to DU 1205-*a*. The downlink RRC transfer message may include an RRC reconfiguration message, and DU 1205-*a* may transmit the RRC reconfiguration message to UE 115-*h* at 1235. The RRC reconfiguration message may include a list of cell groups to release. At 1240, UE 115-*h* may transmit an RRC reconfiguration complete message to DU 1205-*a*. At 1245, DU 1205-*a* may send the uplink RRC transfer message to the CU 1210 including the RRC reconfiguration complete message.

In some cases, UE 115-*h* may not be indicated of the release of the DU cell group. For example, UE 115-*h* may not be indicated of the release if the cell group is released for an inter-gNB-CU handover.

Figure 13:
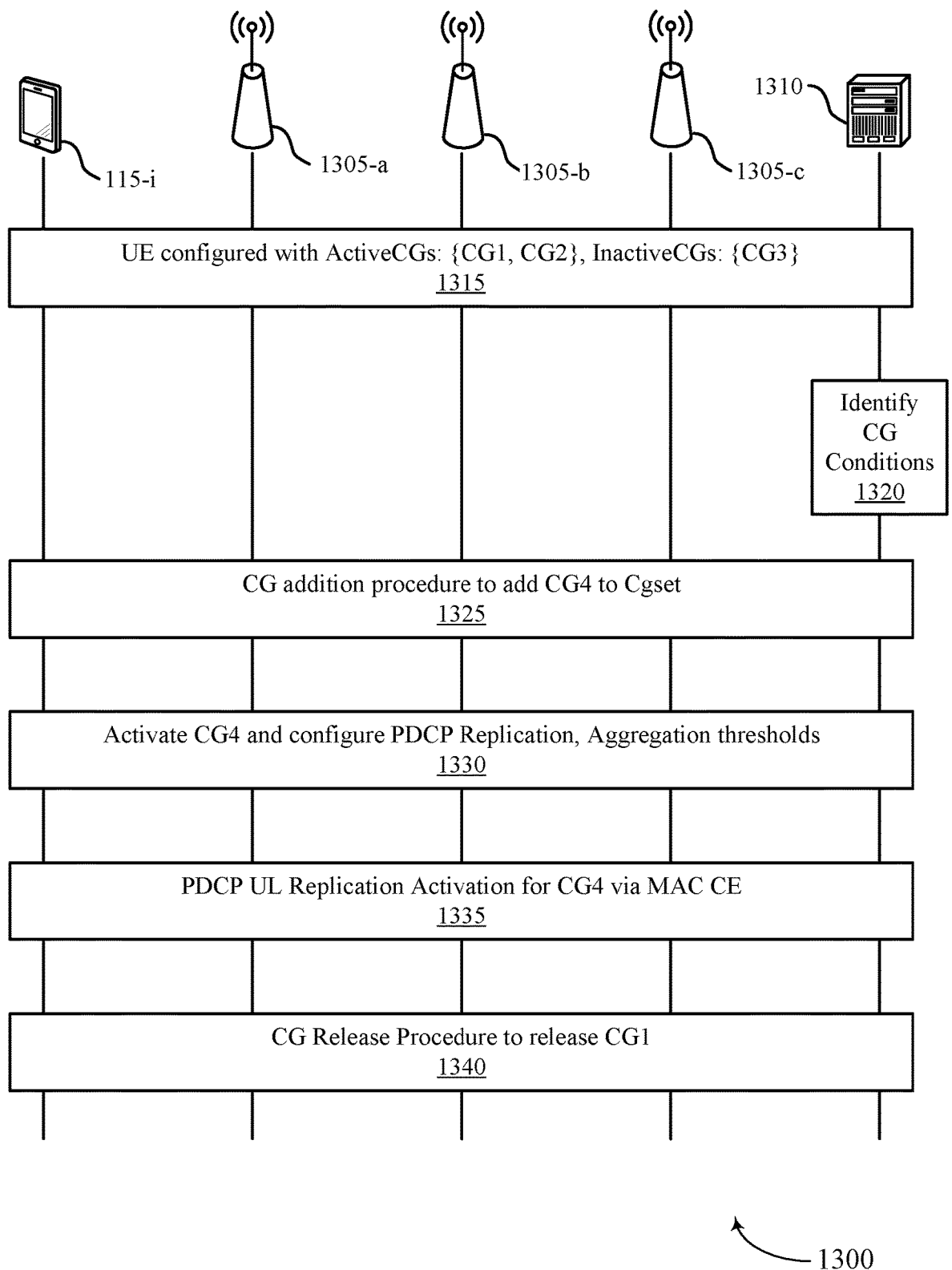
FIG. 13 illustrates an example of a cell group set update that supports mobility robustness and spatial reliability using multi-connectivity in accordance with aspects of the present disclosure.

FIG. 13 illustrates an example of a cell group set update 1300 that supports mobility robustness and spatial reliability using multi-connectivity in accordance with aspects of the present disclosure. In some examples, cell group set update 1300 may implement aspects of wireless communications system 100. In some cases, the cell group set update 1300 may describe procedures for when an active or inactive cell group is replaced with a neighbor cell group.

At 1315, UE 115-*i* may be configured with a set of active cell groups including CG1 configured for DU 1305-*a* and CG2 configured for DU 1305-*b*. UE 115-*i* may have a set of inactive cell groups including CG 3 configured for DU 1305-*c*.

At 1320, the CU 1310 may identify cell group conditions. For example, a measurement report from UE 115-*i* may indicate that a neighboring cell group, CG4, has better conditions than CG1. At 1325, a cell group addition procedure may be performed to add CG4 to the set of active cell groups configured for UE 115-*i*. The cell group addition procedure is described in FIG. 8.

At 1330, CG4 may be configured with PDCP replication and/or PDCP aggregation thresholds. In some cases, at 1335, CG4 may be activated for PDCP uplink replication by a MAC CE. An example of PDCP uplink replication activation is described in FIG. 10. At 1340, a cell group release procedure may occur to release CG1. An example of a cell group release is described in FIG. 12.

Figure 14:
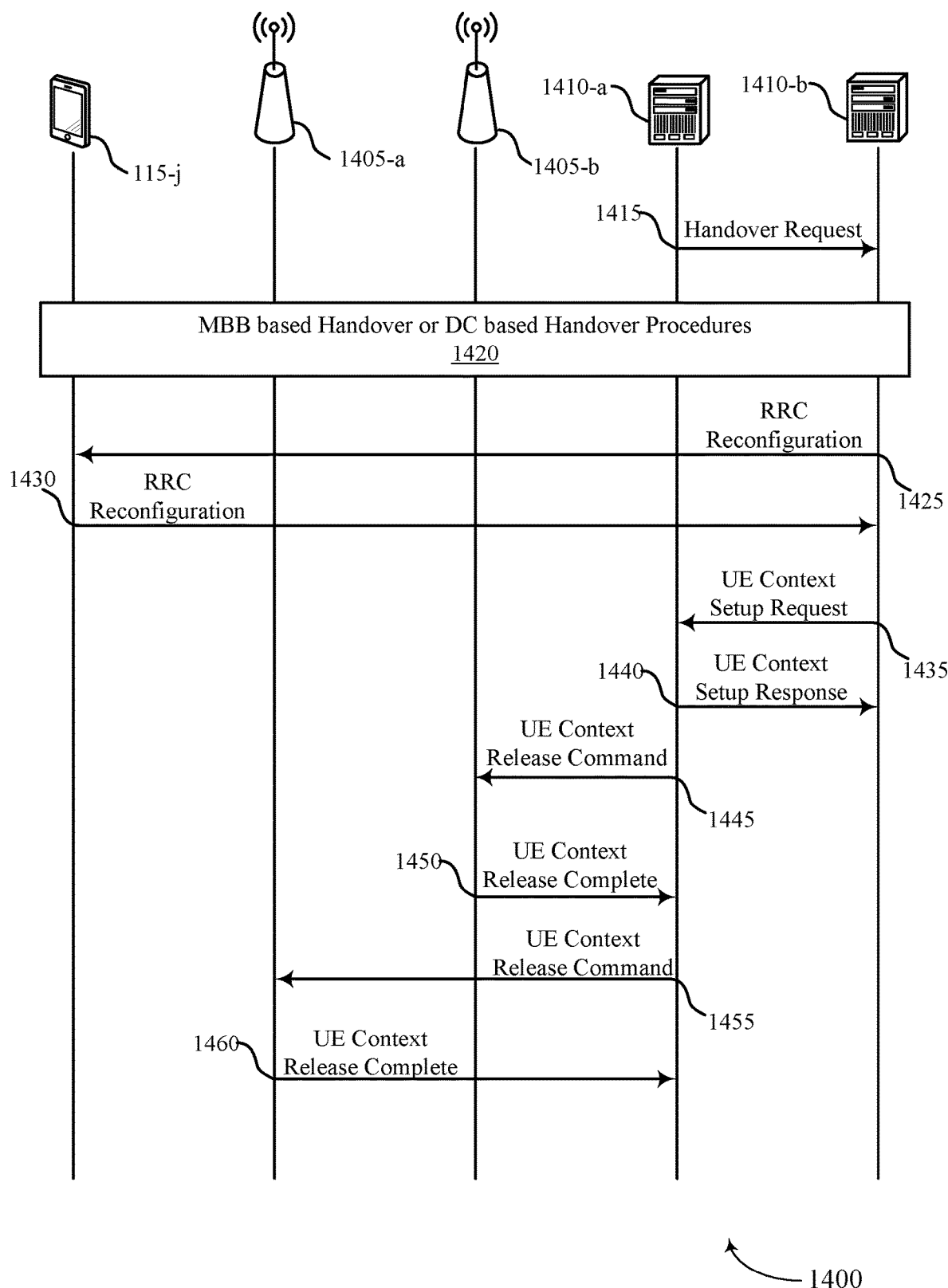
FIG. 14 illustrates an example of an inter-central unit (CU) handover that supports mobility robustness and spatial reliability using multi-connectivity in accordance with aspects of the present disclosure.

FIG. 14 illustrates an example of an inter-CU handover 1400 that supports mobility robustness and spatial reliability using multi-connectivity in accordance with aspects of the present disclosure. In some examples, inter-CU handover 1400 may implement aspects of wireless communications system 100. The inter-CU handover 1400 may include UE 115-*j*, DU 1405-*a*, DU 1405-*b*, CU 1410-*a*, and CU 1410-*b*. CU 1410-*a* may be the source CU for the inter-CU handover, and CU 1410-*b* may be the target CU for the inter-CU handover.

In some cases, at 1415, CU 1410-*a* may transmit a handover request to CU 1410-*b*. At 1420, the MBB-based or DC-based handover may be initiated.

At 1425, CU 1410-*b* may receive a path switch request acknowledgment and transmit an RRC reconfiguration message to UE 115-*j*. The RRC reconfiguration message may include an indication to release source CU connections (e.g., connections to CU 1410-*a*). In some cases, the RRC reconfiguration message may include indications to release connections with cell groups provided by CU 1410-*a*. UE 115-*j* may transmit an RRC reconfiguration complete message to CU 1410-*b* in response at 1430.

At 1435, CU 1410-*b* may transmit a UE context setup request message to CU 1410-*a*, and CU 1410-*a* may transmit a UE context setup request message to CU 1410-*b* at 1440. At 1445, CU 1410-*a* may transmit a UE context release command to DU 1405-*b*, and DU 1405-*b* may transmit a UE context release complete message to CU 1410-*a* at 1450. At 1455, CU 1410-*a* may transmit a UE context release command to DU 1405-*a*, and DU 1405-*a* may transmit a UE context release complete message to CU 1410-*a* at 1460. CU 1410-*a* may transmit a UE context release command to any DU 1405 under CU 1410-*a* with a cell group established for UE 115-*j*.

Figure 15:
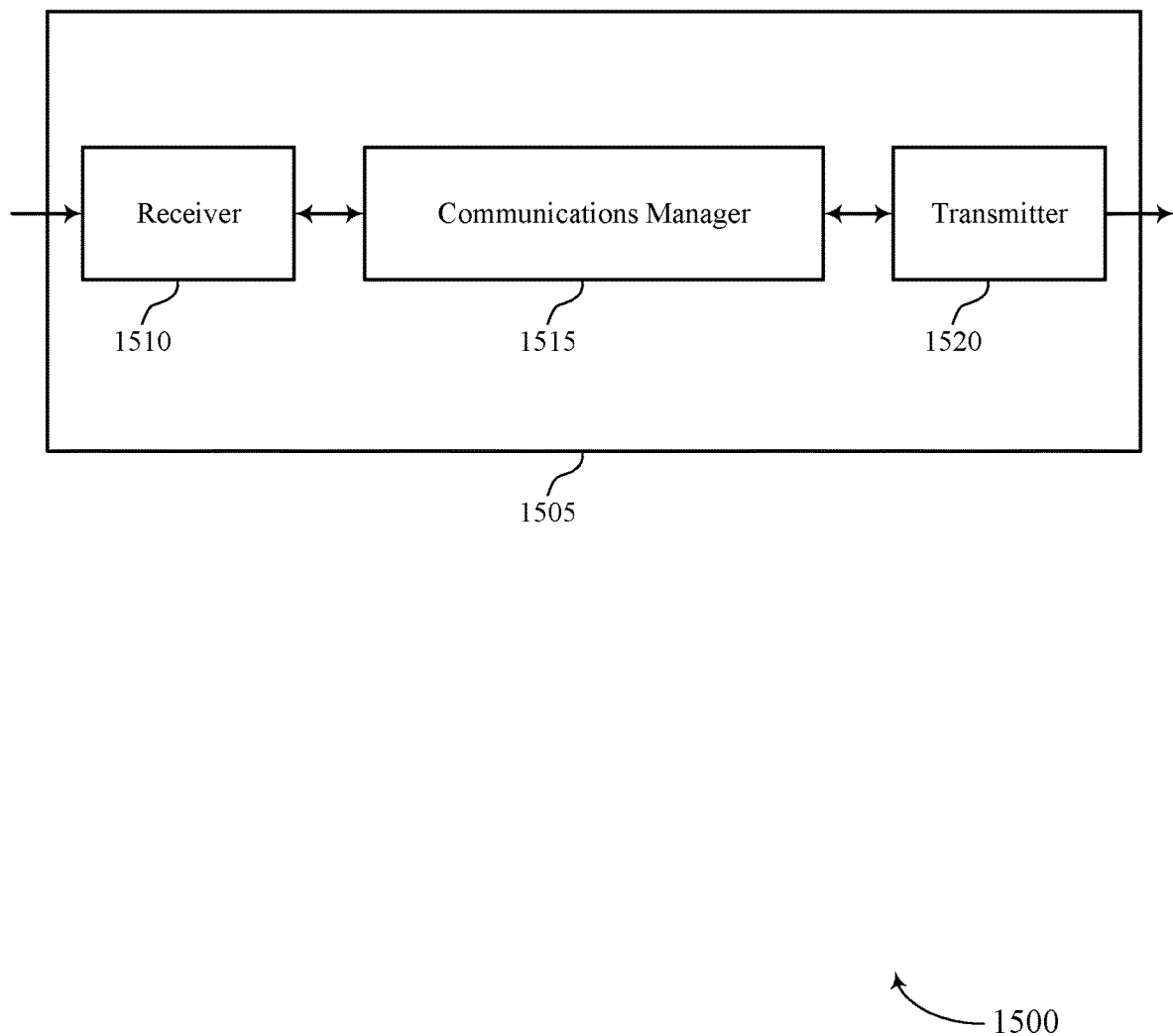
FIGS. 15 and 16 show block diagrams of devices that support mobility robustness and spatial reliability using multi-connectivity in accordance with aspects of the present disclosure.

FIG. 15 shows a block diagram 1500 of a device 1505 that supports mobility robustness and spatial reliability using multi-connectivity in accordance with aspects of the present disclosure. The device 1505 may be an example of aspects of a UE 115 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to mobility robustness and spatial reliability using multi-connectivity, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may transmit a capability message to a base station indicating a multi-connectivity capability of the UE to support more than two concurrent active cell group connections, transmit, to the base station, one or more measurement reports that provide measurement information for cells in proximity to the UE, receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station, and communicate with the base station via the set of active cell groups in accordance with the multi-connectivity configuration. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
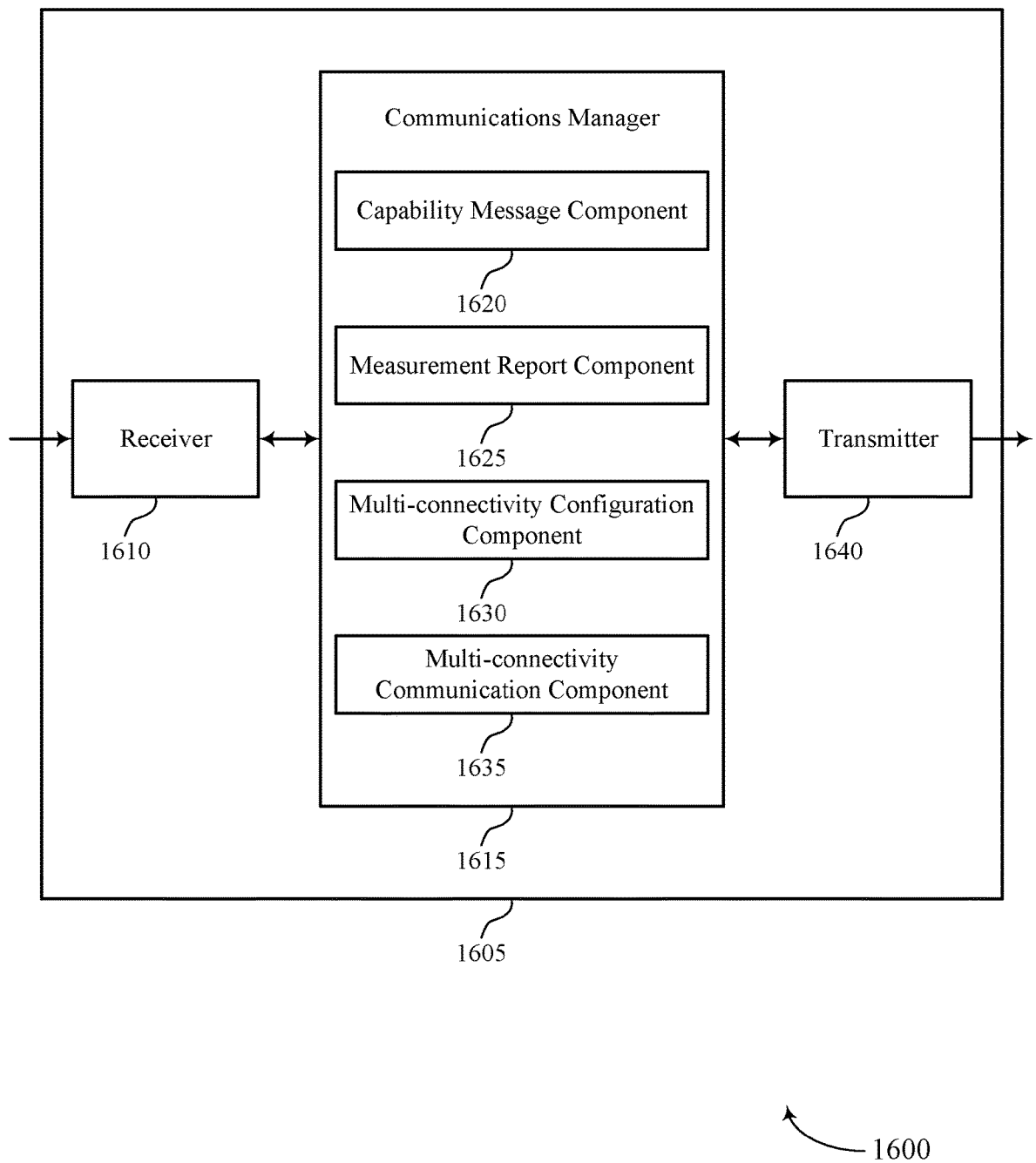

FIG. 16 shows a block diagram 1600 of a device 1605 that supports mobility robustness and spatial reliability using multi-connectivity in accordance with aspects of the present disclosure. The device 1605 may be an example of aspects of a device 1505 or a UE 115 as described herein. The device 1605 may include a receiver 1610, a communications manager 1615, and a transmitter 1640. The device 1605 may also include a processor. Each of these components may be in communication with one another (e.g., via one or more buses).

The receiver 1610 may receive information such as packets, user data, or control information associated with various information channels (e.g., control channels, data channels, and information related to mobility robustness and spatial reliability using multi-connectivity, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a capability message component 1620, a measurement report component 1625, a multi-connectivity configuration component 1630, and a multi-connectivity communication component 1635. The communications manager 1615 may be an example of aspects of the communications manager 1810 described herein.

The capability message component 1620 may transmit a capability message to a base station indicating a multi-connectivity capability of the UE to support more than two concurrent active cell group connections.

The measurement report component 1625 may transmit, to the base station, one or more measurement reports that provide measurement information for cells in proximity to the UE.

The multi-connectivity configuration component 1630 may receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station.

The multi-connectivity communication component 1635 may communicate with the base station via the set of active cell groups in accordance with the multi-connectivity configuration.

The transmitter 1640 may transmit signals generated by other components of the device 1605. In some examples, the transmitter 1640 may be collocated with a receiver 1610 in a transceiver module. For example, the transmitter 1640 may be an example of aspects of the transceiver 1820 described with reference to FIG. 18. The transmitter 1640 may utilize a single antenna or a set of antennas.

Figure 17:
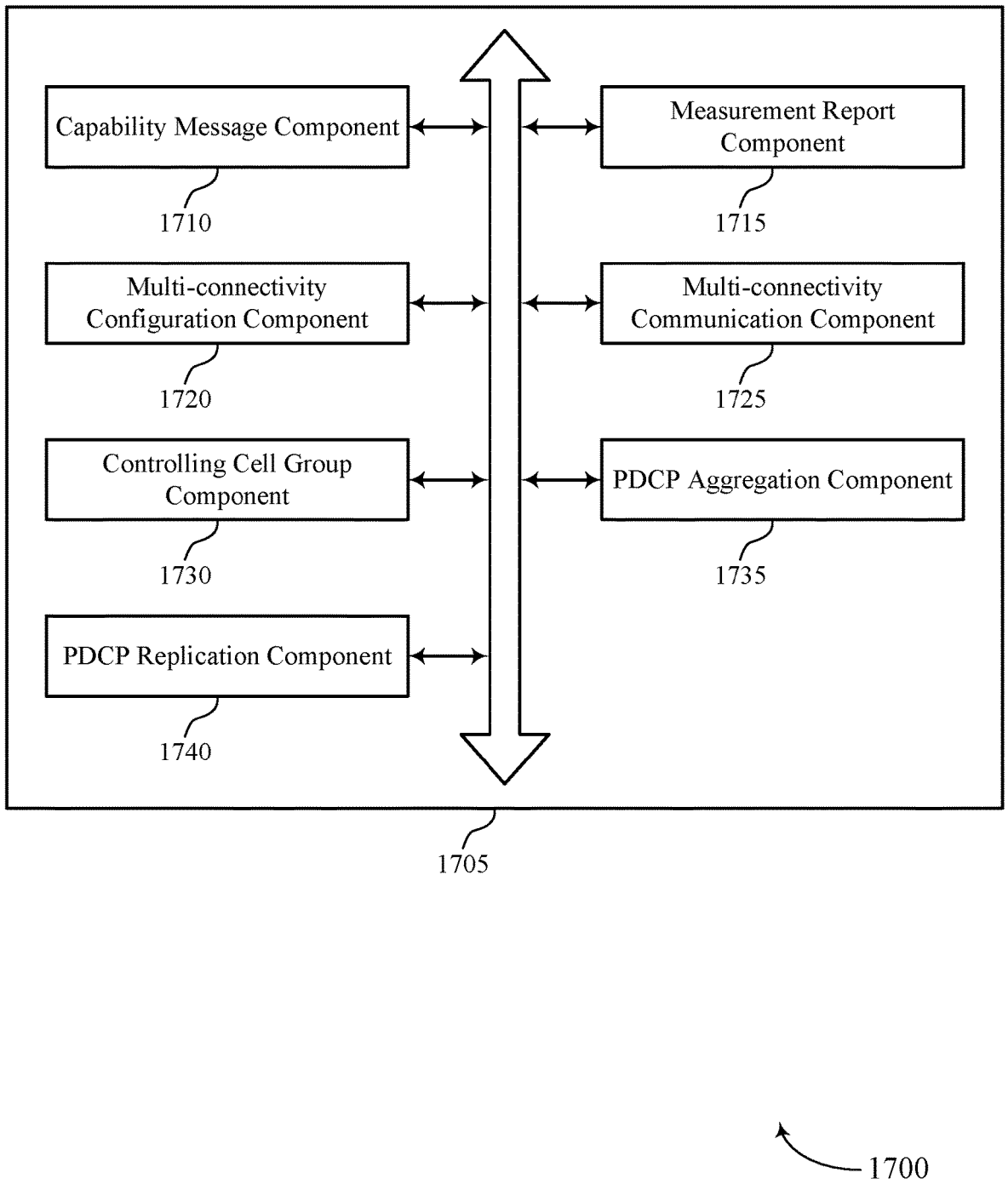
FIG. 17 shows a block diagram of a communications manager that supports mobility robustness and spatial reliability using multi-connectivity in accordance with aspects of the present disclosure.

FIG. 17 shows a block diagram 1700 of a communications manager 1705 that supports mobility robustness and spatial reliability using multi-connectivity in accordance with aspects of the present disclosure. The communications manager 1705 may be an example of aspects of a communications manager 1515, a communications manager 1615, or a communications manager 1810 described herein. The communications manager 1705 may include a capability message component 1710, a measurement report component 1715, a multi-connectivity configuration component 1720, a multi-connectivity communication component 1725, a controlling cell group component 1730, a PDCP aggregation component 1735, and a PDCP replication component 1740. Each of these modules may communicate, directly or indirectly, with one another (e.g., via one or more buses).

The capability message component 1710 may transmit a capability message to a base station indicating a multi-connectivity capability of the UE to support more than two concurrent active cell group connections.

The measurement report component 1715 may transmit, to the base station, one or more measurement reports that provide measurement information for cells in proximity to the UE.

In some examples, the measurement report component 1715 may monitor channel conditions associated with at least the set of active cell groups and the one or more inactive cell groups.

In some examples, the measurement report component 1715 may transmit to the base station one or more additional measurement reports identifying the channel conditions.

The multi-connectivity configuration component 1720 may receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station.

In some examples, the multi-connectivity configuration component 1720 may identify, from the multi-connectivity configuration, that the cell group set includes one or more inactive cell groups to which the UE is connected but for which the UE lacks an allocation of uplink and downlink physical resources.

In some examples, the multi-connectivity configuration component 1720 may receive an update to the multi-connectivity configuration based on the one or more additional measurement reports. In some examples, the multi-connectivity configuration component 1720 may receive a RRC signal indicating that an additional cell group is to be added to the cell group set.

In some examples, the multi-connectivity configuration component 1720 may receive updated radio bearer and cell group configuration information associated with the additional cell group. In some examples, the multi-connectivity configuration component 1720 may receive a MAC CE or RRC signal indicating that an inactive cell group has been changed to be an active cell group.

In some examples, the multi-connectivity configuration component 1720 may receive a MAC CE or RRC signal indicating that an active cell group has been changed to be an inactive cell group.

In some examples, the multi-connectivity configuration component 1720 may receive a RRC signal indicating that either an active cell group or an inactive cell group has been released and is no longer a part of the cell group set.

In some examples, the multi-connectivity configuration component 1720 may receive a conditional indication of which cell groups of the set of active cell groups are to be configured for DRB PDCP aggregation and of which cell groups of the set of active cell groups are to be configured for DRB PDCP replication.

In some examples, the multi-connectivity configuration component 1720 may update the multi-connectivity configuration for DRB PDCP aggregation or DRB PDCP replication based on a trigger of the conditional indication and without prior receipt of an updated multi-connectivity configuration. In some cases, the additional cell group is identified as either an active cell group or an inactive cell group. In some cases, the set of cell groups included in the cell group set include cell groups for both NR and LTE RATs. In some cases, the set of cell groups included in the cell group set include cell groups for a same type of RAT.

In some cases, a number of the set of cell groups included in the cell group set for which the UE is configured is based on the multi-connectivity capability of the UE, service requirements of DRBs configured for the UE, throughput or reliability requirements of DRBs configured for the UE, a location of the UE, channel conditions affecting communications with the UE, battery resources of the UE, other device resource conditions having an effect on capabilities of the UE, or combinations thereof.

In some cases, each of the set of cell groups of the cell group set includes a set of cells configured for a same DU of the base station and managed by a single MAC entity, and where all of the set of cell groups of the cell group set are associated with a same CU of the base station.

The multi-connectivity communication component 1725 may communicate with the base station via the set of active cell groups in accordance with the multi-connectivity configuration.

The controlling cell group component 1730 may identify that two or more of the set of active cell groups are controlling cell groups. In some examples, the controlling cell group component 1730 may receive, via a RRC message, an indicator that the two or more of the set of active cell groups are controlling cell groups. In some examples, the controlling cell group component 1730 may receive an allocation of SRB resources for each of the controlling cell groups. In some examples, the controlling cell group component 1730 may identify the controlling cell groups based on receipt of the allocation of SRB resources for the controlling cell groups, .

In some examples, the controlling cell group component 1730 may declare RLF only if RLF is identified on each of the controlling cell groups. In some examples, the controlling cell group component 1730 may measure one or more attributes of the controlling cell groups. In some examples, the controlling cell group component 1730 may identify, based on the measuring, one or more of the controlling cell groups as one or more selected controlling cell groups having better conditions or performance metrics than other controlling cell groups.

In some examples, the controlling cell group component 1730 may report the one or more selected controlling cell groups to the base station. In some examples, the controlling cell group component 1730 may receive at least one of SI notifications, PWS notifications, CN registration area notifications, or RAN notifications via the one or more selected controlling cell groups.

The PDCP aggregation component 1735 may receive an indication of which cell groups of the set of active cell groups are to be configured for PDCP aggregation such that data associated with a DRB having a throughput requirement above at least one threshold is distributed across the indicated cell groups having an aggregate throughput that satisfies the throughput requirement of the DRB.

In some cases, the at least one threshold is a set of predetermined thresholds, with each of the set of predetermined thresholds corresponding to one of the indicated cell groups, and where the data associated with the DRB is distributed across the indicated cell groups in accordance with the set of predetermined thresholds.

In some cases, the at least one threshold is one or more conditional thresholds, with each of the one or more conditional thresholds corresponding to a predetermined quality of a link connection associated with the indicated cell groups.

The PDCP replication component 1740 may receive an indication of which cell groups of the set of active cell groups are to be configured for PDCP replication such that data associated with a DRB having a latency or reliability requirement above a threshold is replicated across the indicated cell groups. In some cases, the indication includes one or more replication flags corresponding to each of the indicated cell groups.

Figure 18:
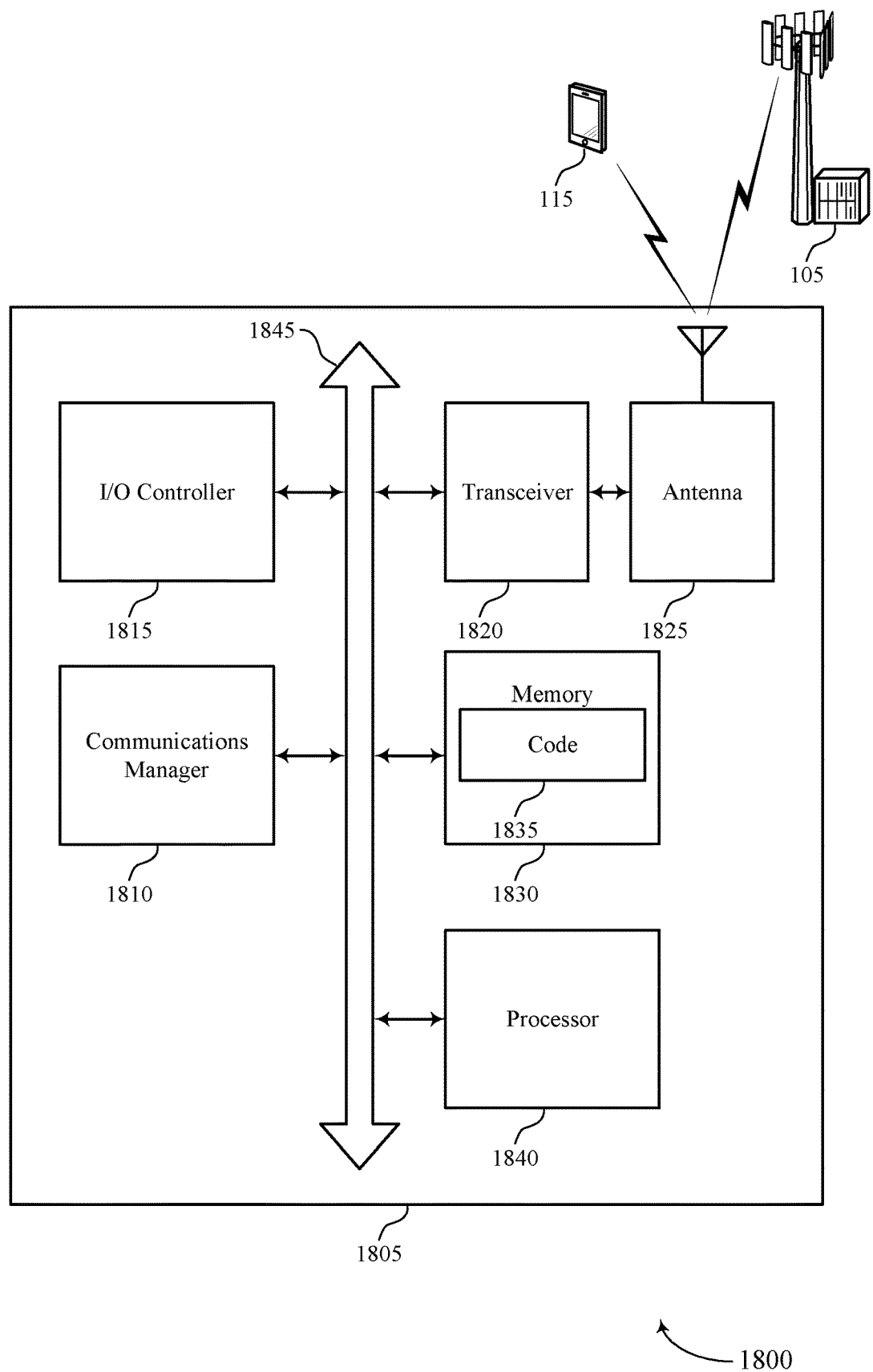
FIG. 18 shows a diagram of a system including a device that supports mobility robustness and spatial reliability using multi-connectivity in accordance with aspects of the present disclosure.

FIG. 18 shows a diagram of a system 1800 including a device 1805 that supports mobility robustness and spatial reliability using multi-connectivity in accordance with aspects of the present disclosure. The device 1805 may be an example of or include the components of device 1505, device 1605, or a UE 115 as described herein. The device 1805 may include components for bi-directional voice and data communications including components for transmitting and receiving communications, including a communications manager 1810, an I/O controller 1815, a transceiver 1820, an antenna 1825, memory 1830, and a processor 1840. These components may be in electronic communication via one or more buses (e.g., bus 1845).

The communications manager 1810 may transmit a capability message to a base station indicating a multi-connectivity capability of the UE to support more than two concurrent active cell group connections, transmit, to the base station, one or more measurement reports that provide measurement information for cells in proximity to the UE, receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station, and communicate with the base station via the set of active cell groups in accordance with the multi-connectivity configuration.

The I/O controller 1815 may manage input and output signals for the device 1805. The I/O controller 1815 may also manage peripherals not integrated into the device 1805. In some cases, the I/O controller 1815 may represent a physical connection or port to an external peripheral. In some cases, the I/O controller 1815 may utilize an operating system such as iOS®, ANDROID®, MS-DOS®, MS-WINDOWS®, OS/2®, UNIX®, LINUX®, or another known operating system. In other cases, the I/O controller 1815 may represent or interact with a modem, a keyboard, a mouse, a touchscreen, or a similar device. In some cases, the I/O controller 1815 may be implemented as part of a processor. In some cases, a user may interact with the device 1805 via the I/O controller 1815 or via hardware components controlled by the I/O controller 1815.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM and ROM. The memory 1830 may store computer-readable, computer-executable code 1835 including instructions that, when executed, cause the processor to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting mobility robustness and spatial reliability using multi-connectivity).

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
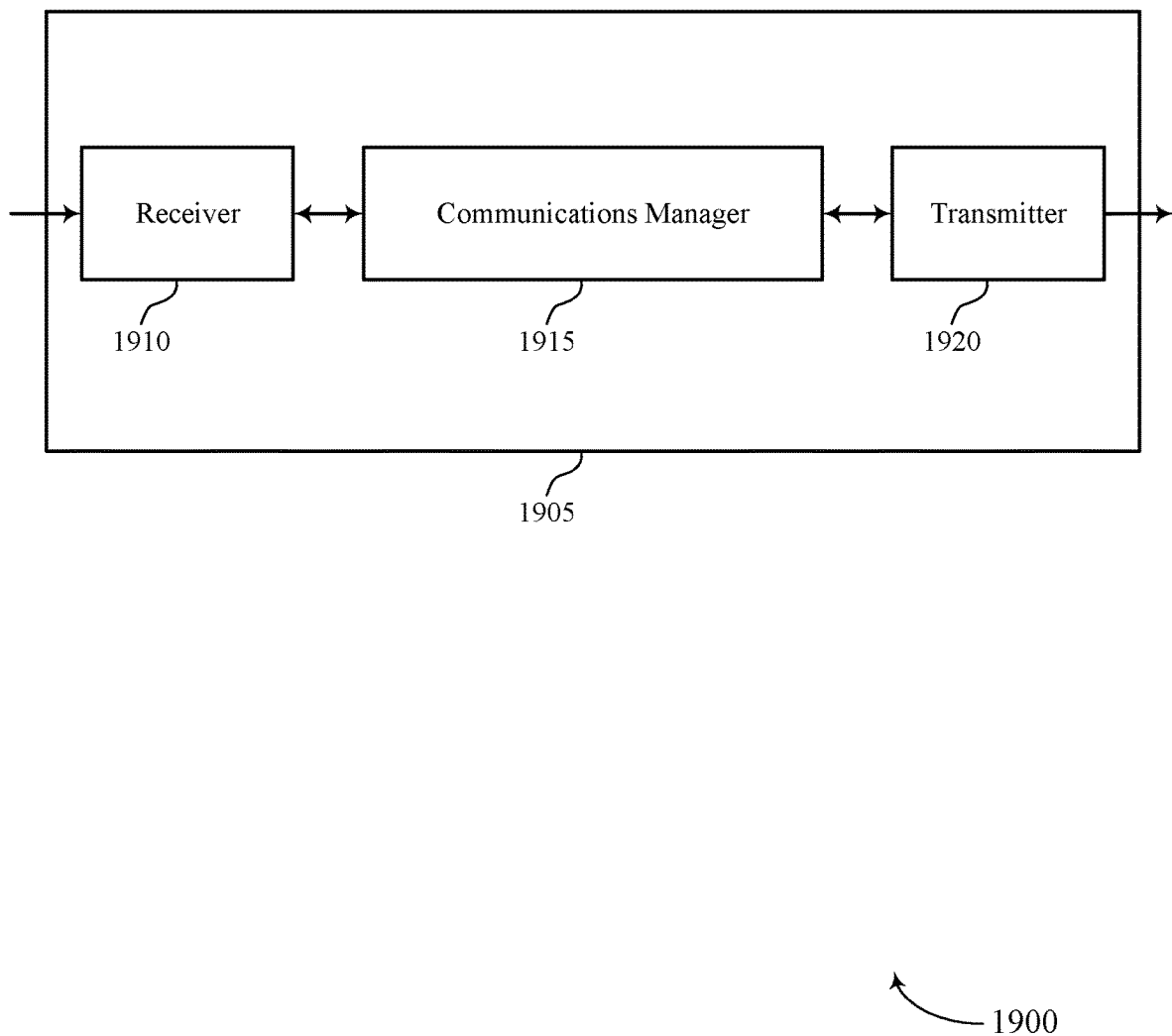
FIGS. 19 and 20 show block diagrams of devices that support mobility robustness and spatial reliability using multi-connectivity in accordance with aspects of the present disclosure.

FIG. 19 shows a block diagram 1900 of a device 1905 that supports mobility robustness and spatial reliability using multi-connectivity in accordance with aspects of the present disclosure. The device 1905 may be an example of aspects of a base station 105 as described herein. The device 1905 may include a receiver 1910, a communications manager 1915, and a transmitter 1920. The device 1905 may also include a processor. Each of these components may be in communication with one another (e.g., via one or more buses).

The receiver 1910 may receive information such as packets, user data, or control information associated with various information channels (e.g., control channels, data channels, and information related to mobility robustness and spatial reliability using multi-connectivity, etc.). Information may be passed on to other components of the device 1905. The receiver 1910 may be an example of aspects of the transceiver 2220 described with reference to FIG. 22. The receiver 1910 may utilize a single antenna or a set of antennas.

The communications manager 1915 may receive a capability message from a UE indicating a multi-connectivity capability of the UE to support more than two concurrent active cell group connections, receive, from the UE, one or more measurement reports that provide measurement information for cells in proximity to the UE, determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station, transmit to the UE, responsive to the capability message and the one or more measurement reports, a multi-connectivity configuration that includes the cell group set, and communicate with the UE via the set of active cell groups in accordance with the multi-connectivity configuration. The communications manager 1915 may be an example of aspects of the communications manager 2210 described herein.

The communications manager 1915, or its sub-components, may be implemented in hardware, code (e.g., software or firmware) executed by a processor, or any combination thereof. If implemented in code executed by a processor, the functions of the communications manager 1915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1915, or its sub-components, may be physically located at various positions, including being distributed such that portions of functions are implemented at different physical locations by one or more physical components. In some examples, the communications manager 1915, or its sub-components, may be a separate and distinct component in accordance with various aspects of the present disclosure. In some examples, the communications manager 1915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1920 may transmit signals generated by other components of the device 1905. In some examples, the transmitter 1920 may be collocated with a receiver 1910 in a transceiver module. For example, the transmitter 1920 may be an example of aspects of the transceiver 2220 described with reference to FIG. 22. The transmitter 1920 may utilize a single antenna or a set of antennas.

Figure 20:
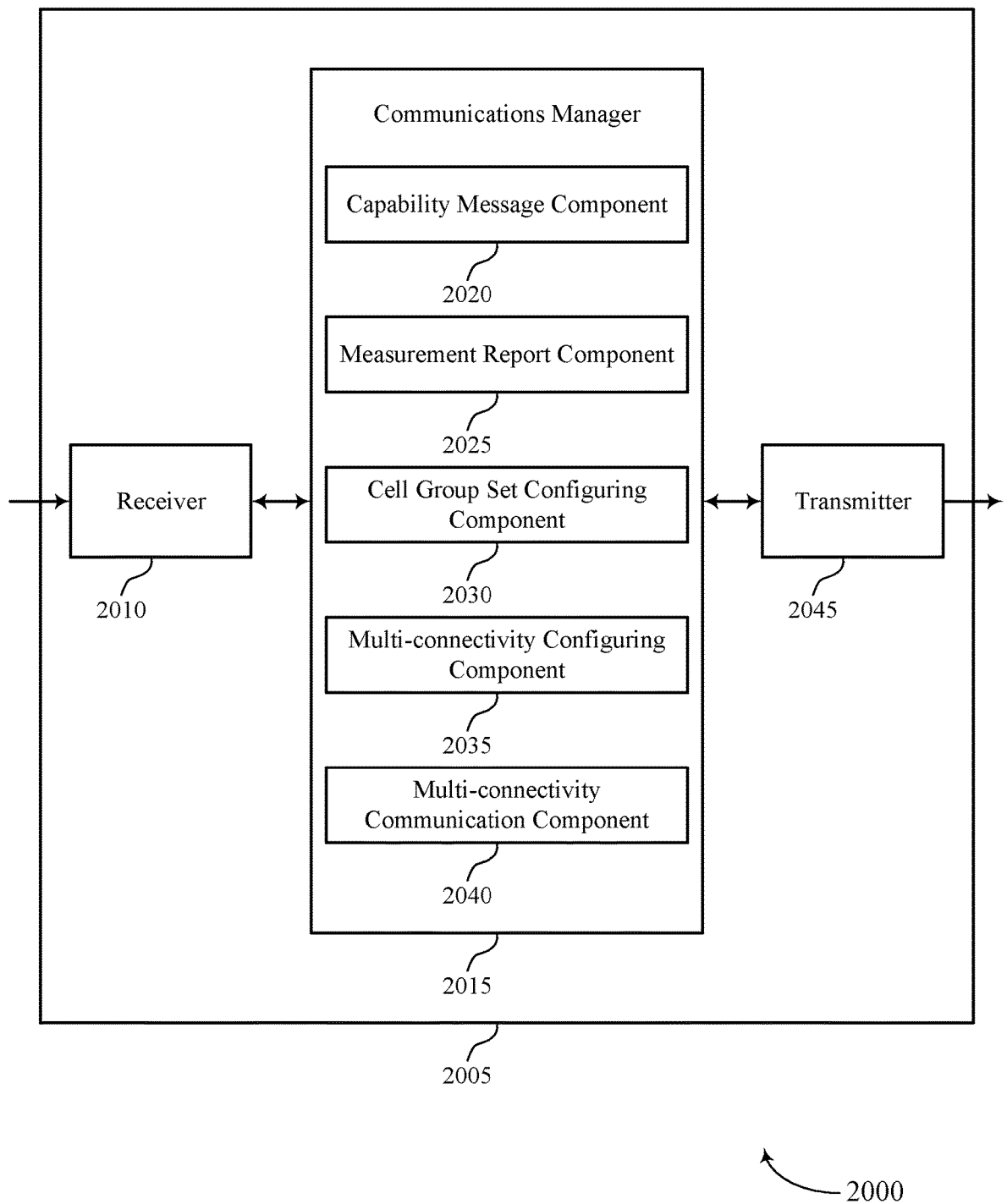

FIG. 20 shows a block diagram 2000 of a device 2005 that supports mobility robustness and spatial reliability using multi-connectivity in accordance with aspects of the present disclosure. The device 2005 may be an example of aspects of a device 1905 or a base station 115 as described herein. The device 2005 may include a receiver 2010, a communications manager 2015, and a transmitter 2045. The device 2005 may also include a processor. Each of these components may be in communication with one another (e.g., via one or more buses).

The receiver 2010 may receive information such as packets, user data, or control information associated with various information channels (e.g., control channels, data channels, and information related to mobility robustness and spatial reliability using multi-connectivity, etc.). Information may be passed on to other components of the device 2005. The receiver 2010 may be an example of aspects of the transceiver 2220 described with reference to FIG. 22. The receiver 2010 may utilize a single antenna or a set of antennas.

The communications manager 2015 may be an example of aspects of the communications manager 1915 as described herein. The communications manager 2015 may include a capability message component 2020, a measurement report component 2025, a cell group set configuring component 2030, a multi-connectivity configuring component 2035, and a multi-connectivity communication component 2040. The communications manager 2015 may be an example of aspects of the communications manager 2210 described herein.

The capability message component 2020 may receive a capability message from a UE indicating a multi-connectivity capability of the UE to support more than two concurrent active cell group connections. In some cases, the capability message component 2020 may forward the multi-connectivity capability of the UE to a network entity associated with device 2005 (e.g., a network entity of the core network to which device 2005 is connected).

The measurement report component 2025 may receive, from the UE, one or more measurement reports that provide measurement information for cells in proximity to the UE.

The cell group set configuring component 2030 may determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station.

The multi-connectivity configuring component 2035 may transmit to the UE, responsive to the capability message and the one or more measurement reports, a multi-connectivity configuration that includes the cell group set. In some case, the multi-connectivity configuring component 2035 may determine to transmit the multi-connectivity configuration to the UE based at least in part on the a number of DUs connected to a CU serving the UE.

The multi-connectivity communication component 2040 may communicate with the UE via the set of active cell groups in accordance with the multi-connectivity configuration.

The transmitter 2045 may transmit signals generated by other components of the device 2005. In some examples, the transmitter 2045 may be collocated with a receiver 2010 in a transceiver module. For example, the transmitter 2045 may be an example of aspects of the transceiver 2220 described with reference to FIG. 22. The transmitter 2045 may utilize a single antenna or a set of antennas.

Figure 21:
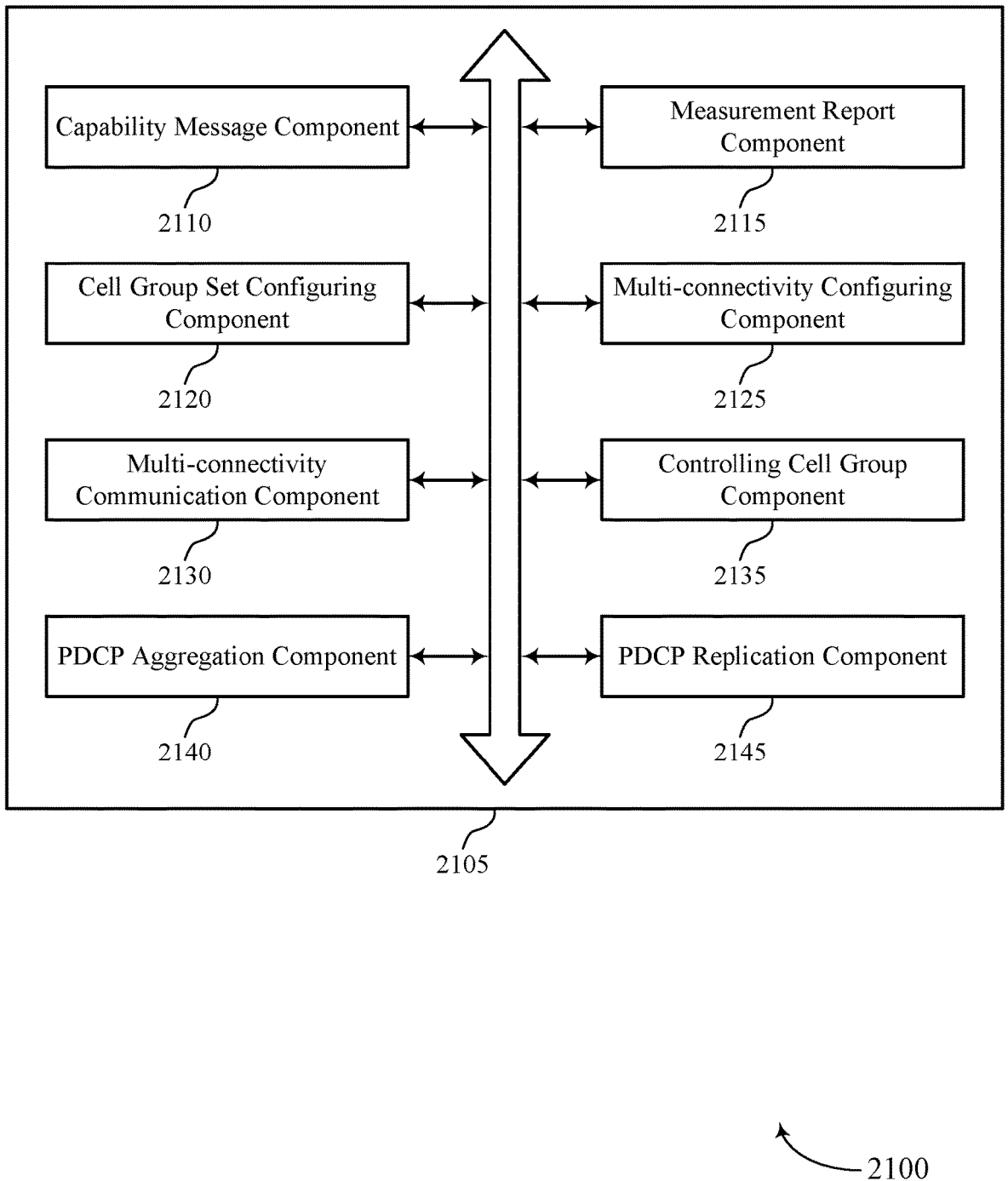
FIG. 21 shows a block diagram of a communications manager that supports mobility robustness and spatial reliability using multi-connectivity in accordance with aspects of the present disclosure.

FIG. 21 shows a block diagram 2100 of a communications manager 2105 that supports mobility robustness and spatial reliability using multi-connectivity in accordance with aspects of the present disclosure. The communications manager 2105 may be an example of aspects of a communications manager 1915, a communications manager 2015, or a communications manager 2210 described herein. The communications manager 2105 may include a capability message component 2110, a measurement report component 2115, a cell group set configuring component 2120, a multi-connectivity configuring component 2125, a multi-connectivity communication component 2130, a controlling cell group component 2135, a PDCP aggregation component 2140, and a PDCP replication component 2145. Each of these modules may communicate, directly or indirectly, with one another (e.g., via one or more buses).

The capability message component 2110 may receive a capability message from a UE indicating a multi-connectivity capability of the UE to support more than two concurrent active cell group connections.

The measurement report component 2115 may receive, from the UE, one or more measurement reports that provide measurement information for cells in proximity to the UE.

In some examples, the measurement report component 2115 may determine, based on the one or more measurement reports, that the cell group set is to further include one or more inactive cell groups to which the UE is connected but for which the UE lacks an allocation of uplink or downlink physical resources.

In some examples, the measurement report component 2115 may include an identification of the one or more inactive cell groups in the multi-connectivity configuration. In some examples, the measurement report component 2115 may receive from the UE one or more additional measurement reports identifying channel conditions associated with at least the set of active cell groups and the one or more inactive cell groups.

The cell group set configuring component 2120 may determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station. In some examples, the cell group set configuring component 2120 may determine the cell group set occurs by a CU of the base station.

In some examples, the cell group set configuring component 2120 may determine a number of the set of cell groups to be included in the cell group set based on the multi-connectivity capability of the UE, service requirements of DRBs configured for the UE, throughput or reliability requirements of DRBs configured for the UE, a location of the UE, channel conditions affecting communications with the UE, battery resources of the UE, other device resource conditions having an effect on capabilities of the UE, or combinations thereof.

In some cases, the CU of the base station communicates with DUs of the base station corresponding to each cell group of the cell group set via an F1 interface or a W1 interface. In some cases, the set of cell groups included in the cell group set include cell groups for both NR and LTE RATs. In some cases, the set of cell groups included in the cell group set include cell groups for a same type of RAT.

In some cases, each of the set of cell groups of the cell group set includes a set of cells configured for a same DU of the base station and managed by a single MAC entity, and where all of the set of cell groups of the cell group set are associated with a same CU of the base station.

The multi-connectivity configuring component 2125 may transmit to the UE, responsive to the capability message and the one or more measurement reports, a multi-connectivity configuration that includes the cell group set.

In some examples, the multi-connectivity configuring component 2125 may transmit an update to the multi-connectivity configuration based on the one or more additional measurement reports. In some examples, the multi-connectivity configuring component 2125 may determine that the update to the multi-connectivity configuration is associated with adding an additional cell group to the cell group set.

In some examples, the multi-connectivity configuring component 2125 may configure a DU of the base station and associated with the additional cell group with a UE context of the UE.

In some examples, transmitting the update to the multi-connectivity configuration includes transmitting a RRC signal indicating that the additional cell group is to be added to the cell group set.

In some examples, the multi-connectivity configuring component 2125 may transmit updated radio bearer and cell group configuration information associated with the additional cell group. In some examples, the multi-connectivity configuring component 2125 may determine that the update to the multi-connectivity configuration is associated with activating an inactive cell group to an active cell group. In some examples, the multi-connectivity configuring component 2125 may indicate the activating to a DU of the base station and associated with the cell group to be activated via an flag.

In some examples, transmitting the update to the multi-connectivity configuration includes transmitting a medium access control MAC CE or RRC signal indicating that the inactive cell group has been changed to be an active cell group.

In some examples, the multi-connectivity configuring component 2125 may determine that the update to the multi-connectivity configuration is associated with deactivating an active cell group to an inactive cell group. In some examples, the multi-connectivity configuring component 2125 may indicate the deactivating to a DU of the base station and associated with the cell group to be deactivated via a flag.

In some examples, transmitting the update to the multi-connectivity configuration includes transmitting a medium access control MAC CE or RRC signal indicating that the active cell group has been changed to be an inactive cell group.

In some examples, the multi-connectivity configuring component 2125 may determine that the update to the multi-connectivity configuration is associated with releasing a cell group from the cell group set. In some examples, the multi-connectivity configuring component 2125 may release a UE context of the UE from a DU of the base station and associated with the cell group to be released.

In some examples, transmitting the update to the multi-connectivity configuration includes transmitting a RRC signal indicating that either an active cell group or an inactive cell group has been released and is no longer a part of the cell group set.

In some examples, the multi-connectivity configuring component 2125 may determine, at a CU of the base station and based on information received from the UE and associated DUs of the base station, which DRBs are to be enabled for PDCP aggregation and which DRBs are to be enabled for PDCP replication.

In some examples, the multi-connectivity configuring component 2125 may determine, at a DU of the base station, which DRBs are to be enabled for PDCP aggregation and which DRBs are to be enabled for PDCP replication. In some examples, the multi-connectivity configuring component 2125 may signal the determination to a CU of the base station. In some examples, the multi-connectivity configuring component 2125 may transmit a conditional indication of which cell groups of the set of active cell groups are to be configured for DRB PDCP aggregation and of which cell groups of the set of active cell groups are to be configured for DRB PDCP replication.

In some cases, the additional cell group is either an active cell group or an inactive cell group.

The multi-connectivity communication component 2130 may communicate with the UE via the set of active cell groups in accordance with the multi-connectivity configuration.

The controlling cell group component 2135 may determine that two or more of the set of active cell groups are controlling cell groups.

In some examples, the controlling cell group component 2135 may transmit, via a RRC message, an indicator that the two or more of the set of active cell groups are controlling cell groups.

In some examples, the controlling cell group component 2135 may transmit an allocation of SRB resources for each of the controlling cell groups without also transmitting an indicator that the two or more of the set of active cell groups are controlling cell groups.

In some examples, the controlling cell group component 2135 may receive a declaration of RLF when RLF occurs on each of the controlling cell groups.

In some examples, the controlling cell group component 2135 may receive a report from the UE indicating that one or more of the controlling cell groups is one or more selected controlling cell groups having better conditions or performance metrics than other controlling cell groups.

In some examples, the controlling cell group component 2135 may transmit at least one of SI notifications, PWS notifications, CN registration area notifications, or RAN notifications via the one or more selected controlling cell groups.

The PDCP aggregation component 2140 may transmit an indication of which cell groups of the set of active cell groups are to be configured for PDCP aggregation such that data associated with a DRB having a throughput requirement above at least one threshold is distributed across the indicated cell groups having an aggregate throughput that satisfies the throughput requirement of the DRB.

In some cases, the at least one threshold is a set of predetermined thresholds, with each of the set of predetermined thresholds corresponding to one of the indicated cell groups, and where the data associated with the DRB is distributed across the indicated cell groups in accordance with the set of predetermined thresholds.

In some cases, the at least one threshold is one or more conditional thresholds, with each of the one or more conditional thresholds corresponding to a predetermined quality of a link connection associated with the indicated cell groups.

The PDCP replication component 2145 may transmit an indication of which cell groups of the set of active cell groups are to be configured for PDCP replication such that data associated with a DRB having a latency or reliability requirement above a threshold is replicated across the indicated cell groups.

In some cases, the indication includes one or more replication flags corresponding to each of the indicated cell groups.

Figure 22:
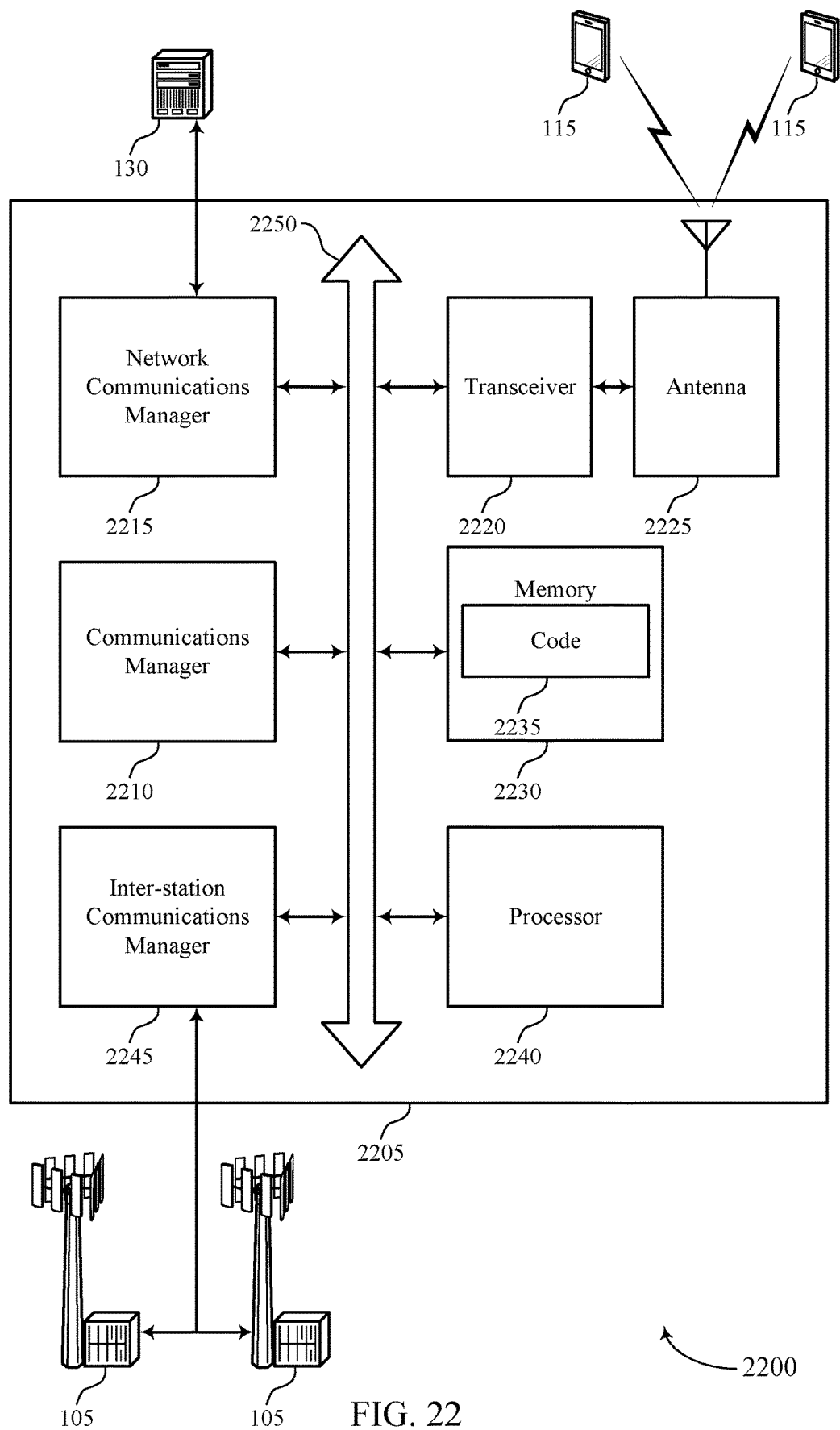
FIG. 22 shows a diagram of a system including a device that supports mobility robustness and spatial reliability using multi-connectivity in accordance with aspects of the present disclosure.

FIG. 22 shows a diagram of a system 2200 including a device 2205 that supports mobility robustness and spatial reliability using multi-connectivity in accordance with aspects of the present disclosure. The device 2205 may be an example of or include the components of device 1905, device 2005, or a base station 105 as described herein. The device 2205 may include components for bi-directional voice and data communications including components for transmitting and receiving communications, including a communications manager 2210, a network communications manager 2215, a transceiver 2220, an antenna 2225, memory 2230, a processor 2240, and an inter-station communications manager 2245. These components may be in electronic communication via one or more buses (e.g., bus 2250).

The communications manager 2210 may receive a capability message from a UE indicating a multi-connectivity capability of the UE to support more than two concurrent active cell group connections, receive, from the UE, one or more measurement reports that provide measurement information for cells in proximity to the UE, determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station, transmit to the UE, responsive to the capability message and the one or more measurement reports, a multi-connectivity configuration that includes the cell group set, and communicate with the UE via the set of active cell groups in accordance with the multi-connectivity configuration.

The network communications manager 2215 may manage communications with the core network (e.g., via one or more wired backhaul links). For example, the network communications manager 2215 may manage the transfer of data communications for client devices, such as one or more UEs 115.

The transceiver 2220 may communicate bi-directionally, via one or more antennas, wired, or wireless links as described above. For example, the transceiver 2220 may represent a wireless transceiver and may communicate bi-directionally with another wireless transceiver. The transceiver 2220 may also include a modem to modulate the packets and provide the modulated packets to the antennas for transmission, and to demodulate packets received from the antennas.

In some cases, the wireless device may include a single antenna 2225. However, in some cases the device may have more than one antenna 2225, which may be capable of concurrently transmitting or receiving multiple wireless transmissions.

The memory 2230 may include RAM, ROM, or a combination thereof. The memory 2230 may store computer-readable code 2235 including instructions that, when executed by a processor (e.g., the processor 2240) cause the device to perform various functions described herein. In some cases, the memory 2230 may contain, among other things, a BIOS which may control basic hardware or software operation such as the interaction with peripheral components or devices.

The processor 2240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2240 may be configured to operate a memory array using a memory controller. In some cases, a memory controller may be integrated into processor 2240. The processor 2240 may be configured to execute computer-readable instructions stored in a memory (e.g., the memory 2230) to cause the device 2205 to perform various functions (e.g., functions or tasks supporting mobility robustness and spatial reliability using multi-connectivity).

The inter-station communications manager 2245 may manage communications with other base station 105, and may include a controller or scheduler for controlling communications with UEs 115 in cooperation with other base stations 105. For example, the inter-station communications manager 2245 may coordinate scheduling for transmissions to UEs 115 for various interference mitigation techniques such as beamforming or joint transmission. In some examples, the inter-station communications manager 2245 may provide an X2 interface within an LTE/LTE-A wireless communication network technology to provide communication between base stations 105.

The code 2235 may include instructions to implement aspects of the present disclosure, including instructions to support wireless communications. The code 2235 may be stored in a non-transitory computer-readable medium such as system memory or other type of memory. In some cases, the code 2235 may not be directly executable by the processor 2240 but may cause a computer (e.g., when compiled and executed) to perform functions described herein.

Figure 23:
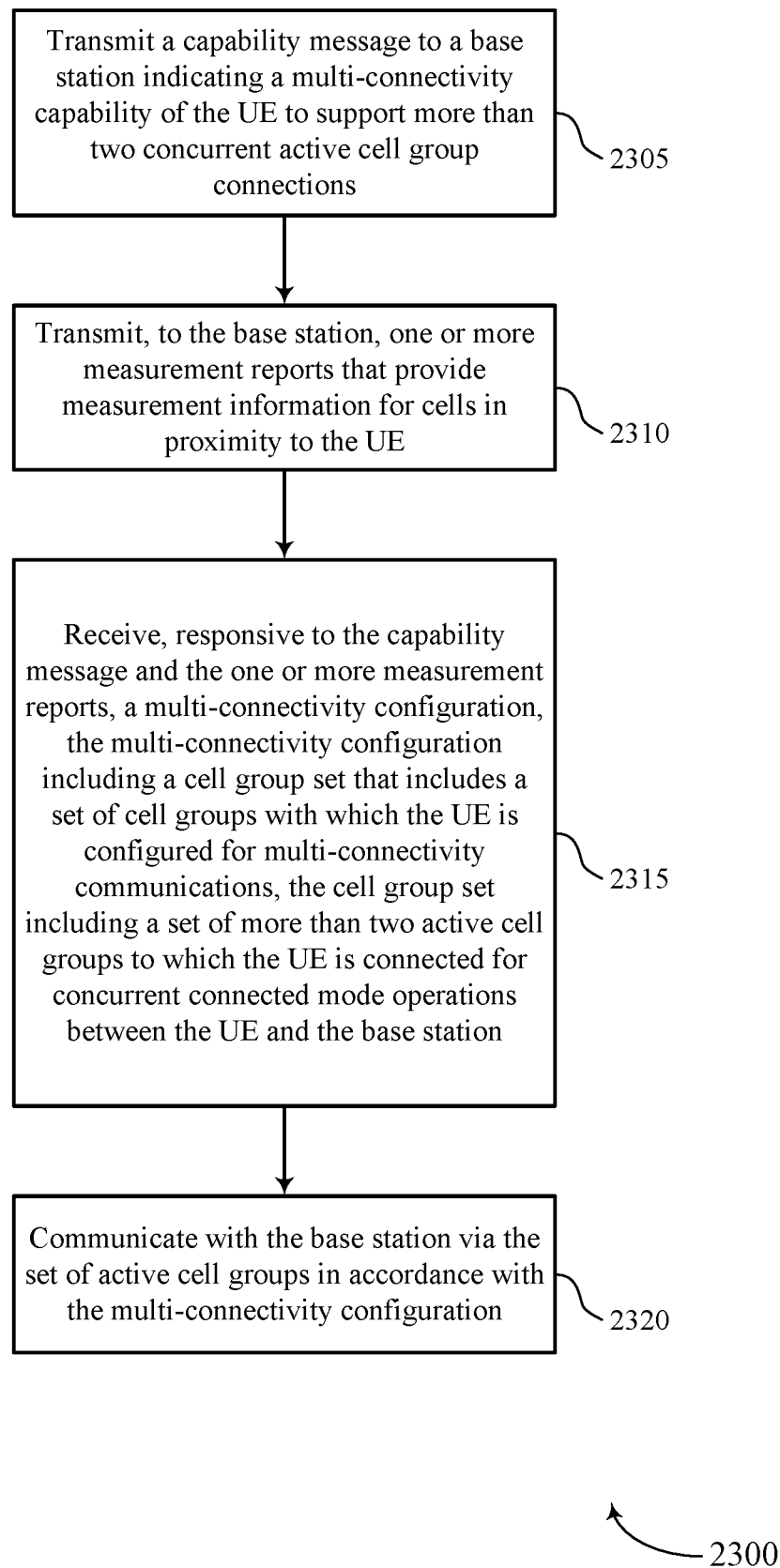
FIGS. 23 through 28 show flowcharts illustrating methods that support mobility robustness and spatial reliability using multi-connectivity in accordance with aspects of the present disclosure.

FIG. 23 shows a flowchart illustrating a method 2300 that supports mobility robustness and spatial reliability using multi-connectivity in accordance with aspects of the present disclosure. The operations of method 2300 may be implemented by a UE 115 or its components as described herein. For example, the operations of method 2300 may be performed by a communications manager as described with reference to FIGS. 15 through 18. In some examples, a UE may execute a set of instructions to control the functional elements of the UE to perform the functions described below. Additionally or alternatively, a UE may perform aspects of the functions described below using special-purpose hardware.

At 2305, the UE may transmit a capability message to a base station indicating a multi-connectivity capability of the UE to support more than two concurrent active cell group connections. The operations of 2305 may be performed according to the methods described herein. In some examples, aspects of the operations of 2305 may be performed by a capability message component as described with reference to FIGS. 15 through 18.

At 2310, the UE may transmit, to the base station, one or more measurement reports that provide measurement information for cells in proximity to the UE. The operations of 2310 may be performed according to the methods described herein. In some examples, aspects of the operations of 2310 may be performed by a measurement report component as described with reference to FIGS. 15 through 18.

At 2315, the UE may receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station. The operations of 2315 may be performed according to the methods described herein. In some examples, aspects of the operations of 2315 may be performed by a multi-connectivity configuration component as described with reference to FIGS. 15 through 18.

At 2320, the UE may communicate with the base station via the set of active cell groups in accordance with the multi-connectivity configuration. The operations of 2320 may be performed according to the methods described herein. In some examples, aspects of the operations of 2320 may be performed by a multi-connectivity communication component as described with reference to FIGS. 15 through 18.

Figure 24:
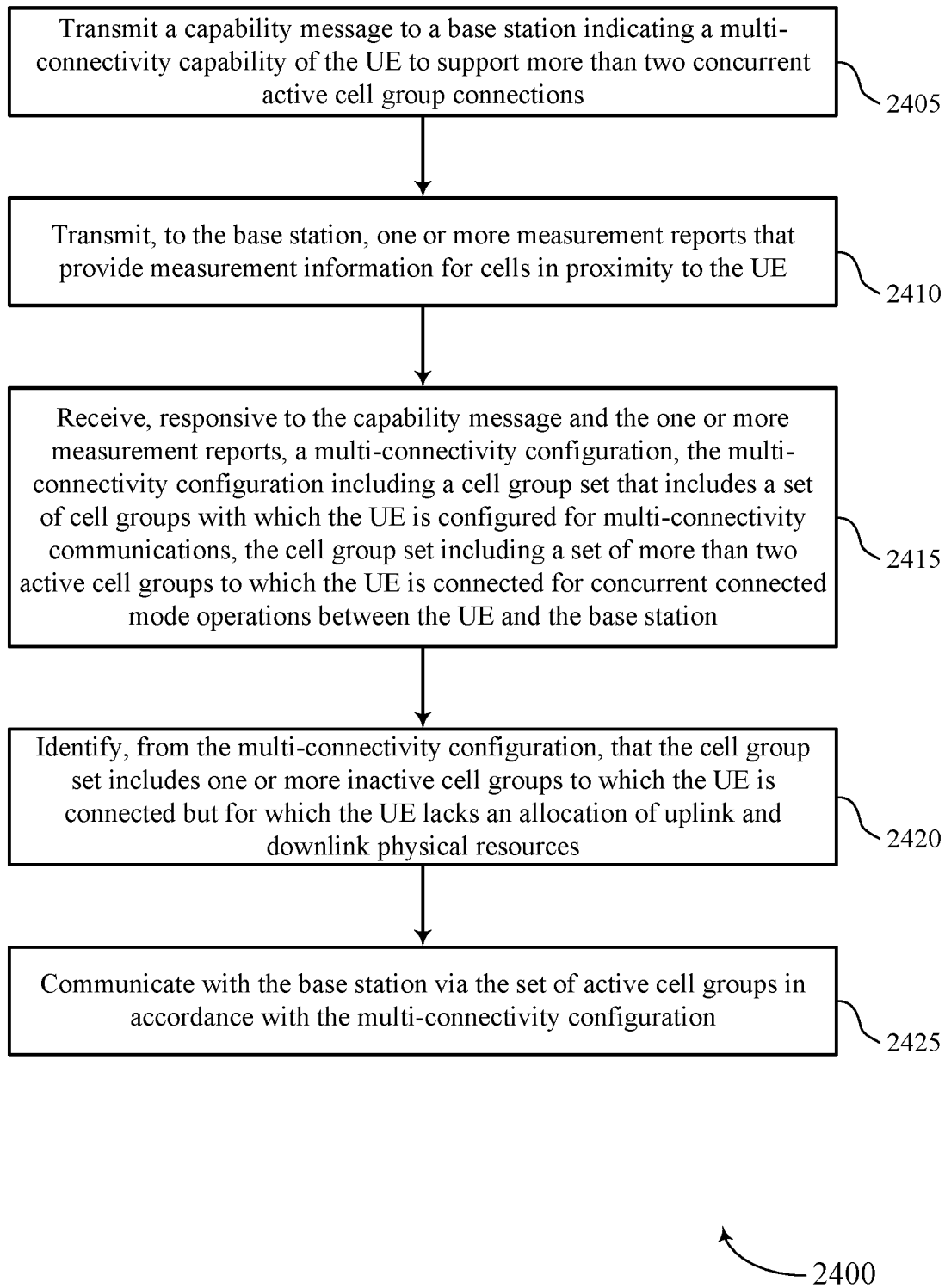

FIG. 24 shows a flowchart illustrating a method 2400 that supports mobility robustness and spatial reliability using multi-connectivity in accordance with aspects of the present disclosure. The operations of method 2400 may be implemented by a UE 115 or its components as described herein. For example, the operations of method 2400 may be performed by a communications manager as described with reference to FIGS. 15 through 18. In some examples, a UE may execute a set of instructions to control the functional elements of the UE to perform the functions described below. Additionally or alternatively, a UE may perform aspects of the functions described below using special-purpose hardware.

At 2405, the UE may transmit a capability message to a base station indicating a multi-connectivity capability of the UE to support more than two concurrent active cell group connections. The operations of 2405 may be performed according to the methods described herein. In some examples, aspects of the operations of 2405 may be performed by a capability message component as described with reference to FIGS. 15 through 18.

At 2410, the UE may transmit, to the base station, one or more measurement reports that provide measurement information for cells in proximity to the UE. The operations of 2410 may be performed according to the methods described herein. In some examples, aspects of the operations of 2410 may be performed by a measurement report component as described with reference to FIGS. 15 through 18.

At 2415, the UE may receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station. The operations of 2415 may be performed according to the methods described herein. In some examples, aspects of the operations of 2415 may be performed by a multi-connectivity configuration component as described with reference to FIGS. 15 through 18.

At 2420, the UE may identify, from the multi-connectivity configuration, that the cell group set includes one or more inactive cell groups to which the UE is connected but for which the UE lacks an allocation of uplink and downlink physical resources. The operations of 2420 may be performed according to the methods described herein. In some examples, aspects of the operations of 2420 may be performed by a multi-connectivity configuration component as described with reference to FIGS. 15 through 18.

At 2425, the UE may communicate with the base station via the set of active cell groups in accordance with the multi-connectivity configuration. The operations of 2425 may be performed according to the methods described herein. In some examples, aspects of the operations of 2425 may be performed by a multi-connectivity communication component as described with reference to FIGS. 15 through 18.

Figure 25:
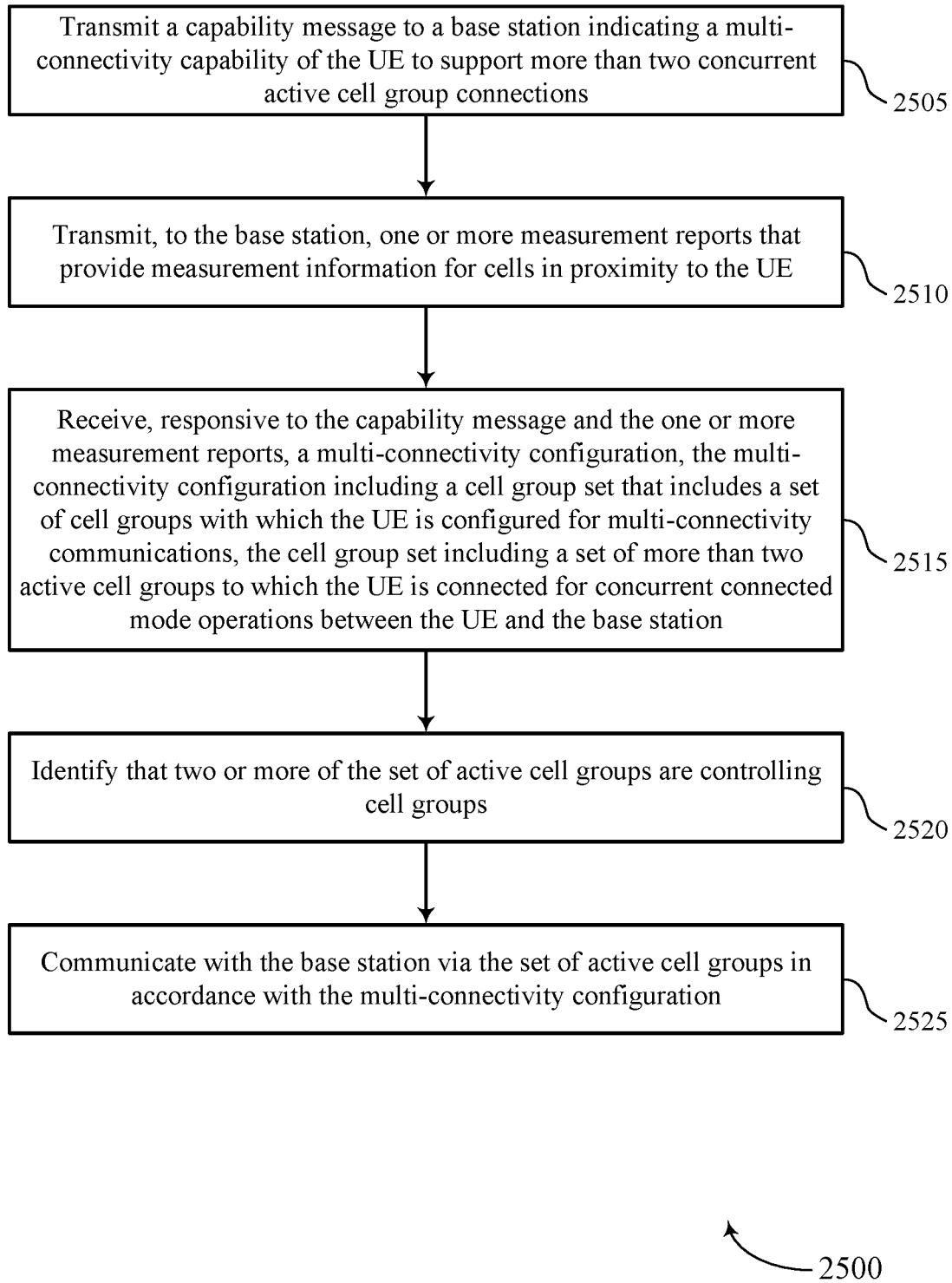

FIG. 25 shows a flowchart illustrating a method 2500 that supports mobility robustness and spatial reliability using multi-connectivity in accordance with aspects of the present disclosure. The operations of method 2500 may be implemented by a UE 115 or its components as described herein. For example, the operations of method 2500 may be performed by a communications manager as described with reference to FIGS. 15 through 18. In some examples, a UE may execute a set of instructions to control the functional elements of the UE to perform the functions described below. Additionally or alternatively, a UE may perform aspects of the functions described below using special-purpose hardware.

At 2505, the UE may transmit a capability message to a base station indicating a multi-connectivity capability of the UE to support more than two concurrent active cell group connections. The operations of 2505 may be performed according to the methods described herein. In some examples, aspects of the operations of 2505 may be performed by a capability message component as described with reference to FIGS. 15 through 18.

At 2510, the UE may transmit, to the base station, one or more measurement reports that provide measurement information for cells in proximity to the UE. The operations of 2510 may be performed according to the methods described herein. In some examples, aspects of the operations of 2510 may be performed by a measurement report component as described with reference to FIGS. 15 through 18.

At 2515, the UE may receive, responsive to the capability message and the one or more measurement reports, a multi-connectivity configuration, the multi-connectivity configuration including a cell group set that includes a set of cell groups with which the UE is configured for multi-connectivity communications, the cell group set including a set of more than two active cell groups to which the UE is connected for concurrent connected mode operations between the UE and the base station. The operations of 2515 may be performed according to the methods described herein. In some examples, aspects of the operations of 2515 may be performed by a multi-connectivity configuration component as described with reference to FIGS. 15 through 18.

At 2520, the UE may identify that two or more of the set of active cell groups are controlling cell groups. The operations of 2520 may be performed according to the methods described herein. In some examples, aspects of the operations of 2520 may be performed by a controlling cell group component as described with reference to FIGS. 15 through 18.

At 2525, the UE may communicate with the base station via the set of active cell groups in accordance with the multi-connectivity configuration. The operations of 2525 may be performed according to the methods described herein. In some examples, aspects of the operations of 2525 may be performed by a multi-connectivity communication component as described with reference to FIGS. 15 through 18.

Figure 26:
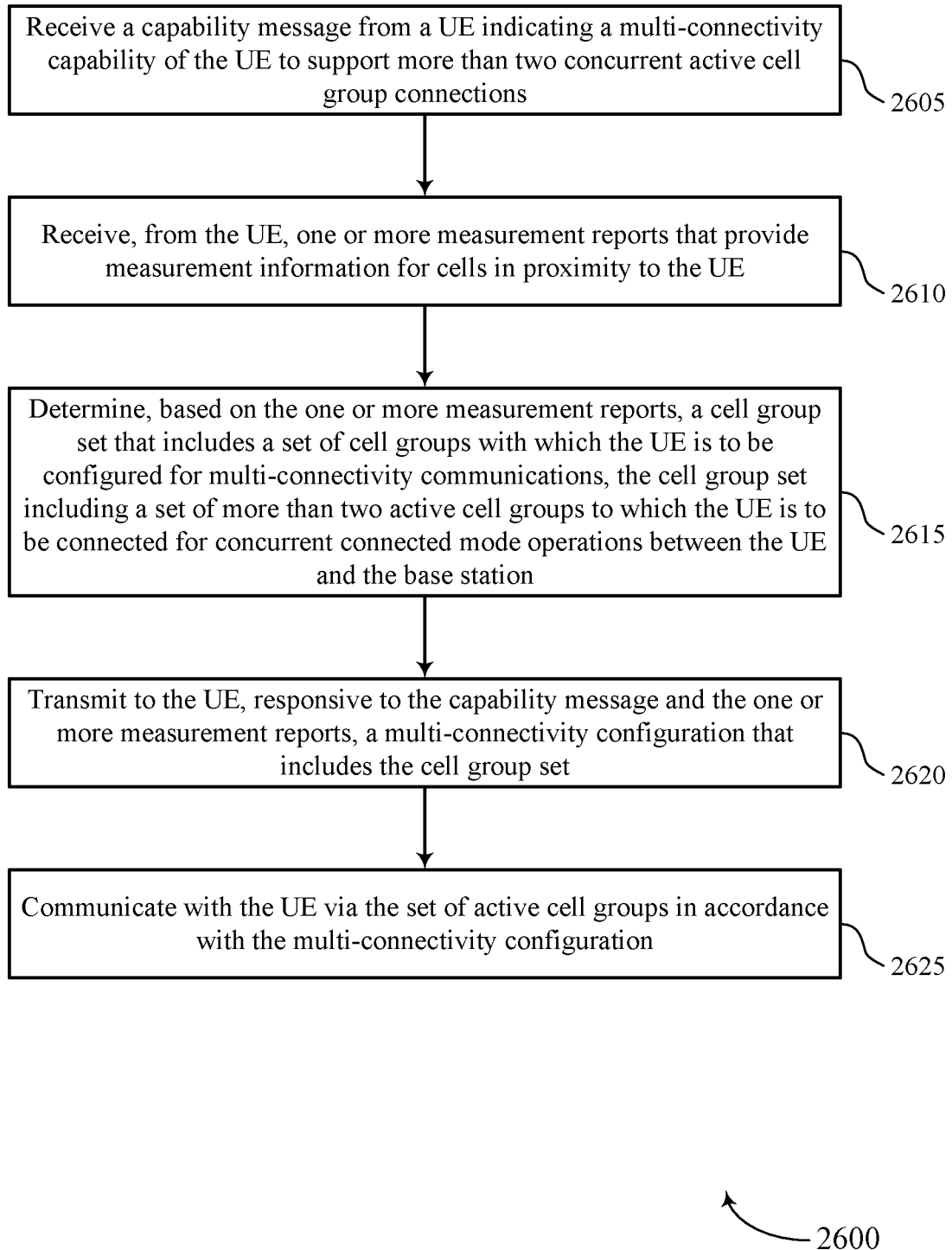

FIG. 26 shows a flowchart illustrating a method 2600 that supports mobility robustness and spatial reliability using multi-connectivity in accordance with aspects of the present disclosure. The operations of method 2600 may be implemented by a base station 105 or its components as described herein. For example, the operations of method 2600 may be performed by a communications manager as described with reference to FIGS. 19 through 22. In some examples, a base station may execute a set of instructions to control the functional elements of the base station to perform the functions described below. Additionally or alternatively, a base station may perform aspects of the functions described below using special-purpose hardware.

At 2605, the base station may receive a capability message from a UE indicating a multi-connectivity capability of the UE to support more than two concurrent active cell group connections. The operations of 2605 may be performed according to the methods described herein. In some examples, aspects of the operations of 2605 may be performed by a capability message component as described with reference to FIGS. 19 through 22.

At 2610, the base station may receive, from the UE, one or more measurement reports that provide measurement information for cells in proximity to the UE. The operations of 2610 may be performed according to the methods described herein. In some examples, aspects of the operations of 2610 may be performed by a measurement report component as described with reference to FIGS. 19 through 22.

At 2615, the base station may determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station. The operations of 2615 may be performed according to the methods described herein. In some examples, aspects of the operations of 2615 may be performed by a cell group set configuring component as described with reference to FIGS. 19 through 22.

At 2620, the base station may transmit to the UE, responsive to the capability message and the one or more measurement reports, a multi-connectivity configuration that includes the cell group set. The operations of 2620 may be performed according to the methods described herein. In some examples, aspects of the operations of 2620 may be performed by a multi-connectivity configuring component as described with reference to FIGS. 19 through 22.

At 2625, the base station may communicate with the UE via the set of active cell groups in accordance with the multi-connectivity configuration. The operations of 2625 may be performed according to the methods described herein. In some examples, aspects of the operations of 2625 may be performed by a multi-connectivity communication component as described with reference to FIGS. 19 through 22.

Figure 27:
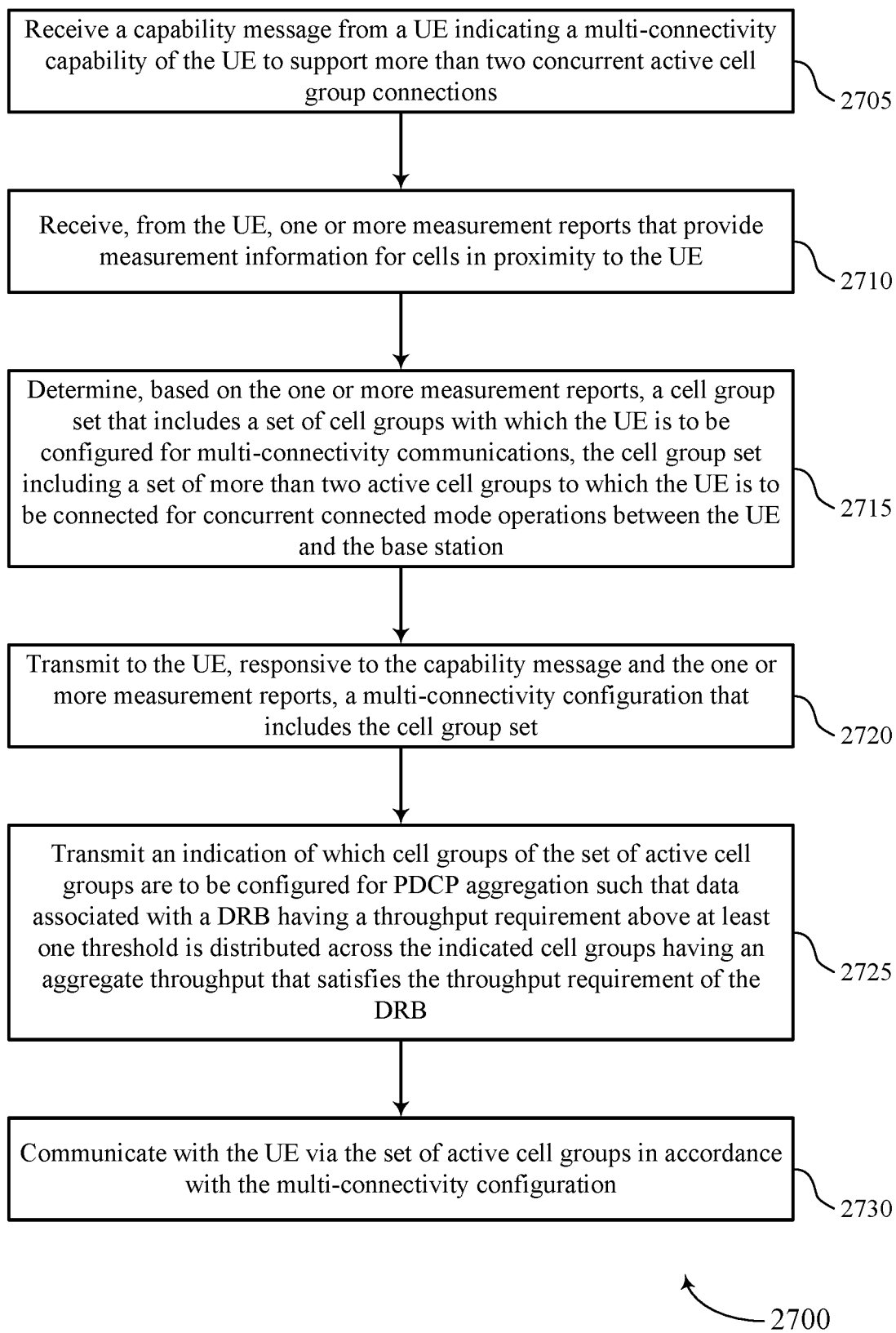

FIG. 27 shows a flowchart illustrating a method 2700 that supports mobility robustness and spatial reliability using multi-connectivity in accordance with aspects of the present disclosure. The operations of method 2700 may be implemented by a base station 105 or its components as described herein. For example, the operations of method 2700 may be performed by a communications manager as described with reference to FIGS. 19 through 22. In some examples, a base station may execute a set of instructions to control the functional elements of the base station to perform the functions described below. Additionally or alternatively, a base station may perform aspects of the functions described below using special-purpose hardware.

At 2705, the base station may receive a capability message from a UE indicating a multi-connectivity capability of the UE to support more than two concurrent active cell group connections. The operations of 2705 may be performed according to the methods described herein. In some examples, aspects of the operations of 2705 may be performed by a capability message component as described with reference to FIGS. 19 through 22.

At 2710, the base station may receive, from the UE, one or more measurement reports that provide measurement information for cells in proximity to the UE. The operations of 2710 may be performed according to the methods described herein. In some examples, aspects of the operations of 2710 may be performed by a measurement report component as described with reference to FIGS. 19 through 22.

At 2715, the base station may determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station. The operations of 2715 may be performed according to the methods described herein. In some examples, aspects of the operations of 2715 may be performed by a cell group set configuring component as described with reference to FIGS. 19 through 22.

At 2720, the base station may transmit to the UE, responsive to the capability message and the one or more measurement reports, a multi-connectivity configuration that includes the cell group set. The operations of 2720 may be performed according to the methods described herein. In some examples, aspects of the operations of 2720 may be performed by a multi-connectivity configuring component as described with reference to FIGS. 19 through 22.

At 2725, the base station may transmit an indication of which cell groups of the set of active cell groups are to be configured for PDCP aggregation such that data associated with a DRB having a throughput requirement above at least one threshold is distributed across the indicated cell groups having an aggregate throughput that satisfies the throughput requirement of the DRB. The operations of 2725 may be performed according to the methods described herein. In some examples, aspects of the operations of 2725 may be performed by a PDCP aggregation component as described with reference to FIGS. 19 through 22.

At 2730, the base station may communicate with the UE via the set of active cell groups in accordance with the multi-connectivity configuration. The operations of 2730 may be performed according to the methods described herein. In some examples, aspects of the operations of 2730 may be performed by a multi-connectivity communication component as described with reference to FIGS. 19 through 22.

Figure 28:
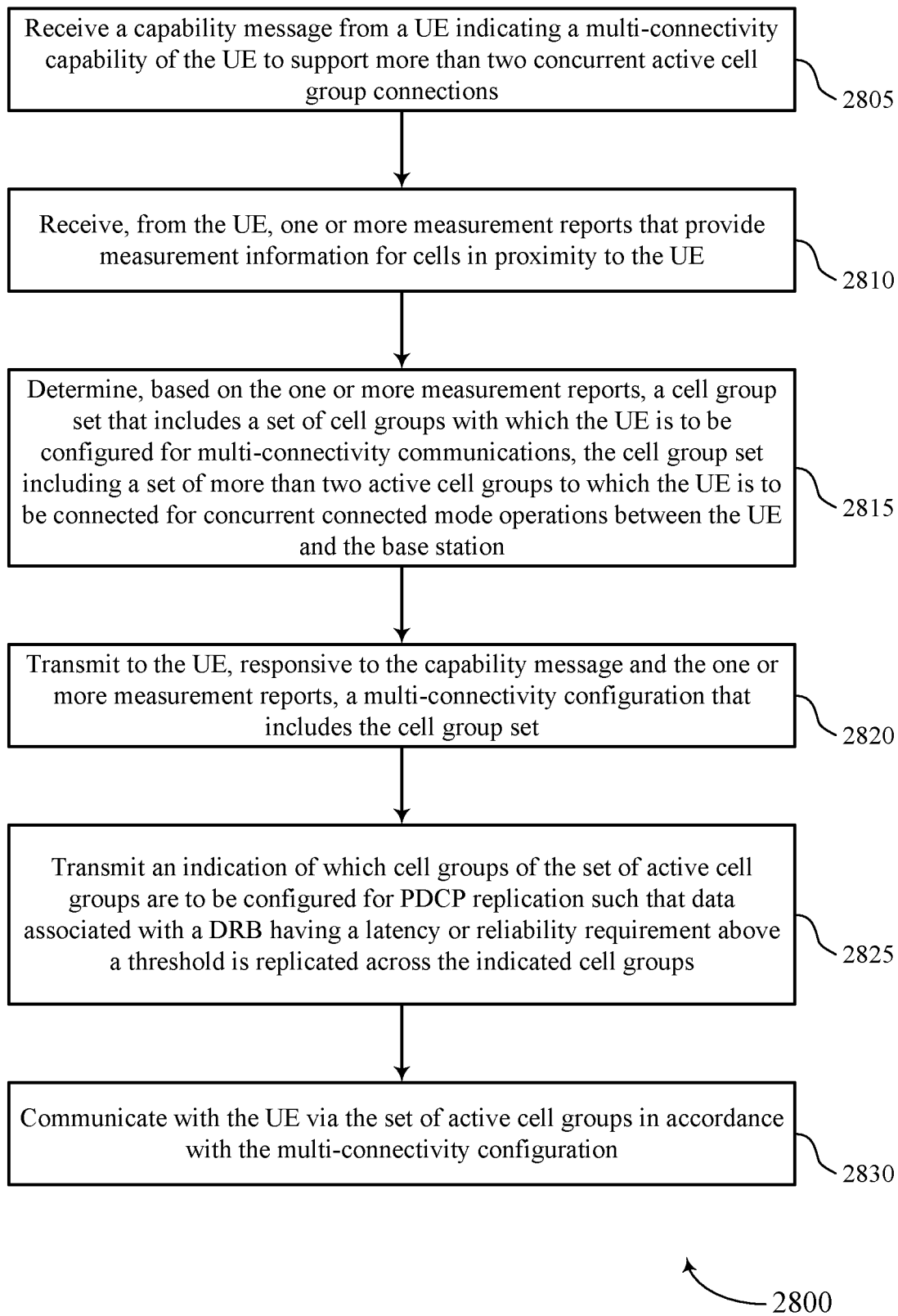

FIG. 28 shows a flowchart illustrating a method 2800 that supports mobility robustness and spatial reliability using multi-connectivity in accordance with aspects of the present disclosure. The operations of method 2800 may be implemented by a base station 105 or its components as described herein. For example, the operations of method 2800 may be performed by a communications manager as described with reference to FIGS. 19 through 22. In some examples, a base station may execute a set of instructions to control the functional elements of the base station to perform the functions described below. Additionally or alternatively, a base station may perform aspects of the functions described below using special-purpose hardware.

At 2805, the base station may receive a capability message from a UE indicating a multi-connectivity capability of the UE to support more than two concurrent active cell group connections. The operations of 2805 may be performed according to the methods described herein. In some examples, aspects of the operations of 2805 may be performed by a capability message component as described with reference to FIGS. 19 through 22.

At 2810, the base station may receive, from the UE, one or more measurement reports that provide measurement information for cells in proximity to the UE. The operations of 2810 may be performed according to the methods described herein. In some examples, aspects of the operations of 2810 may be performed by a measurement report component as described with reference to FIGS. 19 through 22.

At 2815, the base station may determine, based on the one or more measurement reports, a cell group set that includes a set of cell groups with which the UE is to be configured for multi-connectivity communications, the cell group set including a set of more than two active cell groups to which the UE is to be connected for concurrent connected mode operations between the UE and the base station. The operations of 2815 may be performed according to the methods described herein. In some examples, aspects of the operations of 2815 may be performed by a cell group set configuring component as described with reference to FIGS. 19 through 22.

At 2820, the base station may transmit to the UE, responsive to the capability message and the one or more measurement reports, a multi-connectivity configuration that includes the cell group set. The operations of 2820 may be performed according to the methods described herein. In some examples, aspects of the operations of 2820 may be performed by a multi-connectivity configuring component as described with reference to FIGS. 19 through 22.

At 2825, the base station may transmit an indication of which cell groups of the set of active cell groups are to be configured for PDCP replication such that data associated with a DRB having a latency or reliability requirement above at least one threshold is replicated across the indicated cell groups. The operations of 2825 may be performed according to the methods described herein. In some examples, aspects of the operations of 2825 may be performed by a PDCP replication component as described with reference to FIGS. 19 through 22.

At 2830, the base station may communicate with the UE via the set of active cell groups in accordance with the multi-connectivity configuration. The operations of 2830 may be performed according to the methods described herein. In some examples, aspects of the operations of 2830 may be performed by a multi-connectivity communication component as described with reference to FIGS. 19 through 22.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting a capability message to a base station indicating a multi-connectivity capability of the UE to support more than two concurrent active cell group connections;
    transmitting, to the base station, one or more measurement reports that provide measurement information for cells in proximity to the UE;
    receiving, responsive to the capability message and the one or more measurement reports, a multi-connectivity configuration, the multi-connectivity configuration comprising a cell group set that includes a plurality of cell groups with which the UE is configured for multi-connectivity communications, the cell group set including more than two active cell groups to which the UE is connected for concurrent connected mode operations between the UE and the base station;
    receiving an indication of which cell groups of the more than two active cell groups are to be configured for packet data convergence protocol (PDCP) aggregation such that data associated with a first data radio bearer (DRB) having a throughput requirement satisfying at least one threshold is distributed across cell groups in the received indication having an aggregate throughput that satisfies the throughput requirement of the first DRB; and
    communicating with the base station via the more than two active cell groups in accordance with the multi-connectivity configuration and the indication.

2. The method of claim 1, wherein the at least one threshold is a plurality of predetermined thresholds, with each of the plurality of predetermined thresholds corresponding to one of the indicated cell groups, and wherein the data associated with the first DRB is distributed across the indicated cell groups in accordance with the plurality of predetermined thresholds.

3. The method of claim 1, wherein the at least one threshold is one or more conditional thresholds, with each of the one or more conditional thresholds corresponding to a predetermined quality of a link connection associated with the indicated cell groups.

4. The method of claim 1, further comprising:
    receiving an indication of which cell groups of the more than two active cell groups are to be configured for PDCP replication such that data associated with a second DRB having a latency or reliability requirement above a threshold is replicated across the indicated cell groups.

5. The method of claim 4, wherein the indication includes one or more replication flags corresponding to each of the indicated cell groups.

6. The method of claim 1, further comprising:
    receiving a conditional indication of which cell groups of the more than two active cell groups are to be configured for DRB PDCP aggregation and of which cell groups of the more than two active cell groups are to be configured for DRB PDCP replication; and
    updating the multi-connectivity configuration for DRB PDCP aggregation or DRB PDCP replication based on a trigger of the conditional indication and without prior receipt of an updated multi-connectivity configuration.

7. The method of claim 1, wherein a number of the plurality of cell groups included in the cell group set for which the UE is configured is based at least in part on the multi-connectivity capability of the UE, service requirements of DRBs configured for the UE, throughput or reliability requirements of DRBs configured for the UE, a location of the UE, channel conditions affecting communications with the UE, battery resources of the UE, other device resource conditions having an effect on capabilities of the UE, or combinations thereof.

8. The method of claim 1, wherein the plurality of cell groups included in the cell group set include cell groups for both New Radio (NR) and Long Term Evolution (LTE) radio access technologies (RATs).

9. The method of claim 1, wherein the plurality of cell groups included in the cell group set include cell groups for a same type of radio access technology (RAT).

10. The method of claim 1, wherein each of the plurality of cell groups of the cell group set includes a set of cells configured for a same distributed unit (DU) of the base station and managed by a single medium access control (MAC) entity, and wherein all of the plurality of cell groups of the cell group set are associated with a same central unit (CU) of the base station.

11. The method of claim 1, further comprising:
    identifying that two or more of the more than two of active cell groups are controlling cell groups.

12. The method of claim 11, wherein identifying that two or more of the more than two active cell groups are controlling cell groups comprises:
    receiving, via a radio resource control (RRC) message, an indicator that the two or more of the more than two active cell groups are controlling cell groups.

13. The method of claim 12, wherein identifying that two or more of the more than two active cell groups are controlling cell groups comprises:
    receiving an allocation of signaling radio bearer (SRB) resources for each of the controlling cell groups; and
    identifying the controlling cell groups based at least in part on receipt of the allocation of SRB resources for the controlling cell groups.

14. The method of claim 11, further comprising:
    measuring one or more attributes of the controlling cell groups;
    identifying, based at least in part on the measuring, one or more of the controlling cell groups as one or more selected controlling cell groups;
    reporting the one or more selected controlling cell groups to the base station; and
    receiving at least one of system information (SI) notifications, public warning system (PWS) notifications, core network (CN) registration area notifications, or radio area network (RAN) notifications via the one or more selected controlling cell groups.

15. The method of claim 11, further comprising:
    declaring radio link failure (RLF) only if RLF is identified on each of the controlling cell groups.

16. The method of claim 1, further comprising:

identifying, from the multi-connectivity configuration, that the cell group set includes one or more inactive cell groups to which the UE is connected but for which the UE lacks an allocation of uplink and downlink physical resources.

17. The method of claim 1, further comprising:

receiving an update to the multi-connectivity configuration indicating that an additional cell group is to be added to the cell group set.

18. The method of claim 1, further comprising:

receiving an update to the multi-connectivity configuration indicating that at least one of an active cell group or an inactive cell group has been released and is no longer a part of the cell group set.

19. A method for wireless communication at a base station, comprising:

receiving a capability message from a user equipment (UE) indicating a multi- connectivity capability of the UE to support more than two concurrent active cell group connections;

receiving, from the UE, one or more measurement reports that provide measurement information for cells in proximity to the UE;

determining, based at least in part on the one or more measurement reports, a cell group set that includes a plurality of cell groups with which the UE is to be configured for multi-connectivity communications, the cell group set including of more than two active cell groups to which the UE is to be connected for concurrent connected mode operations between the UE and the base station;

transmitting to the UE, responsive to the capability message and the one or more measurement reports, a multi-connectivity configuration that includes the cell group set;

transmitting an indication of which cell groups of the more than two active cell groups are to be configured for packet data convergence protocol (PDCP) aggregation such that data associated with a first data radio bearer (DRB) having a throughput requirement above at least one threshold is distributed across the indicated cell groups having an aggregate throughput that satisfies the throughput requirement of the first DRB; and communicating with the UE via the more than two active cell groups in accordance with the multi-connectivity configuration and the indication.

20. The method of claim 19, wherein the at least one threshold is a plurality of predetermined thresholds, with each of the plurality of predetermined thresholds corresponding to one of the indicated cell groups, and wherein the data associated with the first DRB is distributed across the indicated cell groups in accordance with the plurality of predetermined thresholds.

21. The method of claim 19, wherein the at least one threshold is one or more conditional thresholds, with each of the one or more conditional thresholds corresponding to a predetermined quality of a link connection associated with the indicated cell groups.

22. The method of claim 19, further comprising:

transmitting an indication of which cell groups of the more than two active cell groups are to be configured for PDCP replication such that data associated with a second DRB having a latency or reliability requirement above a threshold is replicated across the indicated cell groups.

23. The method of claim 19, further comprising:

determining a number of the plurality of cell groups to be included in the cell group set based at least in part on the multi-connectivity capability of the UE, service requirements of DRBs configured for the UE, throughput or reliability requirements of DRBs configured for the UE, a location of the UE, channel conditions affecting communications with the UE, battery resources of the UE, other device resource conditions having an effect on capabilities of the UE, or combinations thereof.

24. The method of claim 19, wherein the plurality of cell groups included in the cell group set include cell groups for both New Radio (NR) and Long Term Evolution (LTE) radio access technologies (RATs).

25. The method of claim 19, wherein the plurality of cell groups included in the cell group set include cell groups for a same type of radio access technology (RAT).

26. The method of claim 19, wherein each of the plurality of cell groups of the cell group set includes a set of cells configured for a same distributed unit (DU) of the base station and managed by a single medium access control (MAC) entity, and wherein all of the plurality of cell groups of the cell group set are associated with a same central unit (CU) of the base station.

27. The method of claim 19, further comprising:

determining that two or more of the more than two active cell groups are controlling cell groups.

28. The method of claim 27, further comprising:

transmitting, via a radio resource control (RRC) message, an indicator that the two or more of the more than two active cell groups are controlling cell groups.

29. The method of claim 27, further comprising:

transmitting an allocation of signaling radio bearer (SRB) resources for each of the controlling cell groups without also transmitting an indicator that the two or more of the more than two active cell groups are controlling cell groups.

30. The method of claim 27, further comprising:

receiving a report from the UE indicating one or more selected controlling cell groups from controlling cell groups; and transmitting at least one of system information (SI) notifications, public warning system (PWS) notifications, core network (CN) registration area notifications, or radio area network (RAN) notifications via the one or more selected controlling cell groups.

31. The method of claim 19, further comprising:

determining, based at least in part on the one or more measurement reports, that the cell group set is to further include one or more inactive cell groups to which the UE is connected but for which the UE lacks an allocation of uplink or downlink physical resources; and including an identification of the one or more inactive cell groups in the multi-connectivity configuration.

32. The method of claim 31, further comprising:

receiving, from the UE, one or more additional measurement reports identifying channel conditions associated with at least the more than two active cell groups and the one or more inactive cell groups; and transmitting an update to the multi-connectivity configuration based at least in part on the one or more additional measurement reports.

33. The method of claim 32, further comprising:

determining that the update to the multi-connectivity configuration is associated with adding an additional cell group to the cell group set;

configuring a distributed unit (DU) of the base station and associated with the additional cell group with a UE context of the UE; and wherein transmitting the update to the multi-connectivity configuration comprises transmitting a radio resource control (RRC) signal indicating that the additional cell group is to be added to the cell group set.

34. The method of claim 32, further comprising:

determining that the update to the multi-connectivity configuration is associated with activating an inactive cell group to an active cell group;

indicating the activating to a distributed unit (DU) of the base station and associated with the cell group to be activated via an flag; and wherein transmitting the update to the multi-connectivity configuration comprises transmitting a medium access control (MAC) control element (CE) or radio resource control (RRC) signal indicating that the inactive cell group has been changed to be an active cell group.

35. The method of claim 32, further comprising:

determining that the update to the multi-connectivity configuration is associated with deactivating an active cell group to an inactive cell group;

indicating the deactivating to a distributed unit (DU) of the base station and associated with the cell group to be deactivated via a flag; and wherein transmitting the update to the multi-connectivity configuration comprises transmitting a medium access control (MAC) control element (CE) or radio resource control (RRC) signal indicating that the active cell group has been changed to be an inactive cell group.

36. The method of claim 32, further comprising:

determining that the update to the multi-connectivity configuration is associated with releasing a cell group from the cell group set;

releasing a UE context of the UE from a distributed unit (DU) of the base station and associated with the cell group to be released; and wherein transmitting the update to the multi-connectivity configuration comprises transmitting a radio resource control (RRC) signal indicating that either an active cell group or an inactive cell group has been released and is no longer a part of the cell group set.

37. The method of claim 19, further comprising:

determining, at a central unit (CU) of the base station and based at least in part on information received from the UE and associated distributed units (DUs) of the base station, which DRBs are to be enabled for PDCP aggregation and which DRBs are to be enabled for PDCP replication.

38. The method of claim 19, further comprising:

determining, at a distributed unit (DU) of the base station, which DRBs are to be enabled for PDCP aggregation and which DRBs are to be enabled for PDCP replication; and signaling the determination to a central unit (CU) of the base station.

39. The method of claim 19, further comprising:

transmitting a conditional indication of which cell groups of the more than two active cell groups are to be configured for DRB PDCP aggregation and of which cell groups of the more than two active cell groups are to be configured for DRB PDCP replication.

40. The method of claim 19, wherein the determining the cell group set is performed by a central unit (CU) of the base station.

41. The method of claim 40, wherein the CU of the base station communicates with distributed units (DUs) of the base station corresponding to each cell group of the cell group set via an F1 interface or a W1 interface.

42. An apparatus for wireless communication at a user equipment (UE), comprising:

a processor, memory coupled with the processor; and instructions stored in the memory and executable by the processor to cause the apparatus to:

transmit a capability message to a base station indicating a multi-connectivity capability of the UE to support more than two concurrent active cell group connections;

transmit, to the base station, one or more measurement reports that provide measurement information for cells in proximity to the UE;

receive, responsive to the capability message and the one or more measurement reports, a multi-connectivity configuration, the multi-connectivity configuration comprising a cell group set that includes a plurality of cell groups with which the UE is configured for multi-connectivity communications, the cell group set including more than two active cell groups to which the UE is connected for concurrent connected mode operations between the UE and the base station;

receive an indication of which cell groups of the more than two active cell groups are to be configured for packet data convergence protocol (PDCP) aggregation such that data associated with a first data radio bearer (DRB) having a throughput requirement satisfying a threshold is distributed across cell groups in the received indication having an aggregate throughput that satisfies the throughput requirement of the first DRB; and communicate with the base station via the more than two active cell groups in accordance with the multi-connectivity configuration and the indication.

43. An apparatus for wireless communication at a base station, comprising:

a processor, memory coupled with the processor; and instructions stored in the memory and executable by the processor to cause the apparatus to:

receive a capability message from a user equipment (UE) indicating a multi-connectivity capability of the UE to support more than two concurrent active cell group connections;

receive, from the UE, one or more measurement reports that provide measurement information for cells in proximity to the UE;

determine, based at least in part on the one or more measurement reports, a cell group set that includes a plurality of cell groups with which the UE is to be configured for multi-connectivity communications, the cell group set including more than two active cell groups to which the UE is to be connected for concurrent connected mode operations between the UE and the base station;

transmit to the UE, responsive to the capability message and the one or more measurement reports, a multi-connectivity configuration that includes the cell group set;

transmit an indication of which cell groups of the more than two active cell groups are to be configured for packet data convergence protocol (PDCP) aggregation such that data associated with a first data radio bearer (DRB) having a throughput requirement above at least one threshold is distributed across the indicated cell groups having an aggregate throughput that satisfies the throughput requirement of the first DRB; and communicate with the UE via the more than two active cell groups in accordance with the multi-connectivity configuration and the indication.

44. An apparatus for wireless communication at a user equipment (UE), comprising:

means for transmitting a capability message to a base station indicating a multi-connectivity capability of the UE to support more than two concurrent active cell group connections; means for transmitting, to the base station, one or more measurement reports that provide measurement information for cells in proximity to the UE;

means for receiving, responsive to the capability message and the one or more measurement reports, a multi-connectivity configuration, the multi-connectivity configuration comprising a cell group set that includes a plurality of cell groups with which the UE is configured for multi-connectivity communications, the cell group set including more than two active cell groups to which the UE is connected for concurrent connected mode operations between the UE and the base station;

means for receiving an indication of which cell groups of the more than two active cell groups are to be configured for packet data convergence protocol (PDCP) aggregation such that data associated with a first data radio bearer (DRB) having a throughput requirement satisfying a threshold is distributed across cell groups in the received indication having an aggregate throughput that satisfies the throughput requirement of the first DRB; and means for communicating with the base station via the more than two active cell groups in accordance with the multi-connectivity configuration and the indication.

45. An apparatus for wireless communication at a base station, comprising:

means for receiving a capability message from a user equipment (UE) indicating a multi-connectivity capability of the UE to support more than two concurrent active cell group connections;

means for receiving, from the UE, one or more measurement reports that provide measurement information for cells in proximity to the UE; means for determining, based at least in part on the one or more measurement reports, a cell group set that includes a plurality of cell groups with which the UE is to be configured for multi-connectivity communications, the cell group set including more than two active cell groups to which the UE is to be connected for concurrent connected mode operations between the UE and the base station;

means for transmitting to the UE, responsive to the capability message and the one or more measurement reports, a multi-connectivity configuration that includes the cell group set;

means for transmitting an indication of which cell groups of the more than two active cell groups are to be configured for packet data convergence protocol (PDCP) aggregation such that data associated with a first data radio bearer (DRB) having a throughput requirement above at least one threshold is distributed across the indicated cell groups having an aggregate throughput that satisfies the throughput requirement of the first DRB; and means for communicating with the UE via the more than two active cell groups in accordance with the multi-connectivity configuration and the indication.

46. A non-transitory computer-readable medium storing code for wireless communication at a user equipment (UE), the code comprising instructions executable by a processor to:

transmit a capability message to a base station indicating a multi-connectivity capability of the UE to support more than two concurrent active cell group connections;

transmit, to the base station, one or more measurement reports that provide measurement information for cells in proximity to the UE;

receive, responsive to the capability message and the one or more measurement reports, a multi-connectivity configuration, the multi-connectivity configuration comprising a cell group set that includes a plurality of cell groups with which the UE is configured for multi-connectivity communications, the cell group set including more than two active cell groups to which the UE is connected for concurrent connected mode operations between the UE and the base station;

receive an indication of which cell groups of the more than two active cell groups are to be configured for packet data convergence protocol (PDCP) aggregation such that data associated with a first data radio bearer (DRB) having a throughput requirement satisfying a threshold is distributed across cell groups in the received indication having an aggregate throughput that satisfies the throughput requirement of the first DRB; and communicate with the base station via the more than two active cell groups in accordance with the multi-connectivity configuration and the indication.

47. A non-transitory computer-readable medium storing code for wireless communication at a base station, the code comprising instructions executable by a processor to:

receive a capability message from a user equipment (UE) indicating a multi-connectivity capability of the UE to support more than two concurrent active cell group connections;

receive, from the UE, one or more measurement reports that provide measurement information for cells in proximity to the UE;

determine, based at least in part on the one or more measurement reports, a cell group set that includes a plurality of cell groups with which the UE is to be configured for multi-connectivity communications, the cell group set including more than two active cell groups to which the UE is to be connected for concurrent connected mode operations between the UE and the base station;

transmit to the UE, responsive to the capability message and the one or more measurement reports, a multi-connectivity configuration that includes the cell group set;

transmit an indication of which cell groups of the more than two active cell groups are to be configured for packet data convergence protocol (PDCP) aggregation such that data associated with a first data radio bearer (DRB) having a throughput requirement above at least one threshold is distributed across the indicated cell groups having an aggregate throughput that satisfies the throughput requirement of the first DRB; and communicate with the UE via the more than two active cell groups in accordance with the multi-connectivity configuration and the indication.

\* \* \* \* \*